(12) United States Patent
Ito

(10) Patent No.: US 8,416,506 B2
(45) Date of Patent: Apr. 9, 2013

(54) ZOOM LENS, OPTICAL APPARATUS EQUIPPED THEREWITH AND METHOD FOR MANUFACTURING THE ZOOM LENS

(75) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 320 days.

(21) Appl. No.: 12/708,951

(22) Filed: Feb. 19, 2010

(65) Prior Publication Data

US 2010/0214658 A1 Aug. 26, 2010

(30) Foreign Application Priority Data

Feb. 20, 2009 (JP) ................................ 2009-037560
Feb. 20, 2009 (JP) ................................ 2009-037561
Feb. 20, 2009 (JP) ................................ 2009-037562

(51) Int. Cl.
*G02B 15/14* (2006.01)

(52) U.S. Cl. ...................................... 359/687

(58) Field of Classification Search .................. 359/557, 359/684, 687, 774
See application file for complete search history.

(56) References Cited

U.S. PATENT DOCUMENTS

| | | | |
|---|---|---|---|
| 5,388,004 A | 2/1995 | Adachi | |
| 5,835,282 A | 11/1998 | Suenaga et al. | |
| 6,989,942 B1 * | 1/2006 | Nurishi | 359/687 |
| 7,312,934 B2 | 12/2007 | Iwasawa | |
| 2011/0122506 A1 | 5/2011 | Ito | |

FOREIGN PATENT DOCUMENTS

| | | |
|---|---|---|
| CN | 101196611 A | 11/2008 |
| JP | 59-052215 A | 3/1984 |
| JP | 03-006510 A | 1/1991 |
| JP | 5-215967 A | 8/1993 |
| JP | 06-148523 A | 5/1994 |
| JP | 9-325274 A | 12/1997 |
| JP | 10-148757 A | 6/1998 |
| JP | 2002-98895 A | 4/2002 |
| JP | 2002-162563 A | 6/2002 |
| JP | 2002-228931 A | 8/2002 |
| JP | 2005-121694 A | 5/2005 |
| JP | 2005-121694 A | 5/2005 |
| JP | 2005-345714 A | 12/2005 |
| JP | 2006-003913 A | 1/2006 |

(Continued)

OTHER PUBLICATIONS

Office Action issued Jun. 18, 2012 in U.S. Appl. No. 13/054,060.
English Translation of International Search Report from International Application No. PCT/JP2009/062532, Feb. 8, 2011.

(Continued)

*Primary Examiner* — Joseph P Martinez
(74) *Attorney, Agent, or Firm* — Miles & Stockbridge P.C.

(57) ABSTRACT

A zoom lens ZL installed in an electronic still camera 1 includes a first lens group G1 having positive refractive power disposed to the most object side, a second lens group G2 disposed to an image side of the first lens group G1, and a Gn lens group having positive refractive power disposed to the most image side. Upon zooming, the first lens group G1 and the Gn lens group are fixed. Upon focusing, at least one lens group disposed between the second lens group G2 and the Gn lens group are moved as a focusing lens group Gf. With this lens configuration, it becomes possible to provide a zoom lens having an optical property capable of coping with a vibration reduction, and an optical apparatus equipped therewith, and a method for manufacturing the zoom lens.

34 Claims, 35 Drawing Sheets

FOREIGN PATENT DOCUMENTS

| | | |
|---|---|---|
| JP | 2006-201524 A | 8/2006 |
| JP | 2006-209100 A | 8/2006 |
| JP | 2006-215257 A | 8/2006 |
| JP | 2007-108702 A | 4/2007 |
| JP | 2008-145529 A | 6/2008 |

OTHER PUBLICATIONS

English Translation of International Preliminary Report on Patentability from International Application No. PCT/JP2009/062532, Oct. 13, 2009.

* cited by examiner

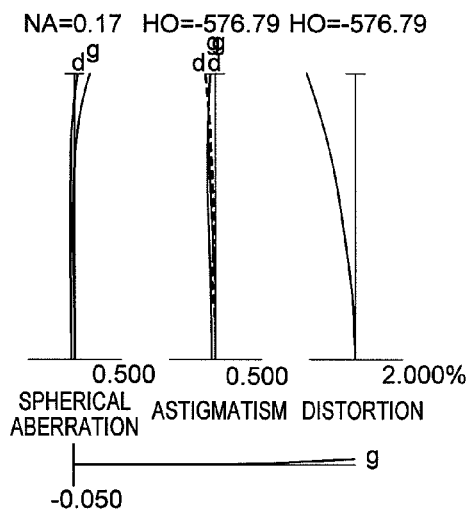
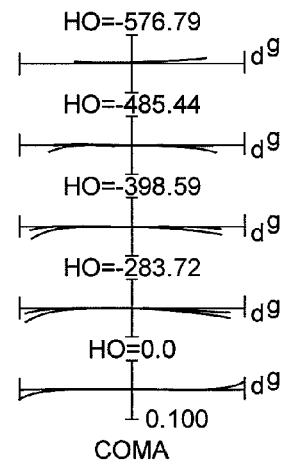
FIG. 5A
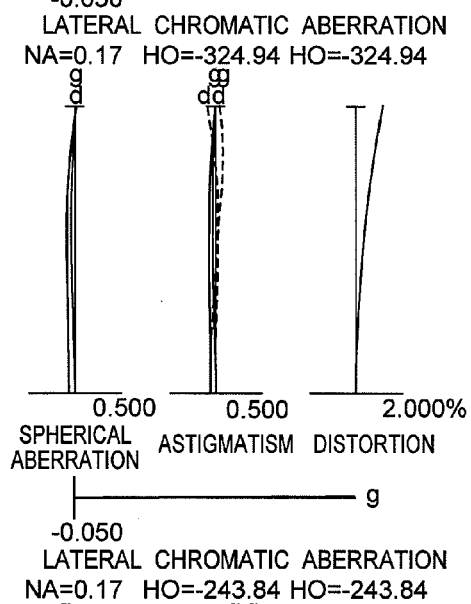
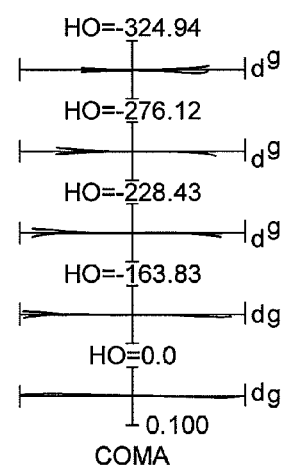
FIG. 5B
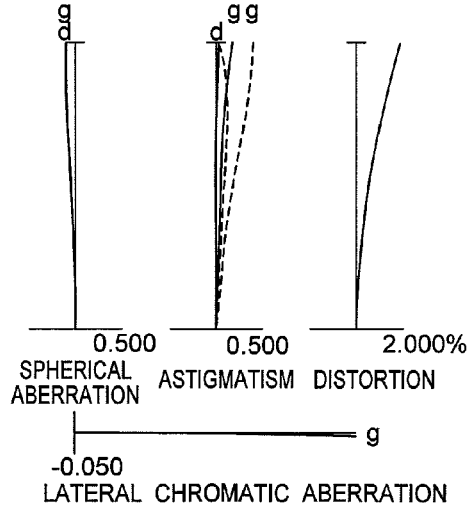
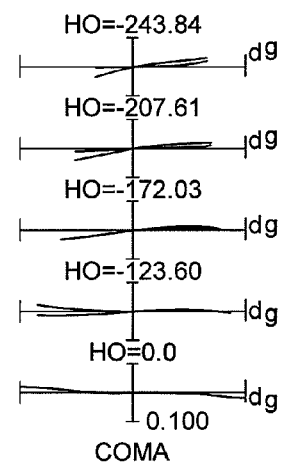
FIG. 5C

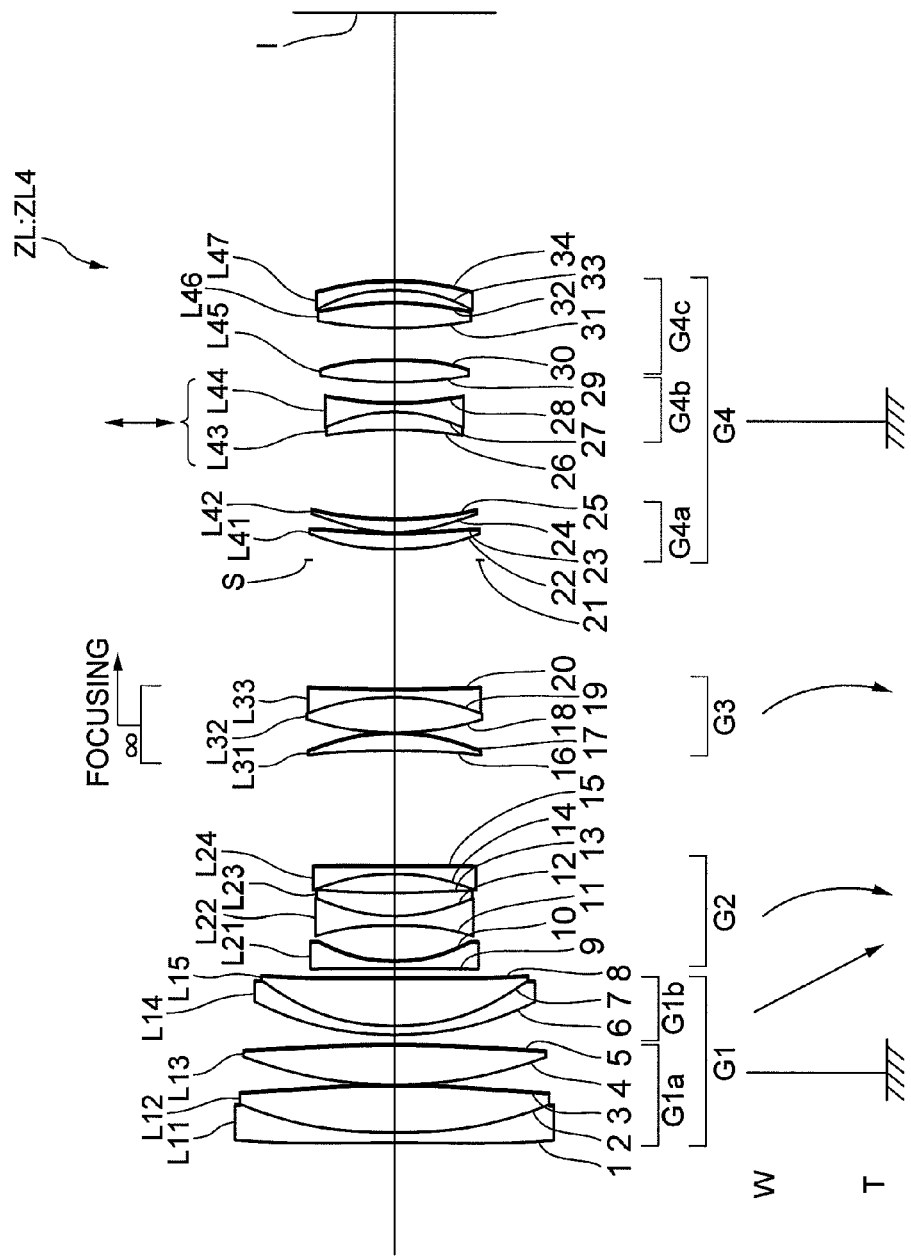

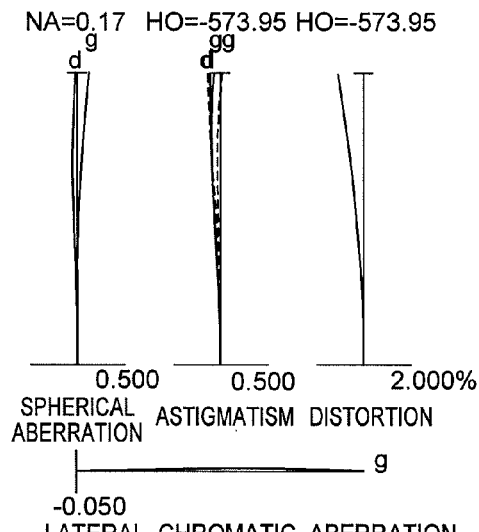
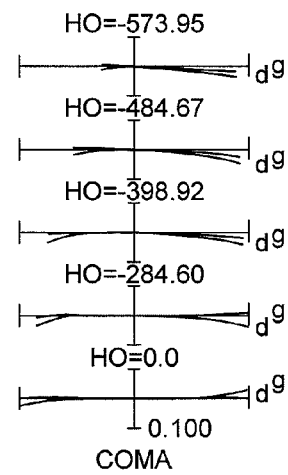
FIG.30A
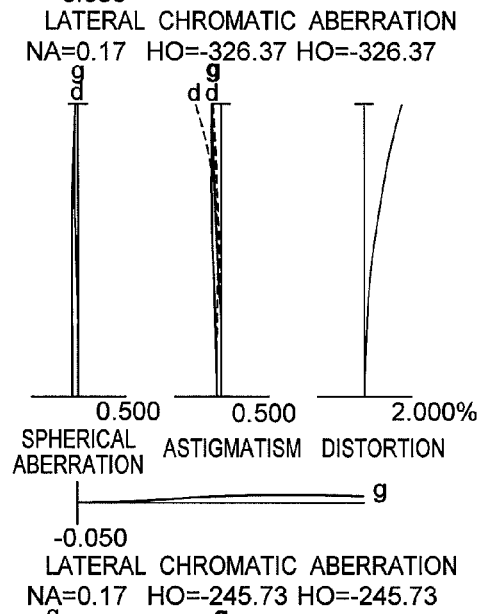
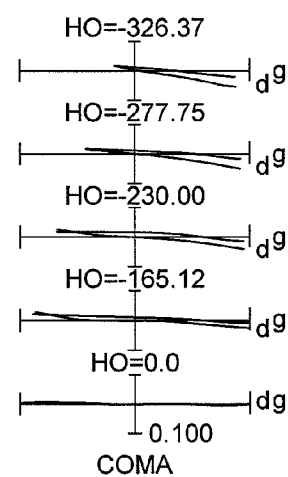
FIG.30B
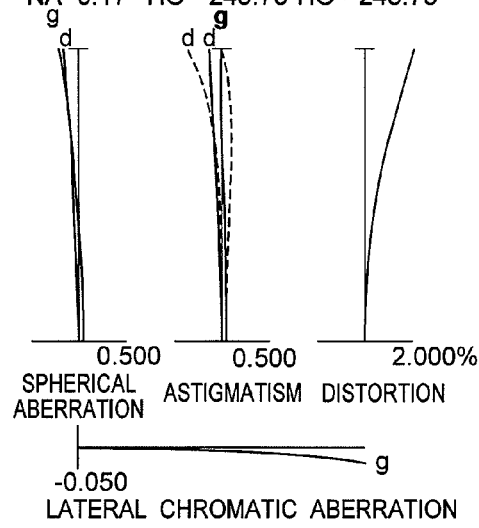
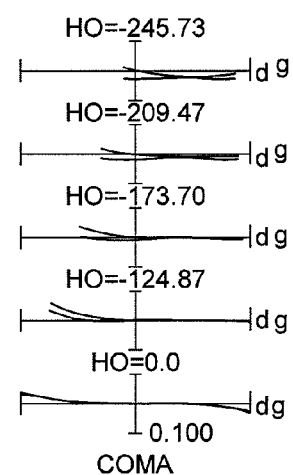
FIG.30C

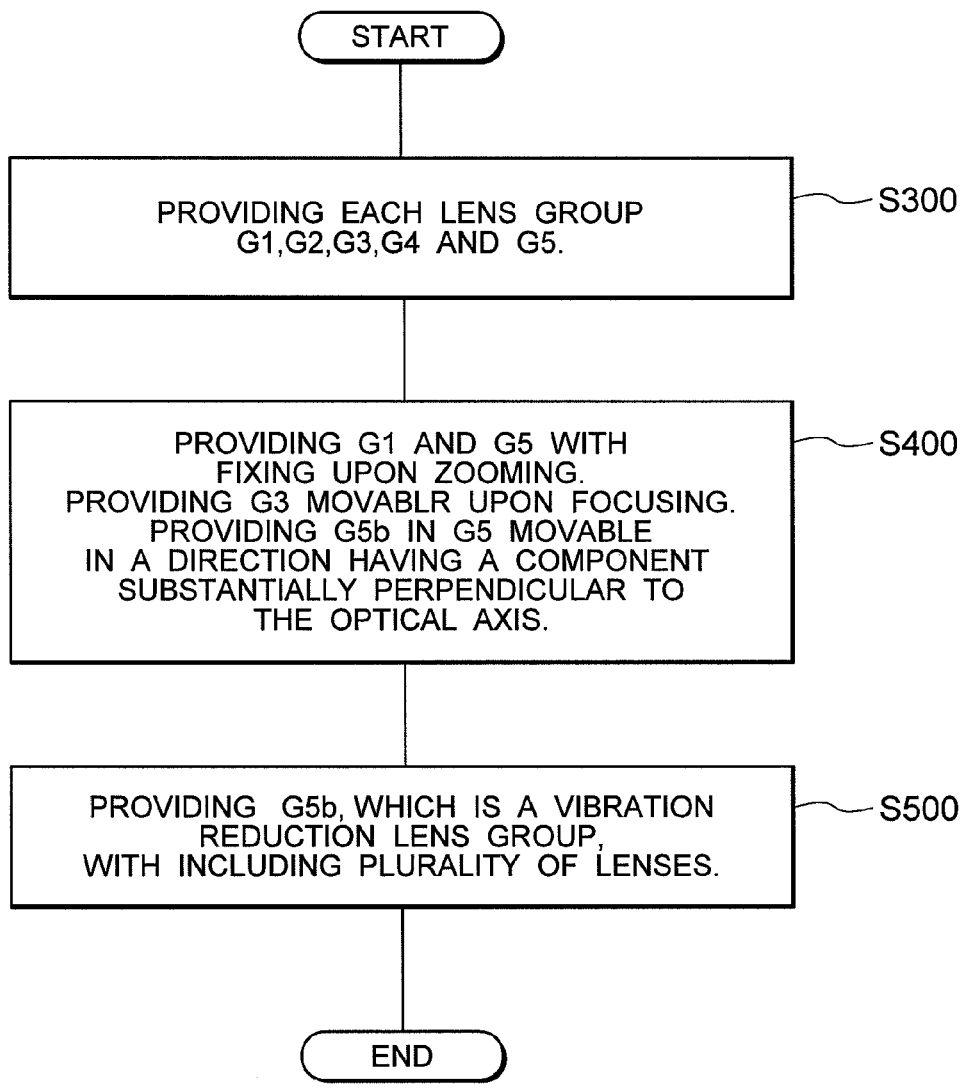

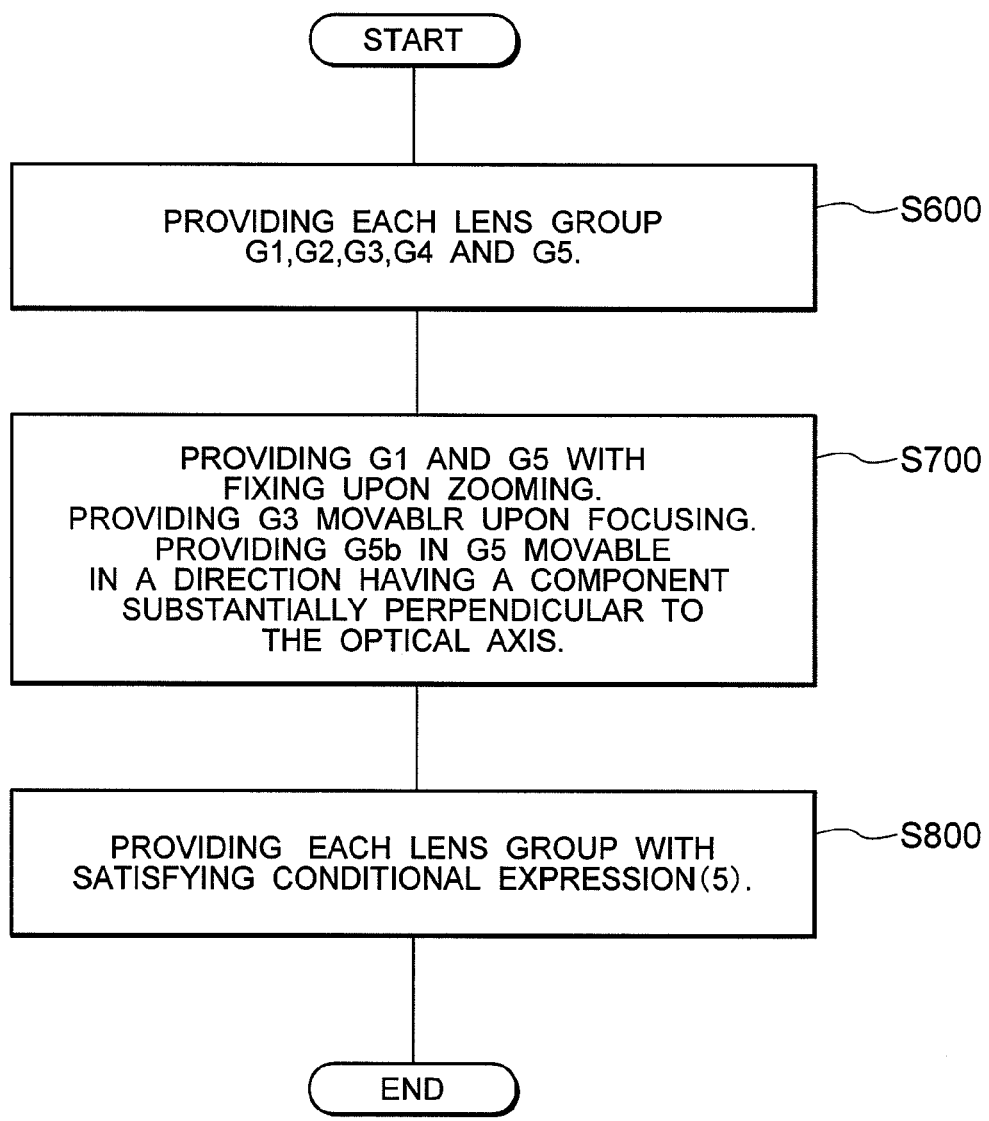

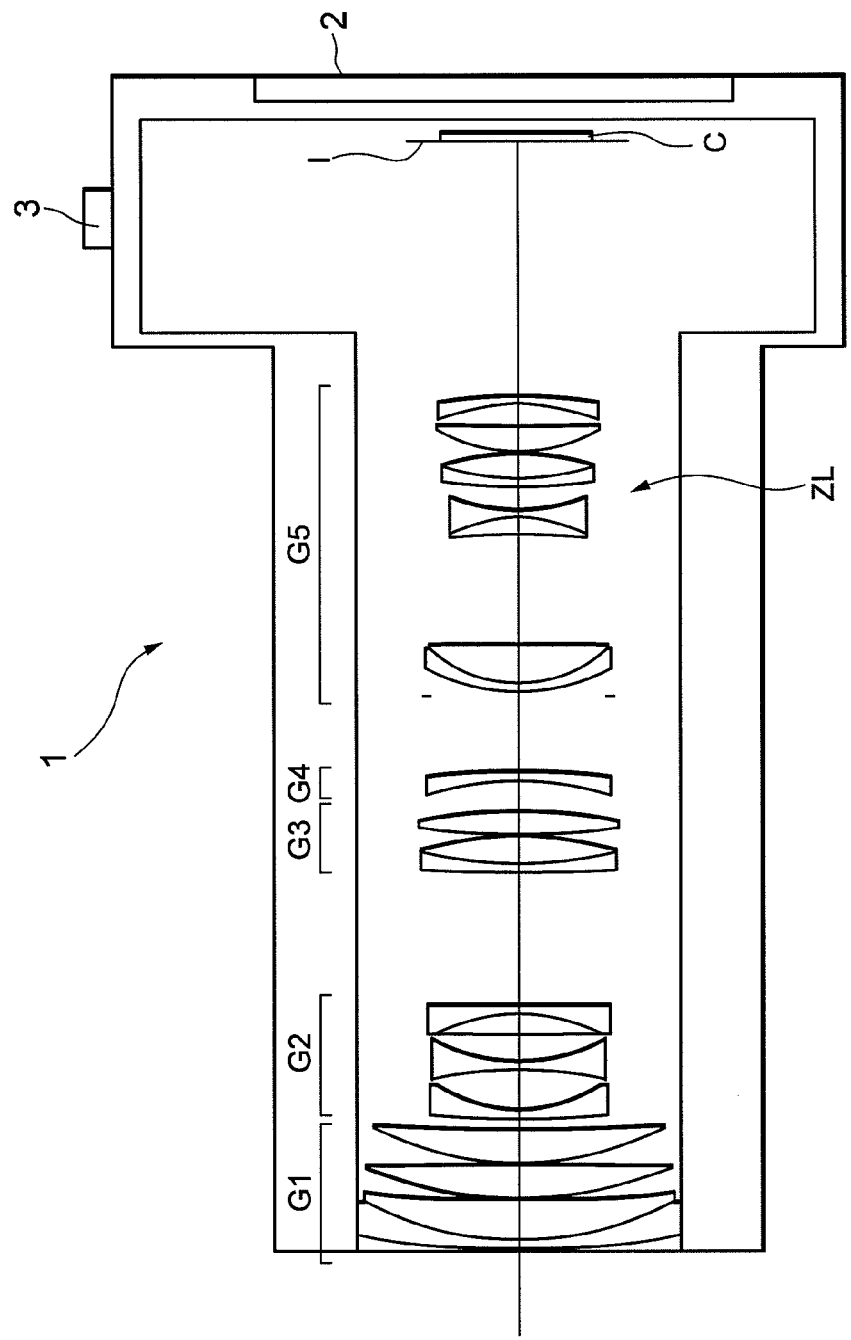

ZOOM LENS, OPTICAL APPARATUS EQUIPPED THEREWITH AND METHOD FOR MANUFACTURING THE ZOOM LENS

The disclosure of the following priority applications are herein incorporated by reference:

Japanese Patent Application No. 2009-037560 filed on Feb. 20, 2009,

Japanese Patent Application No. 2009-037561 filed on Feb. 20, 2009, and

Japanese Patent Application No. 2009-037562 filed on Feb. 20, 2009.

BACKGROUND OF THE INVENTION

1. Field of the Invention

The present invention relates to a zoom lens, an optical apparatus equipped with the zoom lens, and a method for manufacturing the zoom lens.

2. Related Background Art

There have been proposed a zoom lens suitable for a film camera, an electronic still camera and a video camera in such as Japanese Patent Application Laid-Open Nos. 2005-121694 and 59-052215.

However, a conventional zoom lens has a problem that the zoom lens cannot cope with variation in aberrations upon focusing on a close range, or upon carrying out vibration reduction.

SUMMARY OF THE INVENTION

The present invention is made in view of the above-described problem, and has an object to provide a zoom lens capable of excellently correcting aberrations generated upon focusing on a close range or upon carrying out vibration reduction, and having excellent optical performance, an optical apparatus equipped with the zoom lens, and a method for manufacturing the zoom lens.

According to a first aspect of the present invention, there is provided a zoom lens comprising, in order from an object side: a first lens group that is disposed to the most object side and has positive refractive power; a second lens group that is disposed to an image side of the first lens group; and a Gn lens group that is disposed to the most image side and has positive refractive power; upon zooming, the first lens group and the Gn lens group is fixed, upon focusing, at least one lens group disposed between the second lens group and the Gn lens group is moved as a focusing lens group.

In the first aspect of the present invention, it is preferable that at least two lens groups are included between the second lens group and the Gn lens group.

In the first aspect of the present invention, it is preferable that the Gn lens group includes, in order from the object side, a first subgroup having positive refractive power, a second subgroup having negative refractive power, and a third subgroup having positive refractive power, and the second subgroup is the vibration reduction lens group.

In the first aspect of the present invention, it is preferable that the following conditional expression (2) is satisfied:

$$0.20 < |fGf/fGn| < 1.00 \quad (2)$$

where fGf denotes a focal length of the focusing lens group, and fGn denotes a focal length of the Gn lens group.

In the first aspect of the present invention, it is preferable that the following conditional expression (3) is satisfied:

$$0.40 < |fGn|/ft < 1.00 \quad (3)$$

where fGn denotes a focal length of the Gn lens group, and ft denotes a focal length of the zoom lens in the telephoto end state.

In the first aspect of the present invention, it is preferable that the following conditional expression (5) is satisfied:

$$1.38 < fGn/fw < 1.95 \quad (5)$$

where fGn denotes a focal length of the Gn lens group, and fw denotes a focal length of the zoom lens in a wide-angle end state.

In the first aspect of the present invention, it is preferable that the following conditional expression (7) is satisfied:

$$0.10 < |fn/fGn| < 0.40 \quad (7)$$

where fn denotes a focal length of a lens group having negative refractive power disposed to the most object side, and fGn denotes a focal length of the Gn lens group.

In the first aspect of the present invention, it is preferable that the zoom lens includes, in order from the object side, the first lens group, the second lens group, a third lens group, a fourth lens group, and the Gn lens group.

In the first aspect of the present invention, it is preferable that at least a portion of the third lens group is moved upon focusing.

In the first aspect of the present invention, it is preferable that the zoom lens includes, in order from the object side, the first lens group having positive refractive power, the second lens group having negative refractive power, a third lens group having positive refractive power, and the Gn lens group having positive refractive power.

In the first aspect of the present invention, it is preferable that the first lens group includes, in order from the object side, a front sub lens group having positive refractive power and a rear sub lens group having positive refractive power, and upon zooming, the front sub lens group and the Gn lens group are fixed, and the rear sub lens group is movable.

In the first aspect of the present invention, it is preferable that upon focusing, at least one portion of the third lens group is movable.

In the first aspect of the present invention, it is preferable that at least one portion of the Gn lens group is movable as a vibration reduction lens group in a direction having a component substantially perpendicular to an optical axis.

In the first aspect of the present invention, it is preferable that the vibration reduction lens group has negative refractive power.

In the first aspect of the present invention, it is preferable that the following conditional expression (1) is satisfied:

$$-3.5 < fGn/fVR < -0.8 \quad (1)$$

where fGn denotes a focal length of the Gn lens group, and fVR denotes a focal length of the vibration reduction lens group.

In the first aspect of the present invention, it is preferable that the following conditional expression (4) is satisfied:

$$0.10 < |fVR|/fw < 1.90 \quad (4)$$

where fVR denotes a focal length of the vibration reduction lens group, and fw denotes a focal length of the zoom lens in the wide-angle end state.

In the first aspect of the present invention, it is preferable that the following conditional expression (5) is satisfied:

$$1.38 < fGn/fw < 1.95 \quad (5)$$

where fGn denotes a focal length of the Gn lens group, and fw denotes a focal length of the zoom lens in a wide-angle end state.

In the first aspect of the present invention, it is preferable that the following conditional expression (6) is satisfied:

$$0.10 < |fVR|/ft < 1.00 \tag{6}$$

where fVR denotes a focal length of the vibration reduction lens group, and fw denotes a focal length of the zoom lens in a wide-angle end stat.

In the first aspect of the present invention, it is preferable that the following conditional expression (7) is satisfied:

$$0.10 < |fn/fGn| < 0.40 \tag{7}$$

where fn denotes a focal length of a lens group having negative refractive power disposed to the most object side, and fGn denotes a focal length of the Gn lens group.

In the first aspect of the present invention, it is preferable that at least two lens groups are included between the second lens group and the Gn lens group.

In the first aspect of the present invention, it is preferable that the Gn lens group includes, in order from the object side, a first subgroup having positive refractive power, a second subgroup having negative refractive power, and a third subgroup having positive refractive power.

In the first aspect of the present invention, it is preferable that the following conditional expression (2) is satisfied:

$$0.20 < |fGf/fGn| < 1.00 \tag{2}$$

where fGf denotes a focal length of the focusing lens group, and fGn denotes a focal length of the Gn lens group.

In the first aspect of the present invention, it is preferable that the following conditional expression (3) is satisfied:

$$0.40 < |fGn|/ft < 1.00 \tag{3}$$

where fGn denotes a focal length of the Gn lens group, and ft denotes a focal length of the zoom lens in the telephoto end state.

In the first aspect of the present invention, it is preferable that the zoom lens includes, in order from the object side, the first lens group, the second lens group, a third lens group, a fourth lens group, and the Gn lens group.

In the first aspect of the present invention, it is preferable that at least a portion of the third lens group is moved upon focusing.

In the first aspect of the present invention, it is preferable that the zoom lens includes, in order from the object side, the first lens group having positive refractive power, the second lens group having negative refractive power, a third lens group having positive refractive power, and the Gn lens group having positive refractive power.

In the first aspect of the present invention, it is preferable that the first lens group includes, in order from the object side, a front sub lens group having positive refractive power and a rear sub lens group having positive refractive power, and upon zooming, the front sub lens group and the Gn lens group are fixed, and the rear sub lens group is movable.

In the first aspect of the present invention, it is preferable that upon focusing, at least one portion of the third lens group is movable.

According to a second aspect of the present invention, there is provided an optical apparatus equipped with the zoom lens according to the first aspect.

According to a third aspect of the present invention, there is provided a method for manufacturing a zoom lens that includes a first lens group disposed to the most object side with positive refractive power, a second lens group disposed to an image side of the first lens group, and a Gn lens group disposed to the most image side with positive refractive power, the method comprising steps of: disposing the first lens group and the Gn lens group with fixing upon zooming; disposing at least one lens group between the second lens group and the Gn lens group movably upon focusing; and disposing a vibration reduction lens group having negative refractive power included in the Gn lens group movably in a direction having a component substantially perpendicular to the optical axis.

In the third aspect of the present invention, it is preferable that the method further comprising a step of: satisfying the following conditional expression (2):

$$0.20 < |fGf/fGn| < 1.00 \tag{2}$$

where fGf denotes a focal length of the focusing lens group, and fGn denotes a focal length of the Gn lens group.

In the third aspect of the present invention, it is preferable that the method further comprising a step of: satisfying the following conditional expression (3):

$$0.40 < |fGn|/ft < 1.00 \tag{3}$$

where fGn denotes a focal length of the Gn lens group, and ft denotes a focal length of the zoom lens in the telephoto end state.

In the third aspect of the present invention, it is preferable that the method further comprising a step of: disposing at least one portion of the Gn lens group movably as a vibration reduction lens group in a direction having a component substantially perpendicular to an optical axis.

In the third aspect of the present invention, it is preferable that the method further comprising a step of: satisfying the following conditional expression (1):

$$-3.5 < fGn/fVR < -0.8 \tag{1}$$

where fGn denotes a focal length of the Gn lens group, and fVR denotes a focal length of the vibration reduction lens group.

In the third aspect of the present invention, it is preferable that the method further comprising a step of: satisfying the following conditional expression (4):

$$0.10 < |fVR|/fw < 1.90 \tag{4}$$

where fVR denotes a focal length of the vibration reduction lens group, and fw denotes a focal length of the zoom lens in the wide-angle end state.

With configuring a zoom lens, an optical apparatus and a method for manufacturing the zoom lens according to the present invention as described above, it becomes possible to obtain excellent optical performance capable of excellently correcting various aberrations upon focusing on a close range object and upon vibration correction.

BRIEF DESCRIPTION OF THE DRAWINGS

FIGS. 2A, and 2B are graphs showing various aberrations of the zoom lens according to Example 1 in a wide-angle end state focusing on infinity, in which FIG. 2A shows various aberrations without vibration reduction, and FIG. 2B shows coma upon carrying out vibration reduction with respect to a rotational camera shake of 0.4 degrees.

FIGS. 3A, and 3B are graphs showing various aberrations of the zoom lens according to Example 1 in an intermediate focal length state focusing on infinity, in which FIG. 3A shows various aberrations without vibration reduction, and FIG. 3B shows coma upon carrying out vibration reduction with respect to a rotational camera shake of 0.3 degrees.

FIGS. 4A, and 4B are graphs showing various aberrations of the zoom lens according to Example 1 in a telephoto end state focusing on infinity, in which FIG. 4A shows various aberrations without vibration reduction, and FIG. 4B shows coma upon carrying out vibration reduction with respect to a rotational camera shake of 0.3 degrees.

FIGS. 5A, 5B and 5C are graphs showing various aberrations of the zoom lens according to Example 1 upon focusing on a close range object, in which FIG. 5A is in the wide-angle end state, FIG. 5B is in the intermediate focal length state, and FIG. 5C is in the telephoto end state.

FIGS. 7A, and 7B are graphs showing various aberrations of the zoom lens according to Example 2 in a wide-angle end state focusing on infinity, in which FIG. 7A shows various aberrations without vibration reduction, and FIG. 7B shows coma upon carrying out vibration reduction with respect to a rotational camera shake of 0.4 degrees.

FIGS. 8A, and 8B are graphs showing various aberrations of the zoom lens according to Example 2 in an intermediate focal length state focusing on infinity, in which FIG. 8A shows various aberrations without vibration reduction, and FIG. 8B shows coma upon carrying out vibration reduction with respect to a rotational camera shake of 0.3 degrees.

FIGS. 9A, and 9B are graphs showing various aberrations of the zoom lens according to Example 2 in a telephoto end state focusing on infinity, in which FIG. 9A shows various aberrations without vibration reduction, and FIG. 9B shows coma upon carrying out vibration reduction with respect to a rotational camera shake of 0.3 degrees.

FIGS. 10A, 10B and 10C are graphs showing various aberrations of the zoom lens according to Example 2 upon focusing on a close range object, in which FIG. 10A is in the wide-angle end state, FIG. 10B is in the intermediate focal length state, and FIG. 10C is in the telephoto end state.

FIGS. 12A, and 12B are graphs showing various aberrations of the zoom lens according to Example 3 in a wide-angle end state focusing on infinity, in which FIG. 12A shows various aberrations without vibration reduction, and FIG. 12B shows coma upon carrying out vibration reduction with respect to a rotational camera shake of 0.4 degrees.

FIGS. 13A, and 13B are graphs showing various aberrations of the zoom lens according to Example 3 in an intermediate focal length state focusing on infinity, in which FIG. 13A shows various aberrations without vibration reduction, and FIG. 13B shows coma upon carrying out vibration reduction with respect to a rotational camera shake of 0.3 degrees.

FIGS. 14A, and 14B are graphs showing various aberrations of the zoom lens according to Example 3 in a telephoto end state focusing on infinity, in which FIG. 14A shows various aberrations without vibration reduction, and FIG. 14B shows coma upon carrying out vibration reduction with respect to a rotational camera shake of 0.3 degrees.

FIGS. 15A, 15B and 15C are graphs showing various aberrations of the zoom lens according to Example 3 upon focusing on a close range object, in which FIG. 15A is in the wide-angle end state, FIG. 15B is in the intermediate focal length state, and FIG. 15C is in the telephoto end state.

FIG. 16 is a sectional view showing a lens configuration of a zoom lens according to Example 4.

FIGS. 17A, and 17B are graphs showing various aberrations of the zoom lens according to Example 4 in a wide-angle end state focusing on infinity, in which FIG. 17A shows various aberrations without vibration reduction, and FIG. 17B shows coma upon carrying out vibration reduction with respect to a rotational camera shake of 0.4 degrees.

FIGS. 18A, and 18B are graphs showing various aberrations of the zoom lens according to Example 4 in an intermediate focal length state focusing on infinity, in which FIG. 18A shows various aberrations without vibration reduction, and FIG. 18B shows coma upon carrying out vibration reduction with respect to a rotational camera shake of 0.3 degrees.

FIGS. 19A, and 19B are graphs showing various aberrations of the zoom lens according to Example 4 in a telephoto end state focusing on infinity, in which FIG. 19A shows various aberrations without vibration reduction, and FIG. 19B shows coma upon carrying out vibration reduction with respect to a rotational camera shake of 0.3 degrees.

FIGS. 20A, 20B and 20C are graphs showing various aberrations of the zoom lens according to Example 4 upon focusing on a close range object, in which FIG. 20A is in the wide-angle end state, FIG. 20B is in the intermediate focal length state, and FIG. 20C is in the telephoto end state.

FIGS. 22A, and 22B are graphs showing various aberrations of the zoom lens according to Example 5 in a wide-angle end state focusing on infinity, in which FIG. 22A shows various aberrations without vibration reduction, and FIG. 22B shows coma upon carrying out vibration reduction with respect to a rotational camera shake of 0.4 degrees.

FIGS. 23A, and 23B are graphs showing various aberrations of the zoom lens according to Example 5 in an intermediate focal length state focusing on infinity, in which FIG. 23A shows various aberrations without vibration reduction, and FIG. 23B shows coma upon carrying out vibration reduction with respect to a rotational camera shake of 0.3 degrees.

FIGS. 24A, and 24B are graphs showing various aberrations of the zoom lens according to Example 5 in a telephoto end state focusing on infinity, in which FIG. 24A shows various aberrations without vibration reduction, and FIG. 24B shows coma upon carrying out vibration reduction with respect to a rotational camera shake of 0.3 degrees.

FIGS. 25A, 25B and 25C are graphs showing various aberrations of the zoom lens according to Example 5 upon focusing on a close range object, in which FIG. 25A is in the wide-angle end state, FIG. 25B is in the intermediate focal length state, and FIG. 25C is in the telephoto end state.

FIGS. 27A, and 27B are graphs showing various aberrations of the zoom lens according to Example 6 in a wide-angle end state focusing on infinity, in which FIG. 27A shows various aberrations without vibration reduction, and FIG. 27B shows coma upon carrying out vibration reduction with respect to a rotational camera shake of 0.4 degrees.

FIGS. 28A, and 28B are graphs showing various aberrations of the zoom lens according to Example 6 in an intermediate focal length state focusing on infinity, in which FIG. 28A shows various aberrations without vibration reduction, and FIG. 28B shows coma upon carrying out vibration reduction with respect to a rotational camera shake of 0.3 degrees.

FIGS. 29A, and 29B are graphs showing various aberrations of the zoom lens according to Example 6 in a telephoto end state focusing on infinity, in which FIG. 29A shows various aberrations without vibration reduction, and FIG. 29B shows coma upon carrying out vibration reduction with respect to a rotational camera shake of 0.3 degrees.

FIGS. 30A, 30B and 30C are graphs showing various aberrations of the zoom lens according to Example 6 upon focusing on a close range object, in which FIG. 30A is in the wide-angle end state, FIG. 30B is in the intermediate focal length state, and FIG. 30C is in the telephoto end state.

FIG. 32 is a flowchart schematically explaining a method for manufacturing the zoom lens seen from another point of view according to the present embodiment.

FIG. 33 is a flowchart schematically explaining a method for manufacturing the zoom lens seen from still another point of view according to the present embodiment.

FIGS. 34A and 34B schematically show an electronic still camera equipped with the zoom lens according to the present embodiment, in which FIG. 34A is a front view, and FIG. 34B is a rear view.

FIG. 35 is a sectional view along A-A' line in FIG. 34A.

DESCRIPTION OF THE MOST PREFERRED EMBODIMENT

Figure 1:
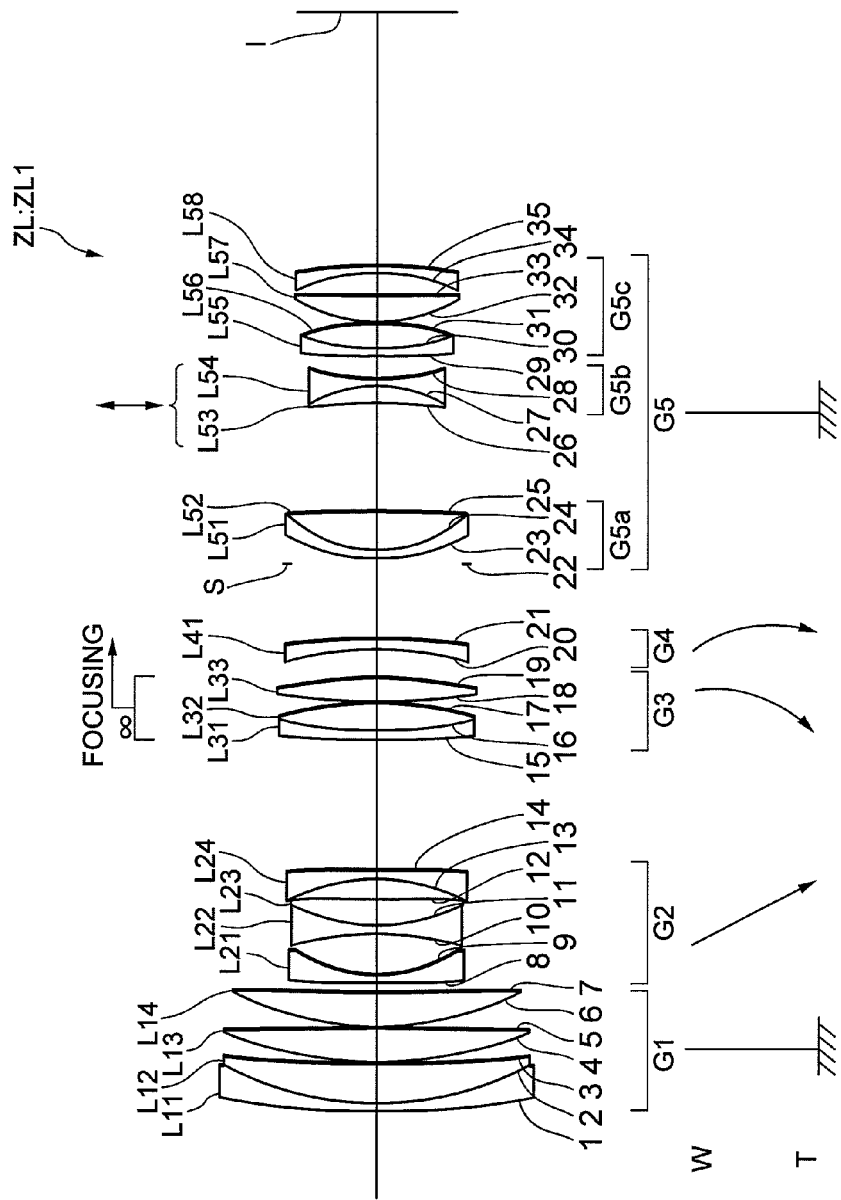
FIG. 1 is a sectional view showing a lens configuration of a zoom lens according to Example 1.

A preferred embodiment according to the present application is explained with reference to accompanying drawings. As shown in FIG. 1, a zoom lens ZL according to the present embodiment is composed of, in order from an object side, a first lens group G1 having positive refractive power, a second lens group G2 having negative refractive power, a third lens group G3 having positive refractive power, and a fourth lens group G4 having negative refractive power, and a fifth lens group G5 having positive refractive power. Upon zooming, the first lens group G1 and the fifth lens group G5 are preferably fixed. With this lens configuration, the zooming mechanism can be made simple, so that the lens barrel can be made compact. With fixing the first lens group G1 and the fifth lens group G5 in this manner, a total lens length of the zoom lens ZL can be constant.

Upon focusing, at least one lens group (the third lens group in the present embodiment) disposed between the second lens group G2 and the fifth lens group G5 is preferably moved as a focusing lens group Gf. Since the third lens group G3 has a small number of lenses and a small outer diameter, it is suitable for focusing. With this lens configuration, it becomes possible to carry out quick focusing. The total lens length does not vary upon focusing, so that excellent optical performance can be obtained even upon focusing on a close range object.

Moreover, at least one portion of the fifth lens group G5 is preferably moved as a vibration reduction lens group having a component substantially perpendicular to the optical axis. With this lens configuration, it becomes possible to carry out vibration reduction with a lens group having a small diameter, so that the vibration reduction mechanism can be compact and light to be able to make the lens barrel compact. Incidentally, a movement having a component substantially perpendicular to the optical axis includes a movement diagonal to the optical axis, and a fluctuation centering around a position on the optical axis other than a movement perpendicular to the optical axis.

In this instance, the fifth lens group G5 is composed of, in order from the object side, a first subgroup G5a having positive refractive power, a second subgroup G5b having negative refractive power, and a third subgroup G5c having positive refractive power, and the second subgroup G5b is preferably a vibration reduction lens group. With this lens configuration, it becomes possible to carry out vibration reduction with a lens group having the smallest diameter to be able to make the diameter of the lens barrel small.

Here, conditions for configuring the zoom lens ZL are explained. In the zoom lens ZL, when a focal length of the Gn lens group is denoted by fGn, and a focal length of the vibration reduction lens group is denoted by fVR, the following conditional expression (1) is preferably satisfied:

$$-3.5 < fGn/fVR < -0.8 \qquad (1).$$

In the present embodiment, the zoom lens is a five-lens-group configuration (n=5), which comprises a first lens group G1 to a fifth lens group G5, so that Gn lens group means the fifth lens group G5. The vibration reduction lens group is the second subgroup G5b composing the fifth lens group G5.

Conditional expression (1) defines an appropriate range of the focal length of the Gn lens group (the fifth lens group G5 with respect to the focal length of the vibration reduction lens group (the second subgroup G5b). When the ratio fGn/fVR is equal to or exceeds the upper limit of conditional expression (1), refractive power of the vibration reduction lens group becomes weak, so that the shift amount upon carrying out vibration reduction becomes large. Accordingly, an outer diameter of the lens barrel becomes large, so that it is undesirable. In order to secure the effect of the present embodiment, it is preferable to set the upper limit of conditional expression (1) to −1.0. On the other hand, when the ratio fGn/fVR is equal to or falls below the lower limit of conditional expression (1), power of the vibration reduction lens group becomes strong, so that lateral chromatic aberration becomes large. Moreover, distortion becomes large. In addition, deterioration in optical performance caused by manufacturing error becomes large, so that it is undesirable. In order to secure the effect of the present embodiment, it is preferable to set the lower limit of conditional expression (1) to −3.0.

In a zoom lens ZL according to the present embodiment, the following conditional expression (2) is preferably satisfied:

$$0.20 < |fGf/fGn| < 1.00 \qquad (2)$$

where fGf denotes a focal length of a focusing lens group Gf (the third lens group G3 in the present embodiment).

Conditional expression (2) defines an appropriate range of the focal length of the focusing lens group Gf (the third lens group G3 in the present embodiment) with respect to the focal length of the Gn lens group (the fifth lens group G5). When the value |fGf/fGn| is equal to or exceeds the upper limit of conditional expression (2), power of the focusing lens group Gf becomes weak, so that the moving amount of the focusing lens group Gf becomes large. Accordingly, the total length of the lens barrel becomes large, so that it is undesirable. In order to secure the effect of the present embodiment, it is preferable to set the upper limit of conditional expression (2) to 0.90. On the other hand, when the value |fGf/fGn| is equal to or falls below the lower limit of conditional expression (2), power of the focusing lens group Gf becomes strong, variation in spherical aberration in the telephoto end state and variation in the image plane in the wide-angle end state upon focusing become large, so that it is undesirable. In order to secure the effect of the present embodiment, it is preferable to set the lower limit of conditional expression (2) to 0.35.

In a zoom lens ZL according to the present embodiment, the following conditional expression (3) is preferably satisfied:

$$0.4 < |fGn|/ft < 1.0 \qquad (3)$$

where ft denotes a focal length of the zoom lens in the telephoto end state.

Conditional expression (3) defines an appropriate range of a focal length of the Gn lens group (the fifth lens group G5) with respect to a focal length of the zoom lens in the telephoto end state. When the ratio |fGn|/ft is equal to or exceeds the upper limit of conditional expression (3), power of the Gn lens group becomes weak, and the total lens length becomes large, so that it is undesirable. In order to secure the effect of the present embodiment, it is preferable to set the upper limit of conditional expression (3) to 0.8. On the other hand, when the ratio |fGn|/ft is equal to or falls below the lower limit of conditional expression (3), power of the Gn lens group becomes strong, so that it becomes difficult to correct spherical aberration and coma in the telephoto end state. Accordingly, it is undesirable. In order to secure the effect of the present embodiment, it is preferable to set the lower limit of conditional expression (3) to 0.5.

In a zoom lens according to the present embodiment, the following conditional expression (4) is preferably satisfied:

$$0.10 < |fVR|/fw < 1.90 \quad (4)$$

where fw denotes a focal length of the zoom lens in the wide-angle end state, and fVR denotes a focal length of the vibration reduction lens group (the second subgroup G5$b$ composing the fifth lens group G5).

Conditional expression (4) defines an appropriate range of a focal length of the vibration reduction lens group (the second subgroup G5$b$) with respect to a focal length of the zoom lens in the wide-angle end state. When the ratio |fVR|/fw is equal to or exceeds the upper limit of conditional expression (4), power of the vibration reduction lens group becomes weak, and a shift amount upon carrying out vibration reduction becomes large. Accordingly, the outer diameter of the lens barrel becomes large, so that it is undesirable. In order to secure the effect of the present embodiment, it is preferable to set the upper limit of conditional expression (4) to 1.20. On the other hand, when the ratio |fVR|/fw is equal to or falls below the lower limit of conditional expression (4), power of the vibration reduction lens group becomes strong, variation in inclination of the image plane in the wide-angle end state upon carrying out vibration reduction becomes large. Moreover, deterioration in optical performance caused by control error upon carrying out vibration reduction becomes large, so that it is undesirable. In order to secure the effect of the present embodiment, it is preferable to set the lower limit of conditional expression (4) to 0.50.

Figure 31:
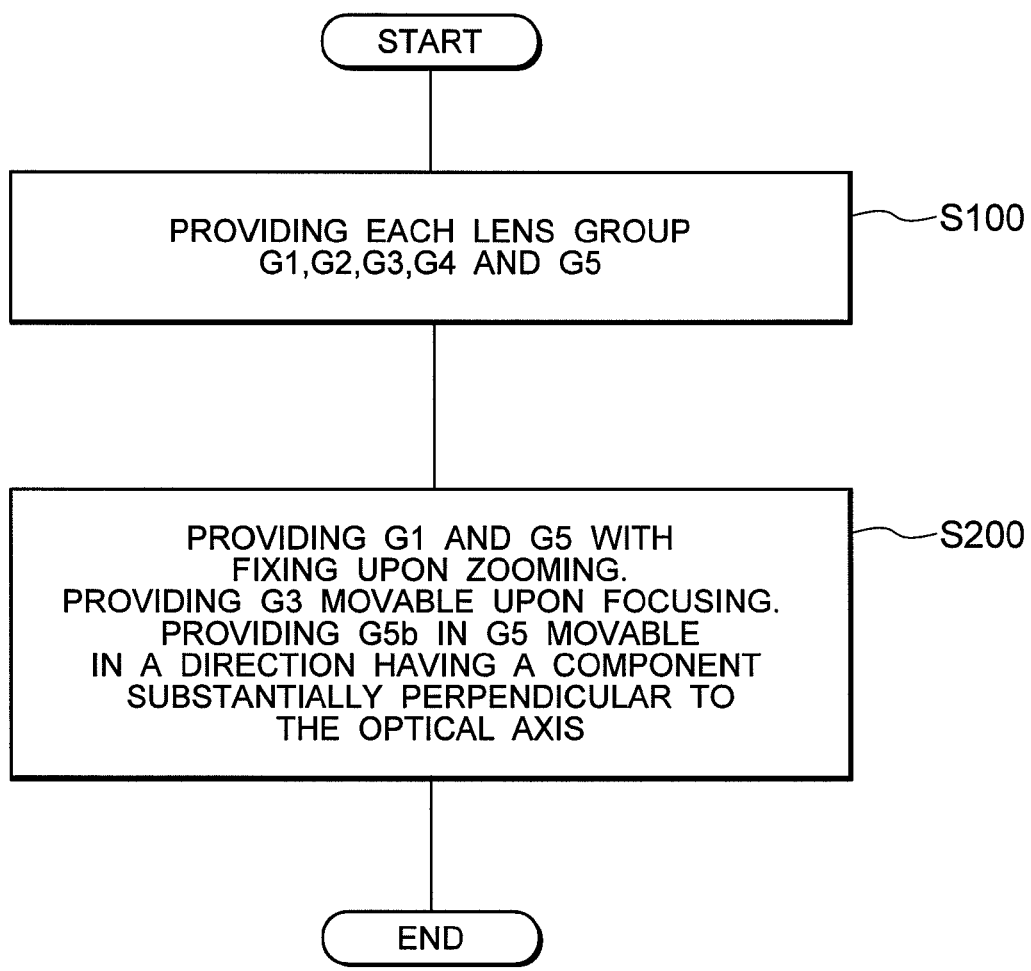
FIG. 31 is a flowchart schematically explaining a method for manufacturing the zoom lens according to the present embodiment.

An outline of a method for manufacturing a zoom lens ZL according to the present embodiment is explained below with reference to FIG. 31. At first, each lens is provided to prepare each lens group (Step S100). Specifically, in the present embodiment, the first lens group G1 is provided by disposing, in order from an object side, a cemented lens constructed by a negative meniscus lens L11 having a convex surface facing the object side cemented with a positive meniscus lens L12 having a convex surface facing the object side, a double convex positive lens L13, and a positive meniscus lens L14 having a convex surface facing the object side. The second lens group G2 is provided by disposing, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is provided by disposing, in order from the object side, a cemented lens constructed by a negative meniscus lens L31 having a convex surface facing the object side cemented with a double convex positive lens L32, and a double convex positive lens L33. The fourth lens group G4 is provided by disposing a negative meniscus lens L41 having a concave surface facing the object side. The fifth lens group G5 is provided by disposing, in order from the object side, a first subgroup G5$a$ composed of a cemented lens constructed by a negative meniscus lens L51 having a convex surface facing the object side cemented with a double convex positive lens L52, a second subgroup G5$b$ composed of a cemented lens constructed by a positive meniscus lens L53 having a concave surface facing the object side cemented with a double concave negative lens L54, and a third subgroup G5$c$ composed of a cemented lens constructed by a negative meniscus lens L55 having a convex surface facing the object side cemented with a double convex positive lens L56, a positive meniscus lens L57 having a convex surface facing the object side, and a negative meniscus lens L58 having a concave surface facing the object side. In this manner, a zoom lens ZL is manufactured by disposing each lens group.

In this case, the first lens group G1 and the fifth lens group G5 are fixed upon zooming, the third lens group G3 is movable as a focusing lens group Gf upon focusing, and the second subgroup G5$b$ is moved in a direction having a component substantially perpendicular to the optical axis (Step S200).

Then, a zoom lens ZL seen from another point of view according to the present embodiment is explained with reference to FIG. 1. As shown in FIG. 1, a zoom lens ZL seen from another point of view according to the present embodiment is composed of, in order from an object side, a first lens group G1 having positive refractive power, a second lens group G2 having negative refractive power, a third lens group G3 having positive refractive power, and a fourth lens group G4 having negative refractive power, and a fifth lens group G5 having positive refractive power. Upon zooming, the first lens group G1 and the fifth lens group G5 are preferably fixed. With this lens configuration, the zooming mechanism can be made simple, so that the lens barrel can be made compact. With fixing the first lens group G1 and the fifth lens group G5 in this manner, a total lens length of the zoom lens ZL can be constant.

Upon focusing, at least one lens group (the third lens group in the present embodiment) disposed between the second lens group G2 and the fifth lens group G5 is preferably moved as a focusing lens group Gf. Since the third lens group G3 has a small number of lenses and a small outer diameter, it is suitable for focusing. With this lens configuration, it becomes possible to carry out quick focusing. The total lens length does not vary upon focusing, so that excellent optical performance can be obtained even upon focusing on a close range object.

Moreover, at least one portion of the fifth lens group G5 is preferably moved as a vibration reduction lens group having a component substantially perpendicular to the optical axis. With this lens configuration, it becomes possible to carry out vibration reduction with a lens group having a small diameter, so that the vibration reduction mechanism can be compact and light to be able to make the lens barrel compact. Incidentally, a movement having a component substantially perpendicular to the optical axis includes a movement diagonal to the optical axis, and a fluctuation centering around a position on the optical axis other than a movement perpendicular to the optical axis.

In this case, the vibration reduction lens group preferably includes a plurality of lenses. With this lens configuration, it becomes possible to effectively correct decentering coma, inclination of image plane, and chromatic aberration upon carrying out vibration reduction.

In this instance, the fifth lens group G5 is composed of, in order from the object side, a first subgroup G5a having positive refractive power, a second subgroup G5b having negative refractive power, and a third subgroup G5c having positive refractive power, and the second subgroup G5b is preferably a vibration reduction lens group. With this lens configuration, it becomes possible to carry out vibration reduction with a lens group having the smallest diameter to be able to make the diameter of the lens barrel small.

Here, conditions for configuring the zoom lens ZL seen from another point of view are explained. In the zoom lens ZL seen from another point of view, when a focal length of the Gn lens group is denoted by fGn, and a focal length of the vibration reduction lens group is denoted by fVR, the following conditional expression (1) is preferably satisfied:

$$-3.50 < fGn/fVR < -0.80 \quad (1).$$

In the present embodiment, the zoom lens is a five-lens-group configuration (n=5), which comprises a first lens group G1 to a fifth lens group G5, so that Gn lens group means the fifth lens group G5. The vibration reduction lens group is the second subgroup G5b composing the fifth lens group G5.

Conditional expression (1) defines an appropriate range of the focal length of the Gn lens group (the fifth lens group G5 with respect to the focal length of the vibration reduction lens group (the second subgroup G5b), however, conditional expression (1) has already been explained above, so that duplicated explanations are omitted.

In a zoom lens ZL seen from another point of view according to the present embodiment, the following conditional expression (2) is preferably satisfied:

$$0.20 < |fGf/fGn| < 1.00 \quad (2)$$

where fGf denotes a focal length of a focusing lens group Gf (the third lens group G3 in the present embodiment).

Conditional expression (2) defines an appropriate range of the focal length of the focusing lens group Gf (the third lens group G3 in the present embodiment) with respect to the focal length of the Gn lens group (the fifth lens group G5). However, conditional expression (2) has already been explained above, so that duplicated explanations are omitted.

In a zoom lens ZL seen from another point of view according to the present embodiment, the following conditional expression (3) is preferably satisfied:

$$0.40 < |fGn|/ft < 1.00 \quad (3)$$

where ft denotes a focal length of the zoom lens in the telephoto end state.

Conditional expression (3) defines an appropriate range of a focal length of the Gn lens group (the fifth lens group G5) with respect to a focal length of the zoom lens in the telephoto end state. However, conditional expression (3) has already been explained above, so that duplicated explanations are omitted.

In a zoom lens seen from another point of view according to the present embodiment, the following conditional expression (4) is preferably satisfied:

$$0.10 < |fVR|/fw < 1.90 \quad (4)$$

where fw denotes a focal length of the zoom lens in the wide-angle end state, and fVR denotes a focal length of the vibration reduction lens group (the second subgroup G5b composing the fifth lens group G5).

Conditional expression (4) defines an appropriate range of a focal length of the vibration reduction lens group (the second subgroup G5b) with respect to a focal length of the zoom lens in the wide-angle end state. However, conditional expression (4) has already been explained above, so that duplicated explanations are omitted.

An outline of a method for manufacturing a zoom lens ZL seen from another point of view according to the present embodiment is explained below with reference to FIG. 32. At first, each lens is provided to prepare each lens group (Step S300). Specifically, in the present embodiment, the first lens group G1 is provided by disposing, in order from an object side, a cemented lens constructed by a negative meniscus lens L11 having a convex surface facing the object side cemented with a positive meniscus lens L12 having a convex surface facing the object side, a double convex positive lens L13, and a positive meniscus lens L14 having a convex surface facing the object side. The second lens group G2 is provided by disposing, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is provided by disposing, in order from the object side, a cemented lens constructed by a negative meniscus lens L31 having a convex surface facing the object side cemented with a double convex positive lens L32, and a double convex positive lens L33. The fourth lens group G4 is provided by disposing a negative meniscus lens L41 having a concave surface facing the object side. The fifth lens group G5 is provided by disposing, in order from the object side, a first subgroup G5a composed of a cemented lens constructed by a negative meniscus lens L51 having a convex surface facing the object side cemented with a double convex positive lens L52, a second subgroup G5b composed of a cemented lens constructed by a positive meniscus lens L53 having a concave surface facing the object side cemented with a double concave negative lens L54, and a third subgroup G5c composed of a cemented lens constructed by a negative meniscus lens L55 having a convex surface facing the object side cemented with a double convex positive lens L56, a positive meniscus lens L57 having a convex surface facing the object side, and a negative meniscus lens L58 having a concave surface facing the object side. In this manner, a zoom lens ZL is manufactured by disposing each lens group.

In this case, the first lens group G1 and the fifth lens group G5 are fixed upon zooming, the third lens group G3 is movable as a focusing lens group Gf upon focusing, and the second subgroup G5b is moved in a direction having a component perpendicular to the optical axis (Step S400).

In this instance, the second subgroup G5b, which is a vibration reduction lens group, is disposed with including a plurality of lenses (Step S500).

A zoom lens ZL seen from still another point of view according to the present embodiment is explained with reference to accompanying drawings. As shown in FIG. 1, a zoom lens ZL seen from still another point of view according to the present embodiment is composed of, in order from an object side, a first lens group G1 having positive refractive power, a second lens group G2 having negative refractive power, a third lens group G3 having positive refractive power, and a fourth lens group G4 having negative refractive power, and a fifth lens group G5 having positive refractive power. Upon zooming, the first lens group G1 and the fifth lens group G5 are preferably fixed. With this lens configuration, the zooming mechanism can be made simple, so that the lens barrel can be made compact. With fixing the first lens group G1 and the fifth lens group G5 in this manner, a total lens length of the zoom lens ZL can be constant.

Upon focusing, at least one lens group (the third lens group in the present embodiment) disposed between the second lens group G2 and the fifth lens group G5 is preferably moved as a focusing lens group Gf. Since the third lens group G3 has a small number of lenses and a small outer diameter, it is suitable for focusing. With this lens configuration, it becomes possible to carry out quick focusing. The total lens length does not vary upon focusing, so that excellent optical performance can be obtained even upon focusing on a close range object.

Moreover, at least one portion of the fifth lens group G5 is preferably moved as a vibration reduction lens group having a component substantially perpendicular to the optical axis. With this lens configuration, it becomes possible to carry out vibration reduction with a lens group having a small diameter, so that the vibration reduction mechanism can be compact and light to be able to make the lens barrel compact. Incidentally, a movement having a component substantially perpendicular to the optical axis includes a movement diagonal to the optical axis, and a fluctuation centering around a position on the optical axis other than a movement perpendicular to the optical axis.

In this instance, the fifth lens group G5 is composed of, in order from the object side, a first subgroup G5a having positive refractive power, a second subgroup G5b having negative refractive power, and a third subgroup G5c having positive refractive power, and the second subgroup G5b is preferably a vibration reduction lens group. With this lens configuration, it becomes possible to carry out vibration reduction with a lens group having the smallest diameter to be able to make the diameter of the lens barrel small.

Here, conditions for configuring the zoom lens ZL seen from still another point of view are explained. In the zoom lens ZL seen from still another point of view, when a focal length of the Gn lens group is denoted by fGn, and a focal length of the zoom lens ZL seen from still another point of view in the wide-angle end state is denoted by fw, the following conditional expression (5) is preferably satisfied:

$$1.38 < fGn/fw < 1.95 \qquad (5).$$

In the present embodiment, the zoom lens is a five-lens-group configuration (n=5), which comprises a first lens group G1 to a fifth lens group G5, so that Gn lens group means the fifth lens group G5. Conditional expression (5) defines an appropriate range of the focal length of the Gn lens group (the fifth lens group G5) with respect to the focal length of the zoom lens in the wide-angle end state. When the ratio fGn/fw is equal to or exceeds the upper limit of conditional expression (5), power of the Gn lens group becomes weak, and the total lens length becomes long, so that it is undesirable. In order to secure the effect of the present embodiment, it is preferable to set the upper limit of conditional expression (5) to 1.80. On the other hand, when the ratio fGn/fw is equal to or falls below the lower limit of conditional expression (5), power of the Gn lens group becomes strong, so that it becomes difficult to correct distortion, curvature of field, astigmatism in the wide-angle end state. Accordingly, it is undesirable. In order to secure the effect of the present embodiment, it is preferable to set the lower limit of conditional expression (5) to 1.45.

In a zoom lens ZL seen from still another point of view, the following conditional expression (2) is preferably satisfied:

$$0.20 < |fGf/fGn| < 1.00 \qquad (2)$$

where fGf denotes a focal length of a focusing lens group Gf (the third lens group G3 in the present embodiment).

Conditional expression (2) defines an appropriate range of the focal length of the focusing lens group Gf (the third lens group G3 in the present embodiment) with respect to the focal length of the Gn lens group (the fifth lens group G5). However, conditional expression (2) has already been explained above, so that duplicated explanations are omitted.

In a zoom lens ZL seen from still another point of view, the following conditional expression (1) is preferably satisfied:

$$-3.50 < fGn/fVR < -0.80 \qquad (1)$$

where fVR denotes a focal length of the vibration reduction lens group (the second subgroup G5b composing the fifth lens group G5 in the present embodiment).

Conditional expression (1) defines an appropriate range of the focal length of the Gn lens group (the fifth lens group G5 with respect to the focal length of the vibration reduction lens group (the second subgroup G5b). However, conditional expression (1) has already been explained above, so that duplicated explanations are omitted.

In a zoom lens ZL seen from still another point of view, the following conditional expression (3) is preferably satisfied:

$$0.40 < |fGn|/ft < 1.00 \qquad (3)$$

where ft denotes a focal length of the zoom lens in the telephoto end state.

Conditional expression (3) defines an appropriate range of a focal length of the Gn lens group (the fifth lens group G5) with respect to a focal length of the zoom lens in the telephoto end state. However, conditional expression (3) has already been explained above, so that duplicated explanations are omitted.

In a zoom lens ZL seen from still another point of view, the following conditional expression (4) is preferably satisfied:

$$0.10 < |fVR|/fw < 1.90 \qquad (4)$$

where fw denotes a focal length of the zoom lens in the wide-angle end state, and fVR denotes a focal length of the vibration reduction lens group (the second subgroup G5b composing the fifth lens group G5).

Conditional expression (4) defines an appropriate range of a focal length of the vibration reduction lens group (the second subgroup G5b) with respect to a focal length of the zoom lens in the wide-angle end state. However, conditional expression (4) has already been explained above, so that duplicated explanations are omitted.

In a zoom lens ZL seen from still another point of view, the following conditional expression (6) is preferably satisfied:

$$0.10 < |fVR|/ft < 1.00 \qquad (6)$$

where fVR denotes a focal length of the vibration reduction lens group (the second subgroup G5b composing the fifth lens group G5).

Conditional expression (6) defines an appropriate range of the focal length of the vibration reduction lens group (the second subgroup G5b) with respect to the focal length of the zoom lens in the telephoto end state. When the ratio |fVR|/ft is equal to or exceeds the upper limit of conditional expression (6), power of the vibration reduction lens group becomes weak, so that the shift amount upon carrying out vibration reduction becomes large. As a result, the outer diameter of the lens barrel becomes large, so that it is undesirable. In order to secure the effect of the present embodiment, it is preferable to set the upper limit of conditional expression (6) to 0.75. On the other hand, when the ratio |fVR|/ft is equal to or falls below the lower limit of conditional expression (6), power of the vibration reduction lens group becomes strong, decentering coma in the telephoto end state upon carrying out vibration reduction becomes large. Accordingly, the number of lenses composing the vibration reduction lens group has to be large resulting in increase in the weight, so that it is undesirable. In order to secure the effect of the present embodiment, it is preferable to set the lower limit of conditional expression (6) to 0.15.

In a zoom lens ZL seen from still another point of view, the following conditional expression (7) is preferably satisfied:

$$0.10 < |fn/fGn| < 0.40 \qquad (7)$$

where fn denotes a focal length of a lens group disposed to the most object side among lens groups having negative refractive power (the second lens group G2 in the present embodiment).

Conditional expression (7) defines an appropriate range of the focal length of the lens group (the second lens group G2) with respect to the focal length of the Gn lens group (the fifth lens group G5).

When the ratio |fn/fGn| is equal to or exceeds the upper limit of conditional expression (7), power of the lens group having negative refractive power becomes weak, so that off-axis aberrations such as coma, and curvature of field become under-correction. Moreover, the moving amount upon zooming becomes large, so that the total length of the lens barrel becomes large. Accordingly, it is undesirable. In order to secured the effect of the present embodiment, it is preferable to set the upper limit of conditional expression (7) to 0.30. On the other hand, when the ratio |fn/fGn| is equal to or falls below the lower limit of conditional expression (7), power of the lens group having negative refractive power becomes strong, so that off-axis aberrations such as coma, and curvature of field become large. Accordingly, it is undesired. In order to secure the effect of the present embodiment, it is preferable to set the lower limit of conditional expression (7) to 0.18.

Then, an outline of a method for manufacturing a zoom lens ZL seen from still another point of view according to the present embodiment is explained below with reference to FIG. 33. At first, each lens is provided to prepare each lens group (Step S600). Specifically, in the present embodiment, the first lens group G1 is provided by disposing, in order from an object side, a cemented lens constructed by a negative meniscus lens L11 having a convex surface facing the object side cemented with a positive meniscus lens L12 having a convex surface facing the object side, a double convex positive lens L13, and a positive meniscus lens L14 having a convex surface facing the object side. The second lens group G2 is provided by disposing, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is provided by disposing, in order from the object side, a cemented lens constructed by a negative meniscus lens L31 having a convex surface facing the object side cemented with a double convex positive lens L32, and a double convex positive lens L33. The fourth lens group G4 is provided by disposing a negative meniscus lens L41 having a concave surface facing the object side. The fifth lens group G5 is provided by disposing, in order from the object side, a first subgroup G5a composed of a cemented lens constructed by a negative meniscus lens L51 having a convex surface facing the object side cemented with a double convex positive lens L52, a second subgroup G5b composed of a cemented lens constructed by a positive meniscus lens L53 having a concave surface facing the object side cemented with a double concave negative lens L54, and a third subgroup G5c composed of a cemented lens constructed by a negative meniscus lens L55 having a convex surface facing the object side cemented with a double convex positive lens L56, a positive meniscus lens L57 having a convex surface facing the object side, and a negative meniscus lens L58 having a concave surface facing the object side. In this manner, a zoom lens ZL is manufactured by disposing each lens group.

In this case, the first lens group G1 and the fifth lens group G5 are fixed upon zooming, the third lens group G3 is movable as a focusing lens group Gf upon focusing, and the second subgroup G5b is moved in a direction having a component substantially perpendicular to the optical axis (Step S700).

In this instance, each lens group is disposed with satisfying the above stated conditional expression (5) (Step S800).

Each example according to the present application is explained below with reference to accompanying drawings. In FIGS. 1, 6, 11, 16, 21 and 26, power distribution and movement of each lens group with respect to variation in the focal length state from a wide-angle end state (W) to a telephoto end state (T) of respective zoom lenses ZL are shown. As shown in FIGS. 1, 6, 11, 21 and 26, the zoom lens ZL according to any of Examples 1 through 3, 5 and 6 corresponding to a first invention is composed of, in order from an object side, a first lens group G1 having positive refractive power, a second lens group G2 having negative refractive power, a third lens group G3 having positive refractive power, a fourth lens group G4 having negative refractive power, and a fifth lens group having positive refractive power. The fifth lens group G5 is composed of, in order from the object side, a first subgroup G5a having positive refractive power, a second subgroup G5b having negative refractive power, and a third subgroup having positive refractive power. Upon zooming from the wide-angle end state to the telephoto end state, the first lens group G1 and the fifth lens group G5 are fixed. Upon focusing from a far object to a near object, the third lens group G3 or the fourth lens group G4 is moved along the optical axis. Vibration reduction is carried out by moving the second subgroup G5b in the fifth lens group G5 in a direction including a component substantially perpendicular to the optical axis.

As shown in FIG. 16, a zoom lens ZL according to Example 4 corresponding to a second invention is composed of, in order from an object side, a first lens group G1 having positive refractive power, a second lens group G2 having negative refractive power, a third lens group G3 having positive refractive power, and a fourth lens group G4 having positive refractive power. The first lens group G1 is composed of, in order from the object side, a front sub lens group G1a having positive refractive power, and a rear sub lens group G1b having positive refractive power. The fourth lens group G4 is composed of, in order from the object side, a first subgroup G4a having positive refractive power, a second subgroup G4b having negative refractive power, and a third subgroup G4c having positive refractive power. Upon zooming from the wide-angle end state to the telephoto end state, the front sub lens group G1a and the fourth lens group G4 are fixed. Focusing from a far object to a near object is carried out by moving the third lens group G3 along the optical axis. Vibration reduction is carried out by moving the second subgroup G4b in the fourth lens group G4 in a direction including a component substantially perpendicular to the optical axis.

EXAMPLE 1

The zoom lens ZL seen in FIG. 1 shows a configuration of a zoom lens ZL1 having a five-lens-group configuration. In the zoom lens ZL1, the first lens group G1 is composed of, in order from an object, a cemented lens constructed by a negative meniscus lens L11 having a convex surface facing the object side cemented with a positive meniscus lens L12 having a convex surface facing the object side, a double convex positive lens L13, and a positive meniscus lens L14 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is composed of, in order from the object side, a cemented lens constructed by a negative meniscus lens L31 having a convex surface facing the object side cemented with a double convex positive lens L32, and a double convex positive lens L33. The fourth lens group is composed of a negative meniscus lens L41 having a concave surface facing the object side. In the fifth lens group G5, the first subgroup G5a is composed of, in order from the object side, a cemented lens constructed by a negative meniscus lens L51 having a convex surface facing the object side cemented with a double convex positive lens L52. The second subgroup G5b is composed of, in order from the object side, a cemented lens constructed by a positive meniscus lens L53 having a concave surface facing the object side cemented with a double concave negative lens L54. The third subgroup G5c is composed of, in order from the object side, a cemented lens constructed by a negative meniscus lens L55 having a convex surface facing the object side cemented with a double convex positive lens L56, a positive meniscus lens L57 having a convex surface facing the object side, and a negative meniscus lens L58 having a concave surface facing the object side. An aperture stop S is disposed to the most object side of the fifth lens group and included in the first subgroup G5a.

In a lens system having a focal length of f, and a vibration coefficient (a ratio of a moving amount of an image on the image plane to a moving amount of a vibration reduction lens group) of K, in order to correct a rotational camera shake of θ degree, the vibration reduction lens group should be moved a moving amount of (f·tan θ)/K (this relation is the same as the following examples). In Example 1, in the wide-angle end stat, the vibration reduction coefficient is 1.20, the focal length is 71.4 mm, so that in order to correct a rotational camera shake of 0.40 degrees, the moving amount of the second subgroup G5b is 0.42 mm. In Example 1, in the intermediate focal length state, the vibration reduction coefficient is 1.20, the focal length is 135.0 mm, so that in order to correct a rotational camera shake of 0.30 degrees, the moving amount of the second subgroup G5b is 0.59 mm. In Example 1, in the telephoto end state, the vibration reduction coefficient is 1.20, the focal length is 196.0 mm, so that in order to correct a rotational camera shake of 0.30 degrees, the moving amount of the second subgroup G5b is 0.86 mm.

Various values associated with Example 1 are listed in Table 1. In [Specifications], W denotes wide-angle end state, M denotes intermediate focal length state, T denotes telephoto end state, f denotes a focal length, FNO denotes an f-number, ω denotes a half angle of view. In [Lens Data], the left most column "i" shows the surface number counted in order from the object side, the second column "r" shows a radius of curvature of the surface, the third column "d" shows a distance to the next surface, the fourth column "vd" shows an Abbe number at d-line (wavelength λ=587.6 nm), and the fifth column "nd" shows a refractive index at d-line (wavelength λ=587.6 nm). In the fifth column "nd" the refractive index of the air nd=1.000000 is omitted. In the second column "r", r=0.0000 denotes a plane surface. In the third column "d", BF denotes a back focal length which is a distance along the optical axis between the last lens surface and the image plane I. In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

In [Lens Group Data], "I" denotes a start surface number of the lens group.

In Example 1, a distance d1 along the optical axis between the first lens group G1 and the second lens group G2, a distance d2 along the optical axis between the second lens group G2 and the third lens group G3, a distance d3 along the optical axis between the third lens group G3 and the fourth lens group G4, and a distance d4 along the optical axis between the fourth lens group G4 and the fifth lens group G5 are varied upon zooming. In [Variable Distances], variable distances, Bf and TL (total lens length) with respect to the wide-angle end state, the intermediate focal length state, and the telephoto end state are shown.

In [Values for Conditional Expressions], values for conditional expressions are shown. In Example 1, fGn denotes a focal length of the fifth lens group G5, and fGf denotes a focal length of the focusing lens group Gf, which is the third lens group G3. The explanation of the symbol is the same in the following Examples unless other wise stated.

TABLE 1

| [Specifications] | | | |
|---|---|---|---|
| | W | M | T |
| f = | 71.40 | 135.00 | 196.00 |
| FNO = | 2.90 | 2.90 | 2.90 |
| ω = | 17.12° | 8.94° | 6.14° |

| [Lens Data] | | | | |
|---|---|---|---|---|
| i | r | d | nd | vd |
| 1 | 207.2519 | 2.0000 | 32.35 | 1.850260 |
| 2 | 77.5141 | 9.5000 | 82.52 | 1.497820 |
| 3 | 461.0795 | 0.1000 | | |
| 4 | 96.8810 | 8.0000 | 82.52 | 1.497820 |
| 5 | −2446.3946 | 0.1000 | | |
| 6 | 74.8396 | 8.0000 | 65.46 | 1.603001 |
| 7 | 635.5296 | (d1) | | |
| 8 | 301.7367 | 2.2000 | 42.72 | 1.834807 |
| 9 | 35.0104 | 9.1179 | | |
| 10 | −83.6050 | 2.0000 | 70.41 | 1.487490 |
| 11 | 42.3925 | 6.0000 | 23.78 | 1.846660 |
| 12 | 647.2222 | 4.5999 | | |
| 13 | −49.2733 | 2.2000 | 65.46 | 1.603001 |
| 14 | −2747.7138 | (d2) | | |
| 15 | 350.7655 | 2.0000 | 28.46 | 1.728250 |
| 16 | 91.4253 | 6.5000 | 65.46 | 1.603001 |
| 17 | −94.5881 | 0.1000 | | |
| 18 | 143.9361 | 5.5000 | 65.46 | 1.603001 |
| 19 | −132.9507 | (d3) | | |
| 20 | −84.4304 | 2.5000 | 52.31 | 1.754999 |
| 21 | −211.8686 | (d4) | | |
| 22 | 0.0000 | 1.0000 | Aperture Stop S | |
| 23 | 44.5401 | 2.0000 | 32.35 | 1.850260 |
| 24 | 30.5381 | 9.0000 | 65.46 | 1.603001 |
| 25 | −8165.2768 | 25.0000 | | |
| 26 | −197.5962 | 4.0000 | 32.35 | 1.850260 |
| 27 | −34.4924 | 2.0000 | 54.66 | 1.729157 |

TABLE 1-continued

| | | | | |
|---|---|---|---|---|
| 28 | 47.2773 | 5.0000 | | |
| 29 | 147.5802 | 2.0000 | 32.35 | 1.850260 |
| 30 | 52.0642 | 6.0000 | 82.52 | 1.497820 |
| 31 | −60.9696 | 0.1000 | | |
| 32 | 37.8007 | 6.0000 | 82.52 | 1.497820 |
| 33 | 394.5473 | 5.0000 | | |
| 34 | −47.6819 | 2.0000 | 44.88 | 1.639300 |
| 35 | −113.6656 | (Bf) | | |

[Lens Group Data]

| Group | focal length |
|---|---|
| G1 | 92.254 |
| G2 | −28.021 |
| G3 | 64.313 |
| G4 | −187.499 |
| G5 | 111.815 |

[Variable Distances]

| | W | M | T |
|---|---|---|---|
| d1 | 2.000 | 23.001 | 30.816 |
| d2 | 29.816 | 15.626 | 2.943 |
| d3 | 6.617 | 14.919 | 19.787 |
| d4 | 17.113 | 2.000 | 2.000 |
| Bf | 58.166 | 58.166 | 58.166 |
| TL | 253.180 | 253.180 | 253.180 |

[Values for Conditional Expressions]

(1) fGn/fVR = −1.827
(2) |fGf/fGn| = 0.575
(3) |fGn|/ft = 0.570
(4) |fVR|/fw = 0.857
(5) fGn/fw = 1.566
(6) |fVR|/ft = 0.312
(7) |fn/fGn| = 0.251

Figure 2A:
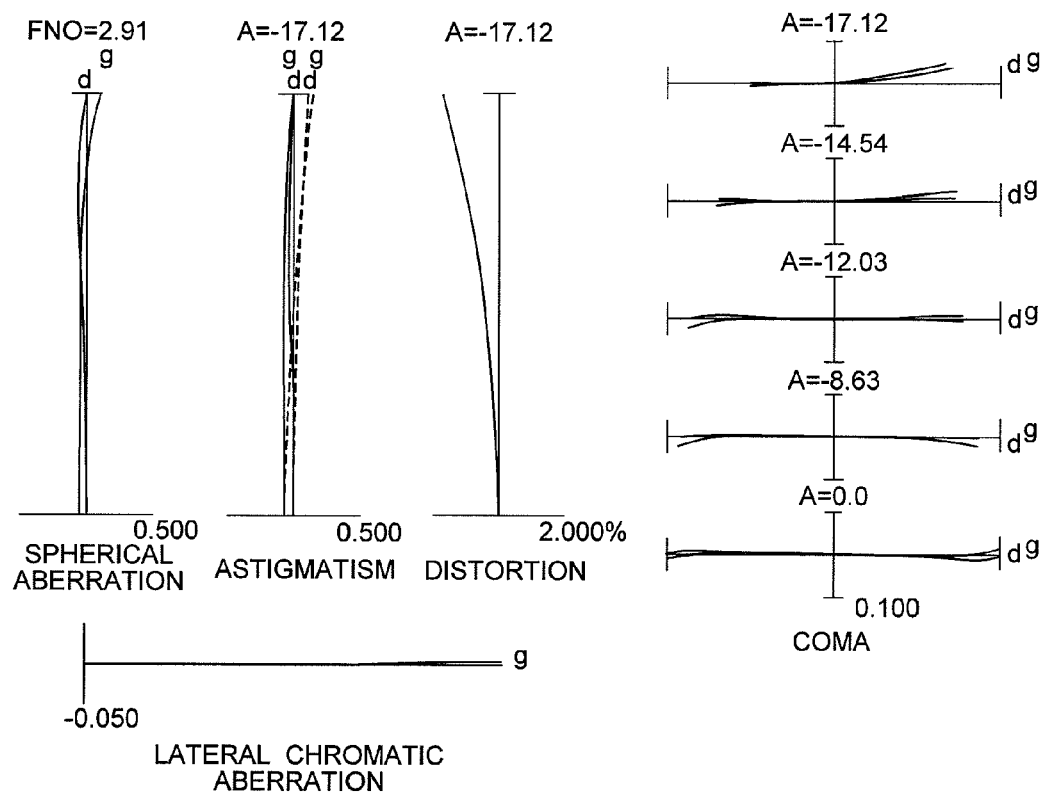
Figure 2B:
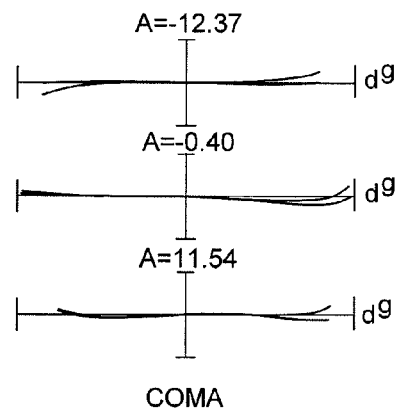
Figure 3A:
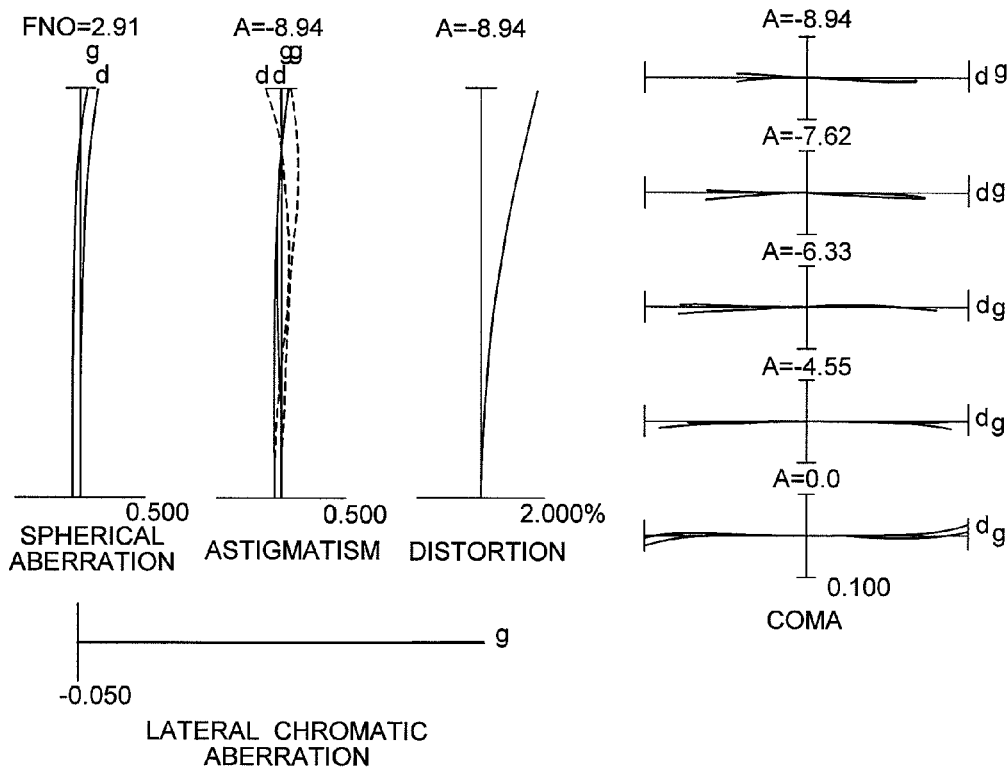
Figure 3B:
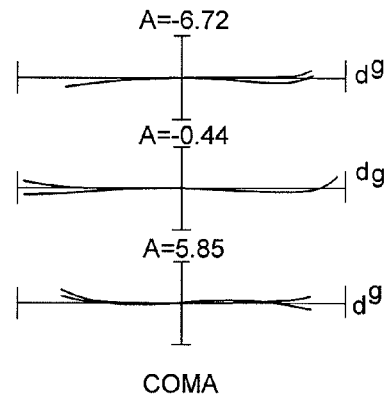
Figure 4A:
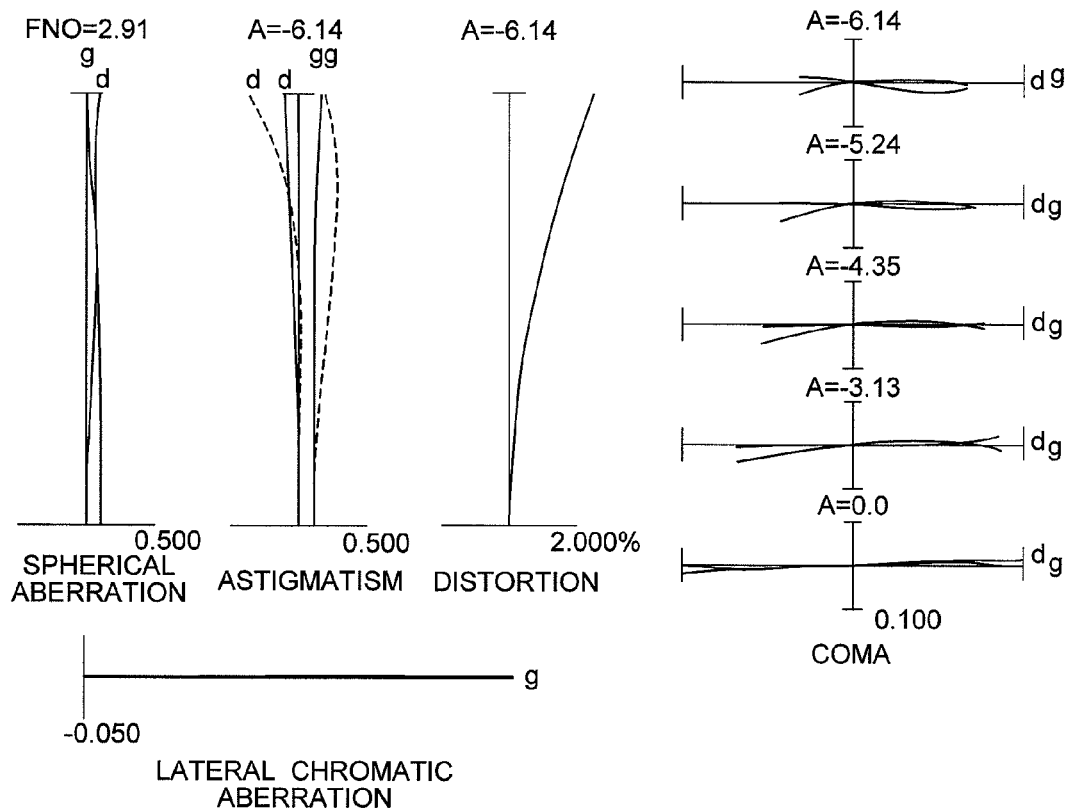
Figure 4B:
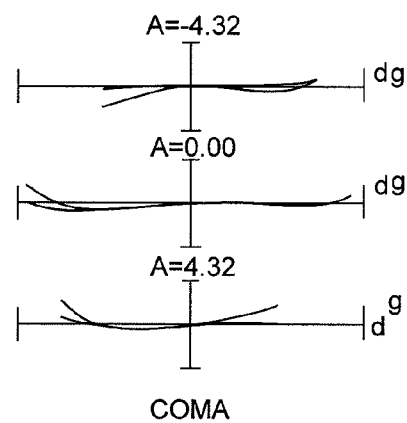

FIGS. 2A, and 2B are graphs showing various aberrations of the zoom lens according to Example 1 in a wide-angle end state focusing on infinity, in which FIG. 2A shows various aberrations without vibration reduction, and FIG. 2B shows coma upon carrying out vibration reduction with respect to a rotational camera shake of 0.4 degrees. FIGS. 3A, and 3B are graphs showing various aberrations of the zoom lens according to Example 1 in an intermediate focal length state focusing on infinity, in which FIG. 3A shows various aberrations without vibration reduction, and FIG. 3B shows coma upon carrying out vibration reduction with respect to a rotational camera shake of 0.3 degrees. FIGS. 4A, and 4B are graphs showing various aberrations of the zoom lens according to Example 1 in a telephoto end state focusing on infinity, in which FIG. 4A shows various aberrations without vibration reduction, and FIG. 4B shows coma upon carrying out vibration reduction with respect to a rotational camera shake of 0.3 degrees. FIGS. 5A, 5B and 5C are graphs showing various aberrations of the zoom lens according to Example 1 upon focusing on a close range object, in which FIG. 5A is in the wide-angle end state, FIG. 5B is in the intermediate focal length state, and FIG. 5C is in the telephoto end state.

In respective graphs, FNO denotes an f-number, A denotes a half angle of view, Y denotes an image height, HO denotes an object height, d denotes d-line (wavelength λ=587.6 nm), and g denotes g-line (wavelength λ=435.6 nm). In the graph showing astigmatism, a solid line indicates a sagittal image plane, and a broken line indicates a meridional image plane. The above-described explanations regarding various aberration graphs are the same as the other Examples. As is apparent from the respective graphs, the zoom lens according to Example 1 shows superb optical performance as a result of good corrections to various aberrations from the wide-angle end state through the telephoto end state.

EXAMPLE 2

Figure 6:
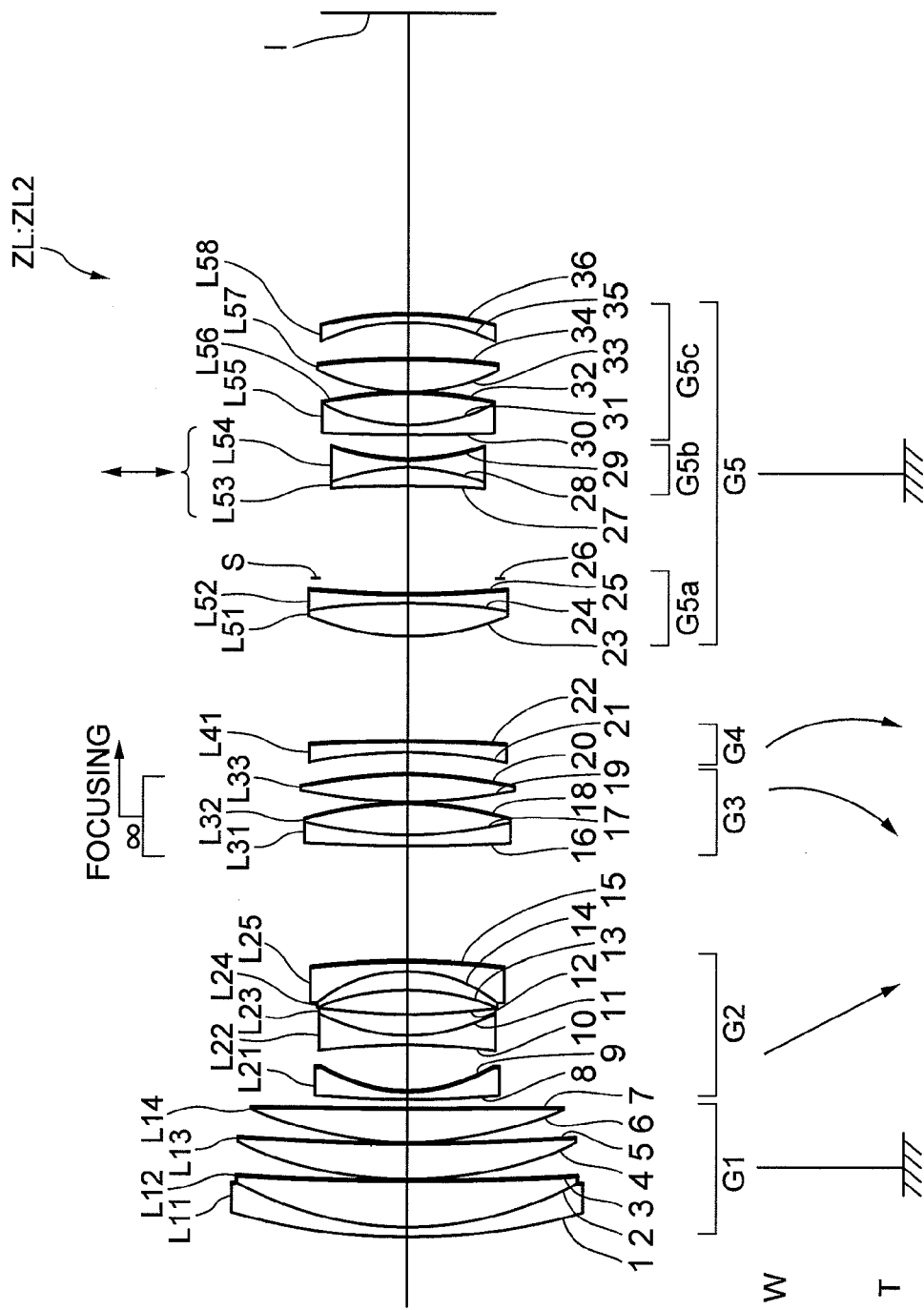
FIG. 6 is a sectional view showing a lens configuration of a zoom lens according to Example 2.

FIG. 6 is a sectional view showing a lens configuration of a zoom lens ZL2 according to Example 2 and shows a five-lens-group configuration where n=5. In the zoom lens ZL2 shown in FIG. 6, the first lens group G1 is composed of, in order from an object side, a cemented lens constructed by a negative meniscus lens L11 having a convex surface facing the object side cemented with a positive meniscus lens L12 having a convex surface facing the object side, a positive meniscus lens L13 having a convex surface facing the object side, and a positive meniscus lens L14 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a cemented lens constructed by a positive meniscus lens L24 having a concave surface facing the object side cemented with a negative meniscus lens L25 having a concave surface facing the object side. The third lens group G3 is composed of, in order from the object side, a cemented lens constructed by a negative meniscus lens L31 having a convex surface facing the object side cemented with a double convex positive lens L32, and a double convex positive lens L33. The fourth lens group G4 is composed of a negative meniscus lens L41 having a concave surface facing the object side. In the fifth lens group G5, the first subgroup G5a is composed of, in order from the object side, a cemented lens constructed by a double convex positive lens L51 cemented with a double concave negative lens L52, the second subgroup G5b is composed of a cemented lens constructed by a positive meniscus lens L53 having a concave surface facing the object side cemented with a double concave negative lens L54, and the third subgroup G5c is composed of, in order from the object side, a cemented lens constructed by a negative meniscus lens L55 having a convex surface facing the object side cemented with a double convex positive lens L56, a double convex positive lens L57, and a negative meniscus lens L58 having a concave surface facing the object side. An aperture stop S is disposed between the first subgroup G5a and the second subgroup G5b, and is disposed to the most image side of the first subgroup G5a.

In Example 2, in the wide-angle end state, the vibration reduction coefficient is 1.00, the focal length is 71.4 mm, so that in order to correct a rotational camera shake of 0.40 degrees, the moving amount of the second subgroup G5b is 0.50 mm. In Example 2, in the intermediate focal length stat, the vibration reduction coefficient is 1.00, the focal length is 135.0 mm, so that in order to correct a rotational camera shake of 0.30 degrees, the moving amount of the second subgroup G5b is 0.71 mm. In Example 2, in the telephoto end stat, the vibration reduction coefficient is 1.00, the focal length is 196.0 mm, so that in order to correct a rotational camera shake of 0.30 degrees, the moving amount of the second subgroup G5b is 1.03 mm Various values associated with Example 2 are listed in Table 2.

TABLE 2

[Specifications]

| | W | M | T |
|---|---|---|---|
| f = | 71.40 | 135.00 | 196.00 |
| FNO = | 2.90 | 2.90 | 2.90 |
| ω = | 17.09° | 8.94° | 6.14° |

[Lens Data]

| i | r | d | nd | νd |
|---|---|---|---|---|
| 1 | 138.9420 | 2.0000 | 32.35 | 1.850260 |
| 2 | 74.8515 | 10.0000 | 82.52 | 1.497820 |
| 3 | 499.1083 | 0.1000 | | |
| 4 | 86.7613 | 8.0000 | 82.52 | 1.497820 |
| 5 | 437.0393 | 0.1000 | | |
| 6 | 84.2569 | 7.0000 | 82.52 | 1.497820 |
| 7 | 938.7139 | (d1) | | |
| 8 | 384.1157 | 2.0000 | 40.94 | 1.806100 |
| 9 | 35.6165 | 9.6847 | | |
| 10 | −131.1744 | 2.0000 | 70.41 | 1.487490 |
| 11 | 42.3484 | 4.5000 | 23.78 | 1.846660 |
| 12 | 163.1687 | 5.0588 | | |
| 13 | −53.5772 | 4.0000 | 22.76 | 1.808095 |
| 14 | −32.5969 | 2.0000 | 42.72 | 1.834807 |
| 15 | −234.9579 | (d2) | | |
| 16 | 510.9139 | 2.0000 | 32.35 | 1.850260 |
| 17 | 86.7071 | 7.0000 | 65.46 | 1.603001 |
| 18 | −83.2647 | 0.1000 | | |
| 19 | 103.7337 | 6.0000 | 65.46 | 1.603001 |
| 20 | −116.8560 | (d3) | | |
| 21 | −103.1415 | 2.5000 | 42.72 | 1.834807 |
| 22 | −342.0133 | (d4) | | |
| 23 | 58.8589 | 7.0000 | 42.72 | 1.834807 |
| 24 | −140.2358 | 2.0000 | 23.78 | 1.846660 |
| 25 | 198.9539 | 3.0000 | | |
| 26 | 0.0000 | 20.0000 | Aperture Stop S | |
| 27 | −183.3956 | 4.0000 | 23.78 | 1.846660 |
| 28 | −45.0249 | 2.0000 | 41.96 | 1.667551 |
| 29 | 57.8421 | 5.0000 | | |
| 30 | 383.3560 | 2.0000 | 50.23 | 1.719995 |
| 31 | 39.1251 | 7.0000 | 82.52 | 1.497820 |
| 32 | −82.1158 | 0.1000 | | |
| 33 | 45.2987 | 7.0000 | 82.52 | 1.497820 |
| 34 | −153.4974 | 7.5493 | | |
| 35 | −47.9028 | 2.0000 | 32.35 | 1.850260 |
| 36 | −82.5403 | (Bf) | | |

[Lens Group Data]

| Group | focal length |
|---|---|
| G1 | 98.419 |
| G2 | −26.611 |
| G3 | 59.321 |
| G4 | −177.745 |
| G5 | 114.057 |

[Variable Distances]

| | W | M | T |
|---|---|---|---|
| d1 | 2.000 | 25.437 | 33.995 |
| d2 | 24.330 | 12.566 | 2.000 |
| d3 | 4.668 | 10.865 | 14.953 |
| d4 | 21.950 | 4.080 | 2.000 |
| Bf | 63.539 | 63.539 | 63.539 |
| TL | 259.180 | 259.180 | 259.180 |

[Values for Conditional Expressions]

(1) fGn/fVR = −1.399
(2) |fGf/fGn| = 0.520
(3) |fGn|/ft = 0.582
(4) |fVR|/fw = 1.142
(5) fGn/fw = 1.597
(6) |fVR|/ft = 0.416
(7) |fn/fGn| = 0.233

Figure 7A:
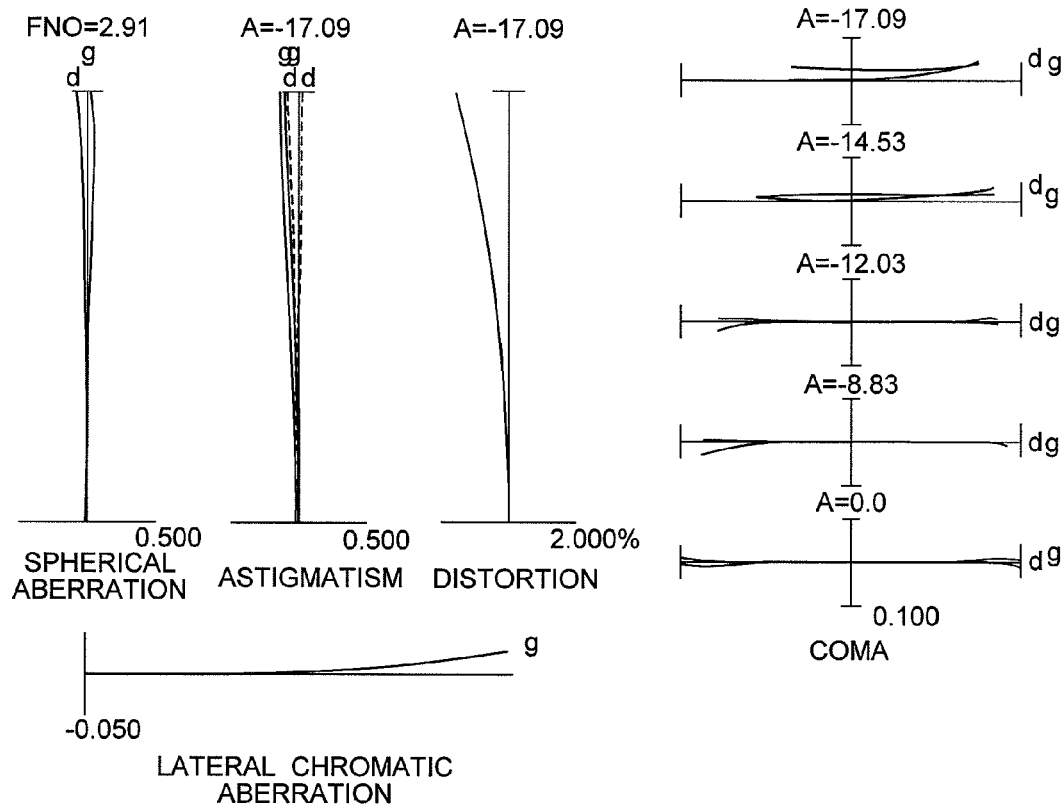
Figure 7B:
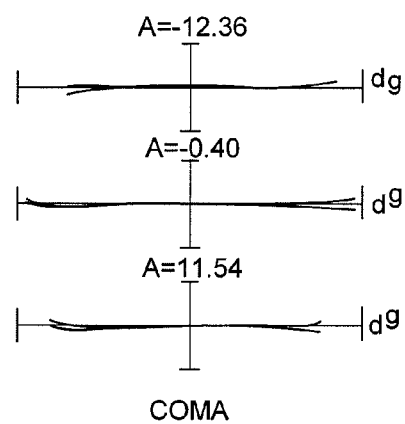
Figure 8A:
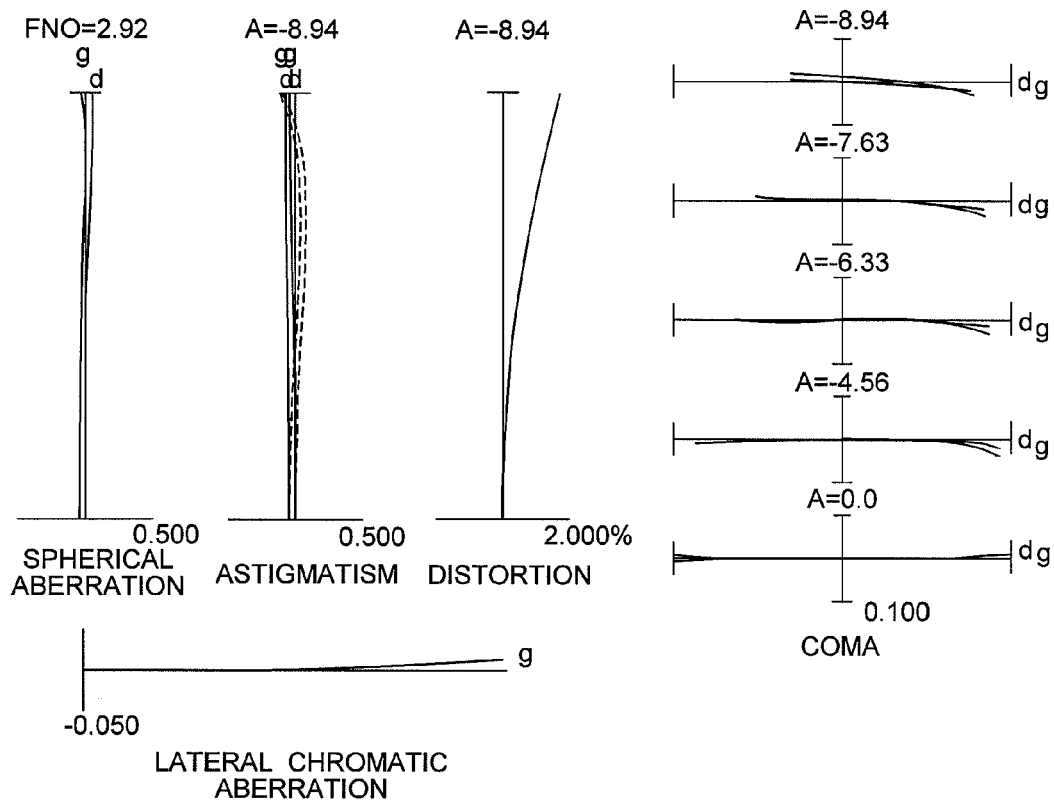
Figure 8B:
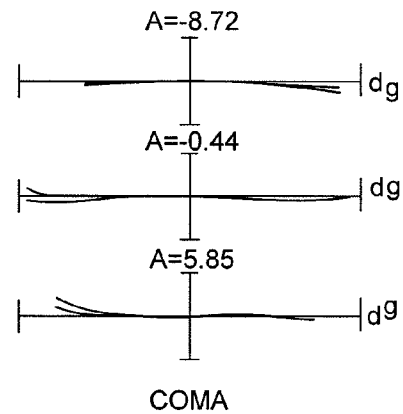
Figure 9A:
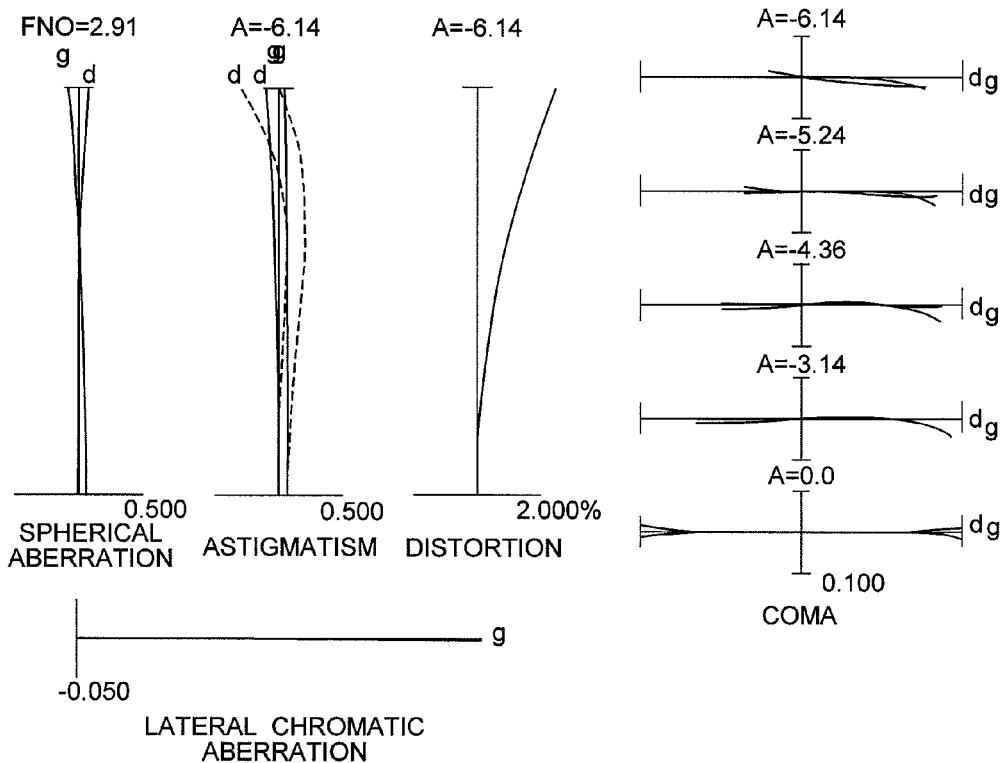
Figure 9B:
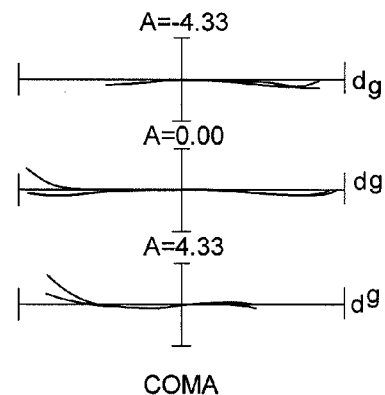
Figure 10A:
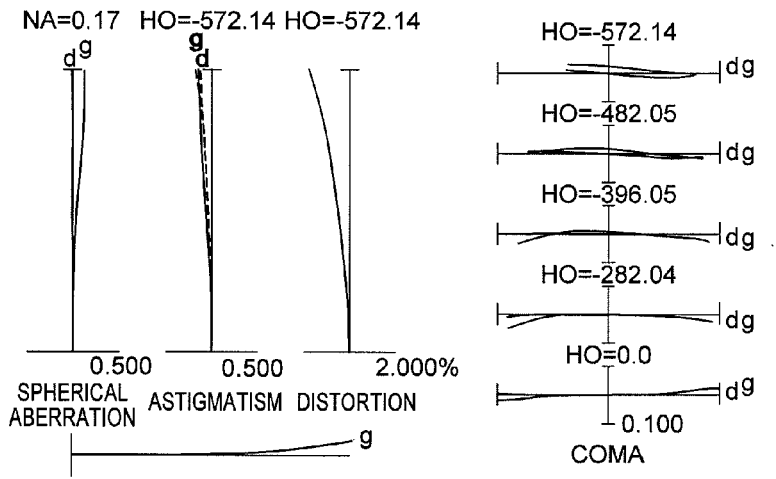
Figure 10B:
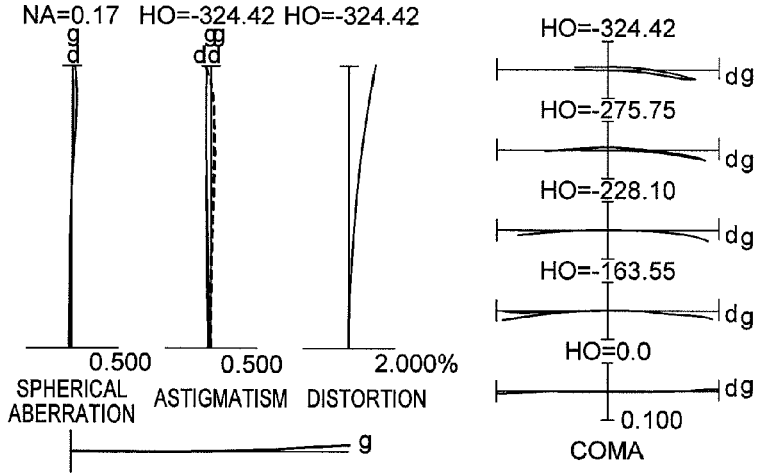
Figure 10C:
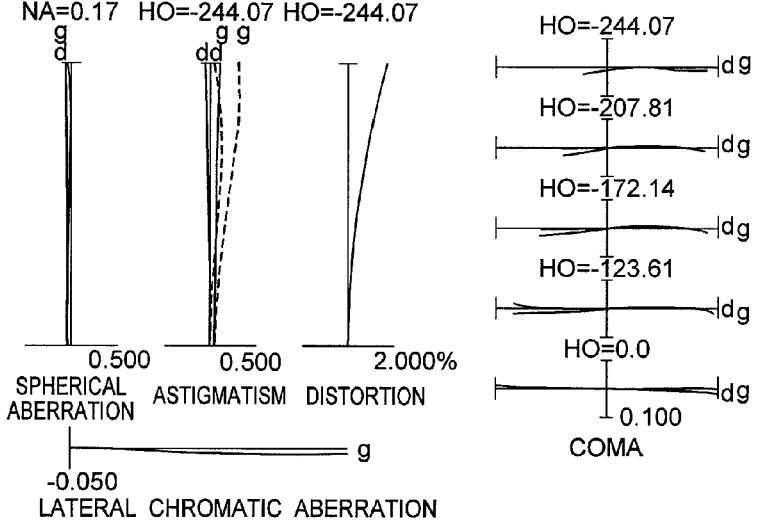

FIGS. 7A, and 7B are graphs showing various aberrations of the zoom lens according to Example 2 in a wide-angle end state focusing on infinity, in which FIG. 7A shows various aberrations without vibration reduction, and FIG. 7B shows coma upon carrying out vibration reduction with respect to a rotational camera shake of 0.4 degrees. FIGS. 8A, and 8B are graphs showing various aberrations of the zoom lens according to Example 2 in an intermediate focal length state focusing on infinity, in which FIG. 8A shows various aberrations without vibration reduction, and FIG. 8B shows coma upon carrying out vibration reduction with respect to a rotational camera shake of 0.3 degrees. FIGS. 9A, and 9B are graphs showing various aberrations of the zoom lens according to Example 2 in a telephoto end state focusing on infinity, in which FIG. 9A shows various aberrations without vibration reduction, and FIG. 9B shows coma upon carrying out vibration reduction with respect to a rotational camera shake of 0.3 degrees. FIGS. 10A, 10B and 10C are graphs showing various aberrations of the zoom lens according to Example 2 upon focusing on a close range object, in which FIG. 10A is in the wide-angle end state, FIG. 10B is in the intermediate focal length state, and FIG. 10C is in the telephoto end state. As is apparent from the respective graphs, the zoom lens according to Example 2 shows superb optical performance as a result of good corrections to various aberrations from the wide-angle end state through the telephoto end state.

EXAMPLE 3

Figure 11:
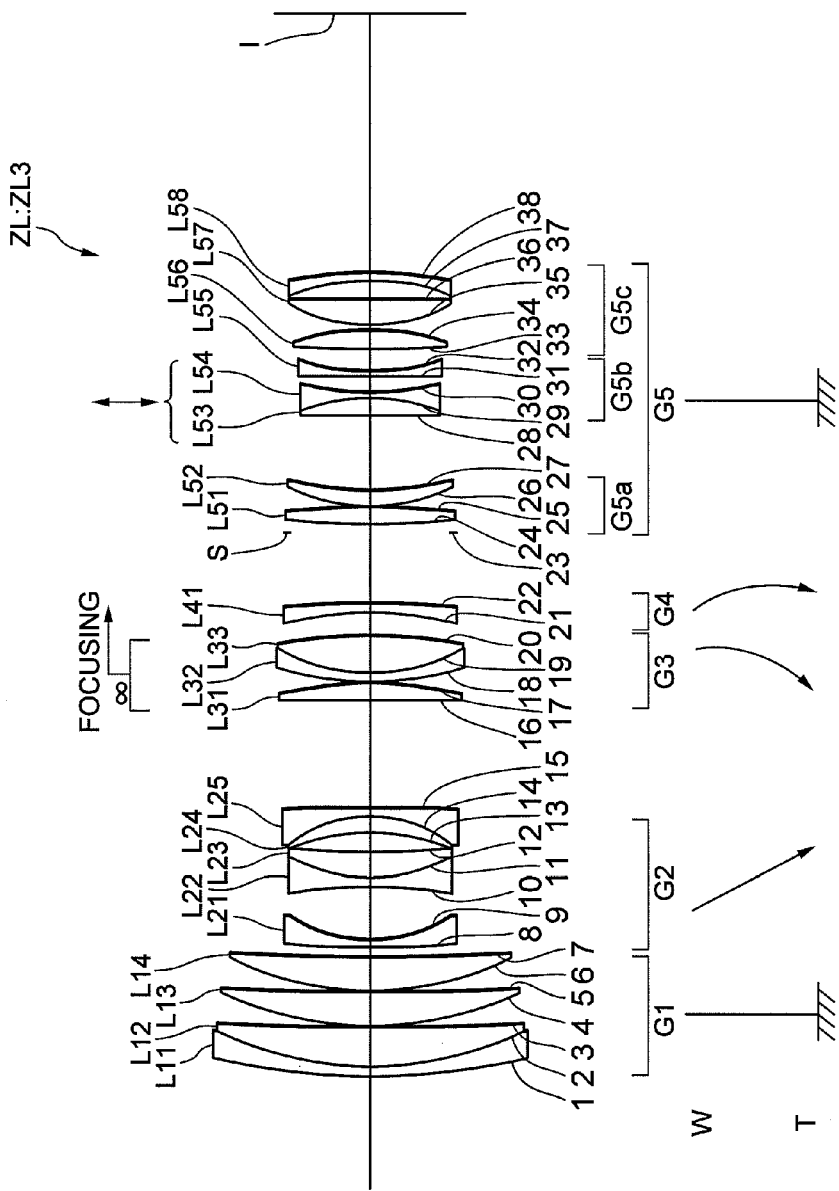
FIG. 11 is a sectional view showing a lens configuration of a zoom lens according to Example 3.

FIG. 11 is a sectional view showing a lens configuration of a zoom lens ZL3 according to Example 3 and shows a five-lens-group configuration where n=5. In the zoom lens ZL3 shown in FIG. 11, the first lens group G1 is composed of, in order from an object side, a cemented lens constructed by a negative meniscus lens L11 having a convex surface facing the object side cemented with a positive meniscus lens L12 having a convex surface facing the object side, a positive meniscus lens L13 having a convex surface facing the object side, and a positive meniscus lens L14 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a cemented lens constructed by a positive meniscus lens L24 having a concave surface facing the object side cemented with a negative meniscus lens L25 having a concave surface facing the object side. The third lens group G3 is composed of, in order from the object side, a positive meniscus lens L31 having a concave surface facing the object side, and a cemented lens constructed by a negative meniscus lens L32 having a convex surface facing the object side cemented with a double convex positive lens L33. The fourth lens group G4 is composed of a negative meniscus lens L41 having a concave surface facing the object side. In the fifth lens group G5, the first subgroup G5a is composed of, in order from the object side, a double convex positive lens L51 and a positive meniscus lens L52 having a convex surface facing the object side, the second subgroup G5b is composed of, in order from the object side, a cemented lens constructed by a positive meniscus lens L53 having a concave surface facing the object side cemented with a double concave negative lens L54, and a negative meniscus lens L55 having a convex surface facing the object side, and the third subgroup G5c is composed of, in order from the object side, a double convex positive lens L56, a double convex positive lens L57, and a negative meniscus lens L58 having a concave surface facing the object side. An aperture stop S is disposed to the most object side of the fifth lens group G5, and included in the first subgroup G5a.

In Example 3, in the wide-angle end state, the vibration reduction coefficient is 1.30, the focal length is 71.4 mm, so that in order to correct a rotational camera shake of 0.40 degrees, the moving amount of the second subgroup G5b is 0.38 mm. In Example 3, in the intermediate focal length state, the vibration reduction coefficient is 1.30, the focal length is 135.0 mm, so that in order to correct a rotational camera shake of 0.30 degrees, the moving amount of the second subgroup G5b is 0.54 mm. In Example 3, in the telephoto end stat, the vibration reduction coefficient is 1.30, the focal length is 196.0 mm, so that in order to correct a rotational camera shake of 0.30 degrees, the moving amount of the second subgroup G5b is 0.79 mm Various values associated with Example 3 are listed in Table 3.

TABLE 3

[Specifications]

|  | W | M | T |
|---|---|---|---|
| f = | 71.40 | 135.00 | 196.00 |
| FNO = | 2.90 | 2.90 | 2.90 |
| ω = | 16.97° | 8.90° | 6.12° |

[Lens Data]

| i | r | d | nd | vd |
|---|---|---|---|---|
| 1 | 150.1075 | 2.2000 | 28.69 | 1.795041 |
| 2 | 77.1608 | 9.5000 | 82.52 | 1.497820 |
| 3 | 756.3684 | 0.1000 | | |
| 4 | 82.5453 | 8.0000 | 82.52 | 1.497820 |
| 5 | 581.7849 | 0.0000 | | |
| 6 | 73.1642 | 8.0000 | 82.52 | 1.497820 |
| 7 | 427.5813 | (d1) | | |
| 8 | 214.3299 | 2.0000 | 42.72 | 1.834807 |
| 9 | 33.7853 | 12.1976 | | |
| 10 | −109.2380 | 2.0000 | 82.52 | 1.497820 |
| 11 | 39.0214 | 6.0000 | 23.78 | 1.846660 |
| 12 | 220.3271 | 4.2950 | | |
| 13 | −55.0435 | 4.0000 | 25.68 | 1.784723 |
| 14 | −31.3217 | 2.0000 | 42.72 | 1.834807 |
| 15 | −1128.7256 | (d2) | | |
| 16 | −4413.9629 | 4.0000 | 37.95 | 1.723420 |
| 17 | −90.7104 | 0.1000 | | |
| 18 | 74.5140 | 2.0000 | 22.79 | 1.808090 |
| 19 | 42.9390 | 9.0000 | 65.46 | 1.603001 |
| 20 | −133.3513 | (d3) | | |
| 21 | −90.0000 | 2.5000 | 23.78 | 1.846660 |
| 22 | −222.6096 | (d4) | | |
| 23 | 0.0000 | 2.0000 | Aperture Stop S | |
| 24 | 181.5274 | 4.0000 | 82.52 | 1.497820 |
| 25 | −226.9093 | 0.1000 | | |
| 26 | 42.1406 | 4.0000 | 82.52 | 1.497820 |
| 27 | 81.5898 | 17.0000 | | |
| 28 | −5404.9164 | 4.0000 | 28.46 | 1.728250 |
| 29 | −46.9905 | 1.6000 | 53.71 | 1.579570 |
| 30 | 64.5686 | 3.5000 | | |
| 31 | 1040.8030 | 1.6000 | 55.52 | 1.696797 |
| 32 | 57.6196 | 5.0000 | | |
| 33 | 329.9937 | 4.5000 | 82.52 | 1.497820 |
| 34 | −56.0769 | 1.1857 | | |
| 35 | 41.0985 | 6.0000 | 82.52 | 1.497820 |
| 36 | −1567.9225 | 4.0871 | | |
| 37 | −49.0618 | 2.0000 | 23.78 | 1.846660 |
| 38 | −109.7403 | (Bf) | | |

[Lens Group Data]

| Group | focal length |
|---|---|
| G1 | 87.956 |
| G2 | −24.084 |

TABLE 3-continued

| G3 | 55.399 |
|---|---|
| G4 | −180.000 |
| G5 | 110.905 |

[Variable Distances]

|  | W | M | T |
|---|---|---|---|
| d1 | 2.089 | 21.088 | 27.934 |
| d2 | 24.923 | 12.762 | 2.000 |
| d3 | 5.167 | 11.520 | 15.477 |
| d4 | 16.232 | 3.041 | 3.000 |
| Bf | 60.304 | 60.304 | 60.304 |
| TL | 247.180 | 247.180 | 247.180 |

[Values for Conditional Expressions]

(1) fGn/fVR = −1.953
(2) |fGf/fGn| = 0.500
(3) |fGn|/ft = 0.566
(4) |fVR|/fw = 0.795
(5) fGn/fw = 1.553
(6) |fVR|/ft = 0.290
(7) |fn/fGn| = 0.217

Figure 12A:
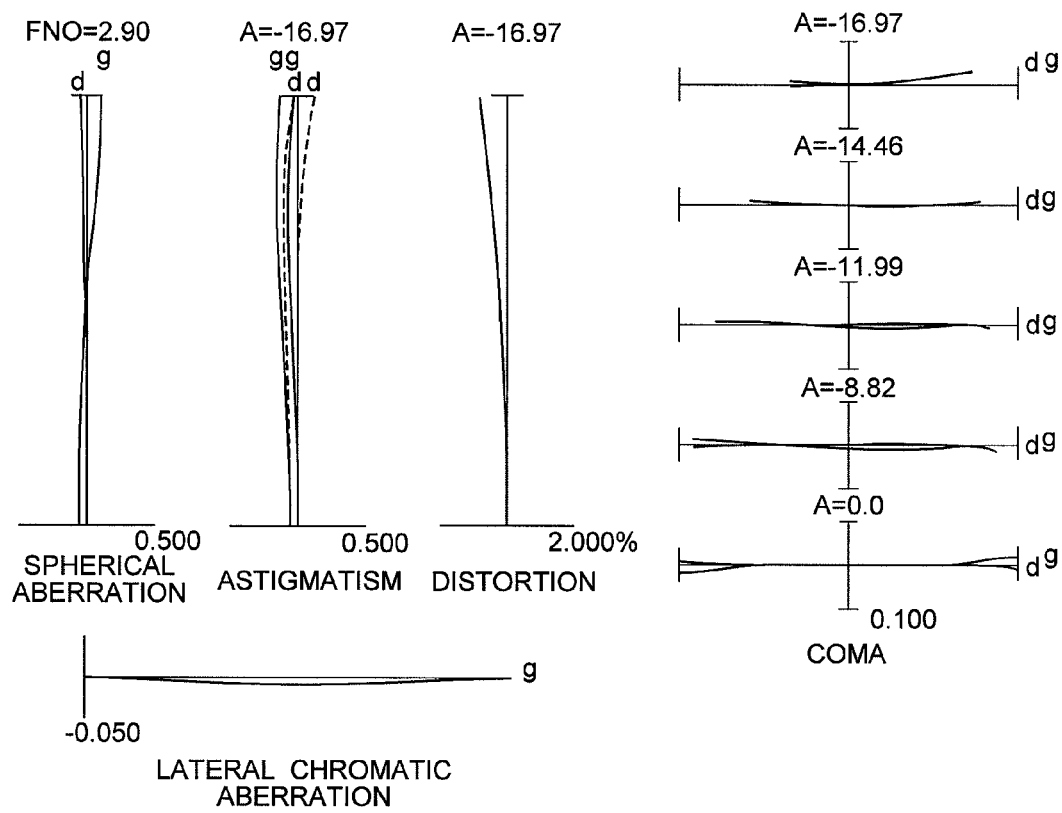
Figure 12B:
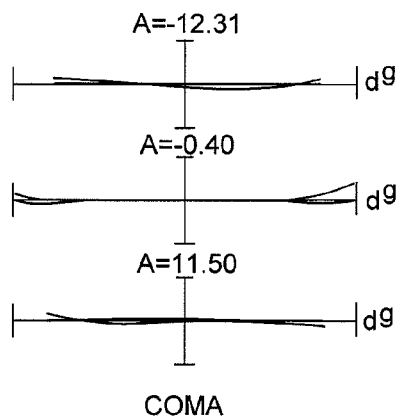
Figure 13A:
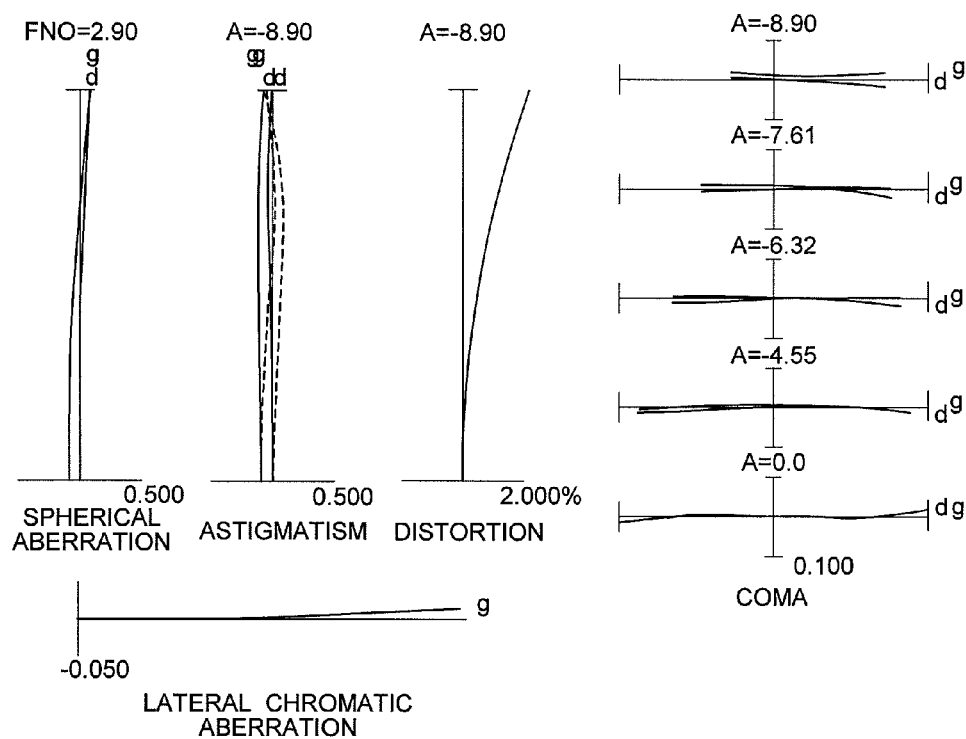
Figure 13B:
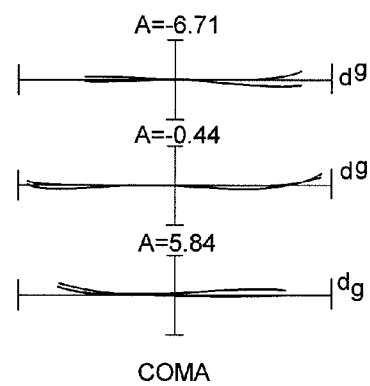
Figure 14A:
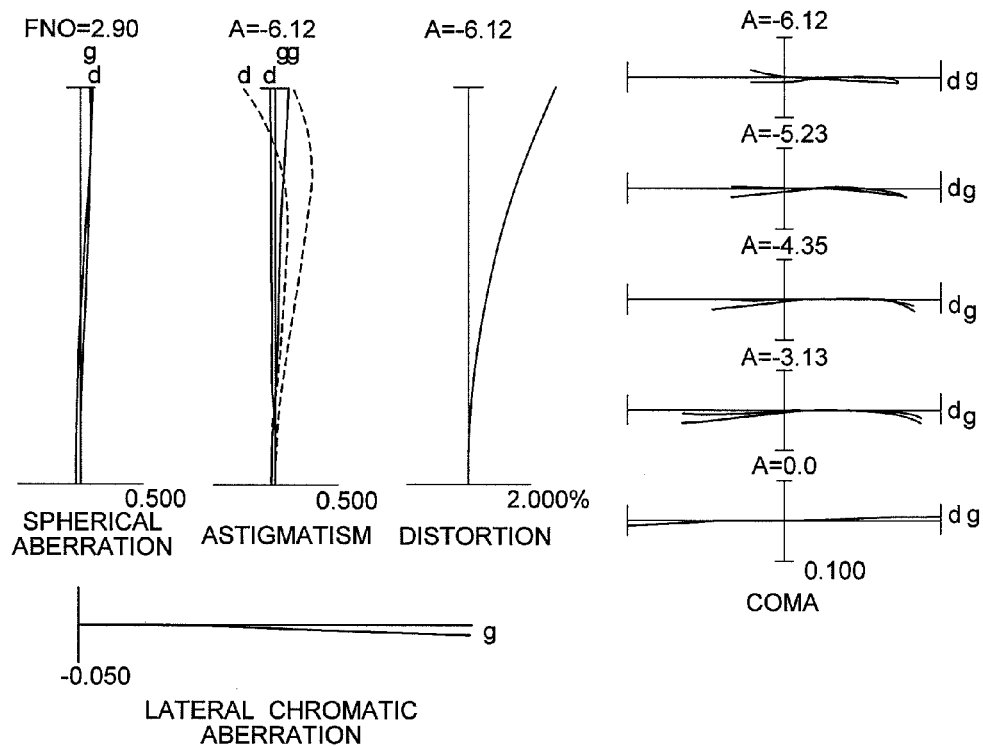
Figure 14B:
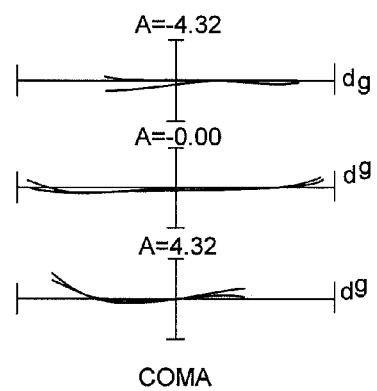
Figure 15A:
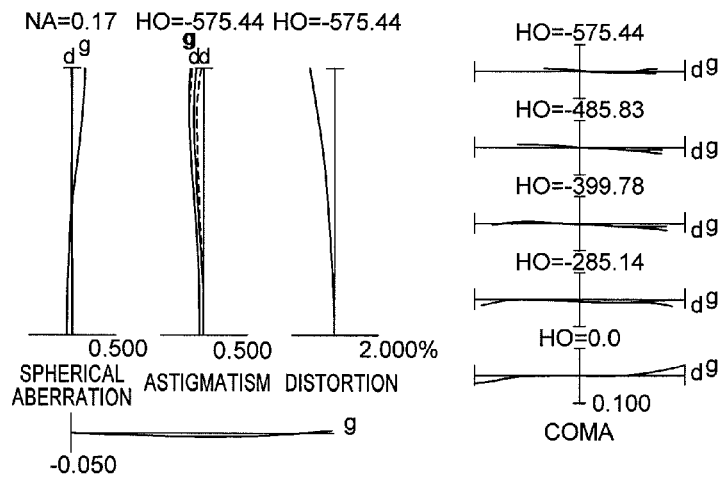
Figure 15B:
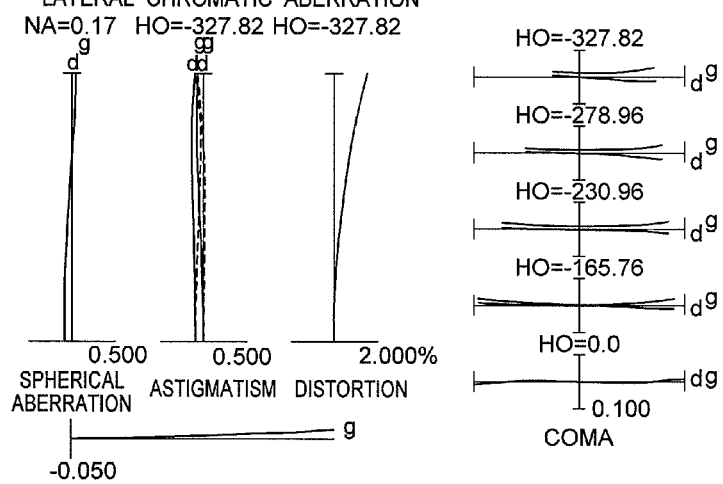
Figure 15C:
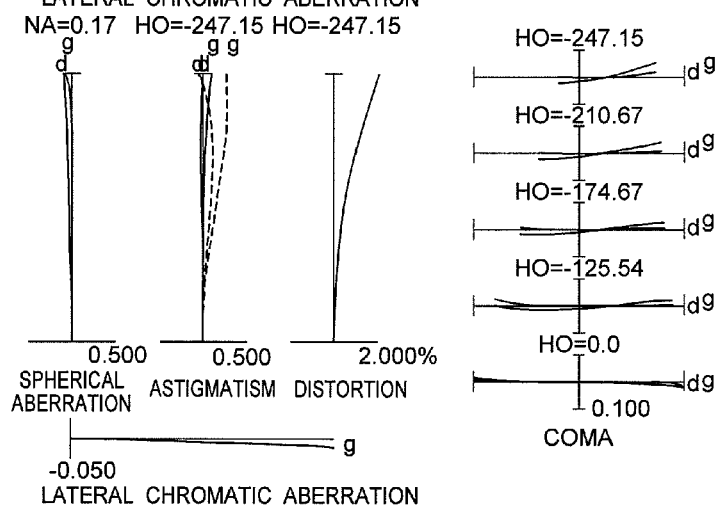

FIGS. 12A, and 12B are graphs showing various aberrations of the zoom lens according to Example 3 in a wide-angle end state focusing on infinity, in which FIG. 12A shows various aberrations without vibration reduction, and FIG. 12B shows coma upon carrying out vibration reduction with respect to a rotational camera shake of 0.4 degrees. FIGS. 13A, and 13B are graphs showing various aberrations of the zoom lens according to Example 3 in an intermediate focal length state focusing on infinity, in which FIG. 13A shows various aberrations without vibration reduction, and FIG. 13B shows coma upon carrying out vibration reduction with respect to a rotational camera shake of 0.3 degrees. FIGS. 14A, and 14B are graphs showing various aberrations of the zoom lens according to Example 3 in a telephoto end state focusing on infinity, in which FIG. 14A shows various aberrations without vibration reduction, and FIG. 14B shows coma upon carrying out vibration reduction with respect to a rotational camera shake of 0.3 degrees. FIGS. 15A, 15B and 15C are graphs showing various aberrations of the zoom lens according to Example 3 upon focusing on a close range object, in which FIG. 15A is in the wide-angle end state, FIG. 15B is in the intermediate focal length state, and FIG. 15C is in the telephoto end state. As is apparent from the respective graphs, the zoom lens according to Example 3 shows superb optical performance as a result of good corrections to various aberrations from the wide-angle end state through the telephoto end state.

EXAMPLE 4

FIG. 16 is a sectional view showing a lens configuration of a zoom lens ZL4 according to Example 4 and shows a four-lens-group configuration where n=4. In the zoom lens ZL4 shown in FIG. 16, the front sub lens group G1a in the first lens group G1 is composed of, in order from an object side, a cemented lens constructed by a negative meniscus lens L11 having a convex surface facing the object side cemented with a double convex positive lens L12, and a double convex positive lens L13, and the rear sub lens group G1b is composed of, in order from the object side, a cemented lens constructed by a negative meniscus lens L14 having a convex surface facing the object side cemented with a positive meniscus lens L15 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is composed of, in order from the object side, a positive meniscus lens L31 having a concave surface facing the object side, and a cemented lens constructed by a double convex positive lens L32 cemented with a double concave negative lens L33. In the fourth lens group G4, the first subgroup G4a is composed of, in order from the object side, a positive meniscus lens L41 having a convex surface facing the object side, and a positive meniscus lens L42 having a convex surface facing the object side, the second subgroup G4b is composed of, in order from the object side, a cemented lens constructed by a positive meniscus lens L43 having a concave surface facing the object side cemented with a double concave negative lens L44, and the third subgroup G4c is composed of, in order from the object side, a double convex positive lens L45, a double convex positive lens L46, and a negative meniscus lens L47 having a concave surface facing the object side. An aperture stop S is disposed to the most object side of the fourth lens group G4, and included in the first subgroup G4a.

In Example 4, in the wide-angle end state, the vibration reduction coefficient is 1.00, the focal length is 71.4 mm, so that in order to correct a rotational camera shake of 0.40 degrees, the moving amount of the second subgroup G4b is 0.50 mm. In Example 4, in the intermediate focal length state, the vibration reduction coefficient is 1.00, the focal length is 135.0 mm, so that in order to correct a rotational camera shake of 0.30 degrees, the moving amount of the second subgroup G4b is 0.71 mm. In Example 4, in the telephoto end stat, the vibration reduction coefficient is 1.00, the focal length is 196.0 mm, so that in order to correct a rotational camera shake of 0.30 degrees, the moving amount of the second subgroup G4b is 1.03 mm Various values associated with Example 4 are listed in Table 4.

In the zoom lens ZL4 according to Example 4, the front sub lens group G1a and the rear sub lens group G1b are movable independently with each other upon zooming. Specifically, upon zooming, the front sub lens group G1a is fixed the position on the optical axis, and the rear sub lens group G1b is moved to the image side. In this case, the zoom lens ZL4 can be said to be a five-lens-group configuration. In the zoom lens ZL4 as a five-lens-group configuration, the fourth lens group counted from the object side is moved upon focusing. In [Values for Conditional Expressions], fGn denotes a focal length of the fourth lens group G4, fVR denotes a focal length of the second subgroup G4b.

TABLE 4

[Specifications]

|   | W | M | T |
|---|---|---|---|
| f = | 71.40 | 135.00 | 196.00 |
| FNO = | 2.91 | 2.91 | 2.91 |
| ω = | 16.90° | 8.81° | 6.05° |

[Lens Data]

| i | r | d | nd | vd |
|---|---|---|---|---|
| 1 | 1045.9991 | 2.0000 | 37.16 | 1.834000 |
| 2 | 97.1615 | 11.0000 | 82.52 | 1.497820 |
| 3 | −456.3712 | 0.1000 | | |

TABLE 4-continued

| 4 | 101.1567 | 9.0000 | 82.52 | 1.497820 |
|---|---|---|---|---|
| 5 | −557.8689 | (d1) | | |
| 6 | 74.2367 | 2.0000 | 39.58 | 1.804398 |
| 7 | 51.0499 | 11.0000 | 49.78 | 1.617720 |
| 8 | 486.7171 | (d2) | | |
| 9 | 1114.6545 | 2.0000 | 42.72 | 1.834807 |
| 10 | 36.6691 | 7.8157 | | |
| 11 | −80.7935 | 2.0000 | 70.41 | 1.487490 |
| 12 | 39.9085 | 5.5000 | 23.78 | 1.846660 |
| 13 | 431.9436 | 3.9771 | | |
| 14 | −53.1722 | 2.0000 | 65.46 | 1.603001 |
| 15 | 434.1583 | (d3) | | |
| 16 | −242.6876 | 4.0000 | 28.69 | 1.795041 |
| 17 | −60.5190 | 0.1000 | | |
| 18 | 65.5165 | 8.0000 | 65.46 | 1.603001 |
| 19 | −63.3283 | 2.0000 | 23.78 | 1.846660 |
| 20 | 290.8761 | (d4) | | |
| 21 | 0.0000 | 2.0000 | Aperture Stop S | |
| 22 | 54.2771 | 4.0000 | 82.52 | 1.497820 |
| 23 | 155.7161 | 0.1000 | | |
| 24 | 49.4783 | 3.0000 | 82.52 | 1.497820 |
| 25 | 79.4482 | 20.0000 | | |
| 26 | −135.1336 | 4.0000 | 23.78 | 1.846660 |
| 27 | −38.1621 | 2.0000 | 35.91 | 1.664460 |
| 28 | 60.6022 | 5.0000 | | |
| 29 | 105.0514 | 5.0000 | 82.52 | 1.497820 |
| 30 | −95.4182 | 7.0498 | | |
| 31 | 81.3474 | 6.0000 | 82.52 | 1.497820 |
| 32 | −92.9849 | 2.7410 | | |
| 33 | −40.2997 | 2.0000 | 32.35 | 1.850260 |
| 34 | −82.0021 | (Bf) | | |

[Lens Group Data]

| Group | focal length |
|---|---|
| G1a | 229.571 |
| G1b | 165.806 |
| G2 | −26.418 |
| G3 | 76.245 |
| G4 | 110.040 |

[Variable Distances]

|   | W | M | T |
|---|---|---|---|
| d1 | 2.000 | 8.560 | 10.000 |
| d2 | 2.000 | 24.609 | 32.890 |
| d3 | 25.910 | 14.258 | 3.000 |
| d4 | 29.722 | 12.206 | 13.743 |
| Bf | 61.103 | 61.103 | 61.103 |
| TL | 256.119 | 256.119 | 256.119 |

[Values for Conditional Expressions]

(1) fGn/fVR = −1.382
(2) |fGf/fGn| = 0.693
(3) |fGn|/ft = 0.561
(4) |fVR|/fw = 1.115
(5) fGn/fw = 1.541
(6) |fVR|/ft = 0.406
(7) |fn/fGn| = 0.240

Figure 17A:
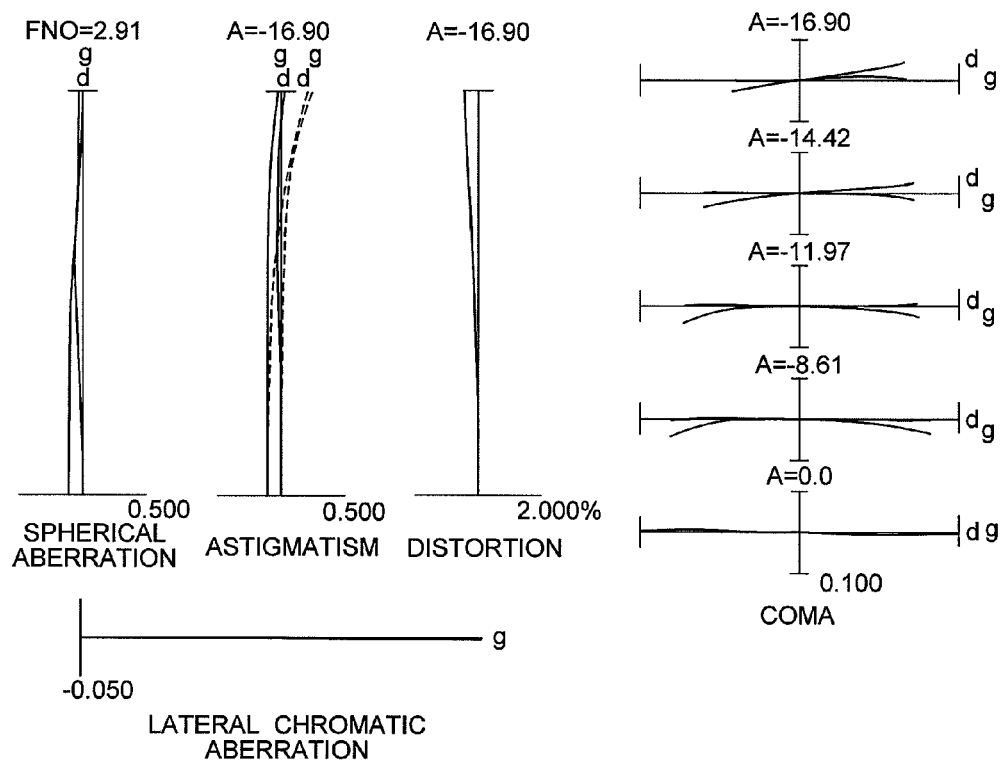
Figure 17B:
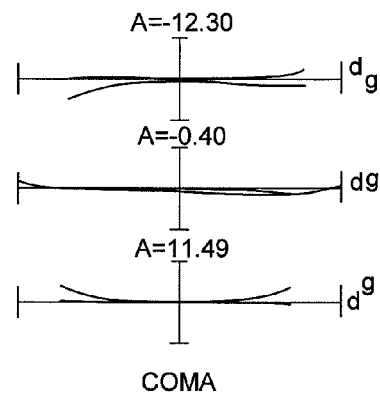
Figure 18A:
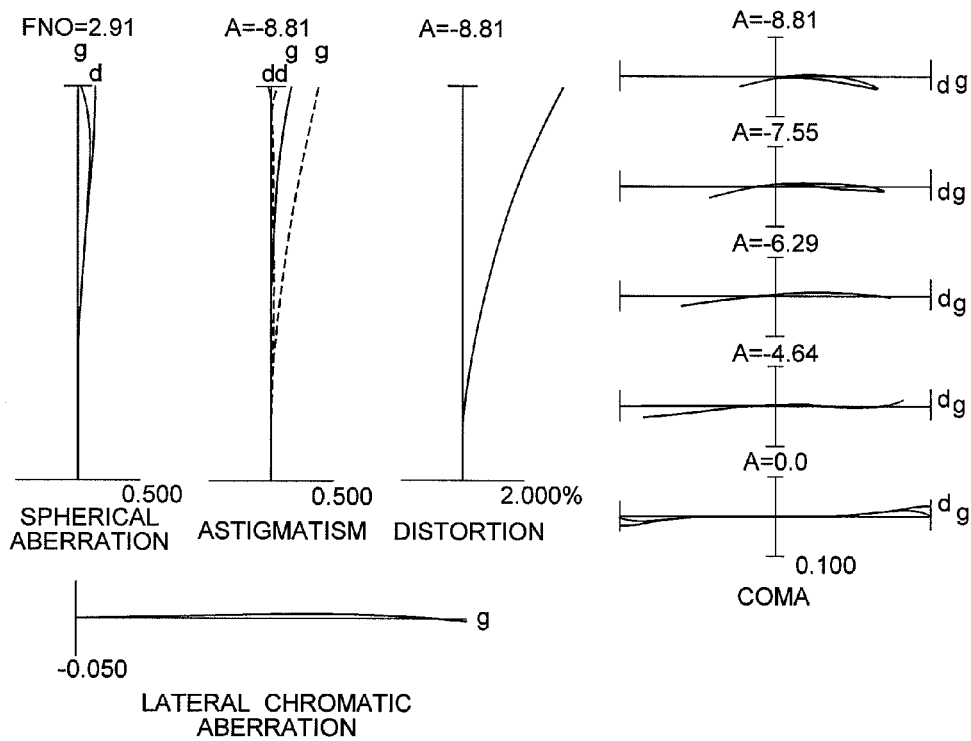
Figure 18B:
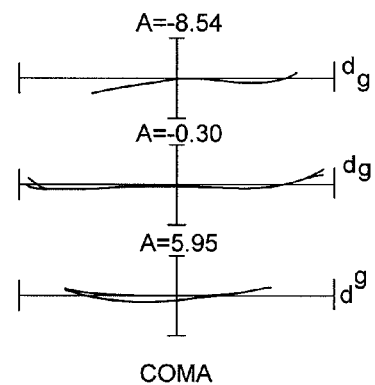
Figure 19A:
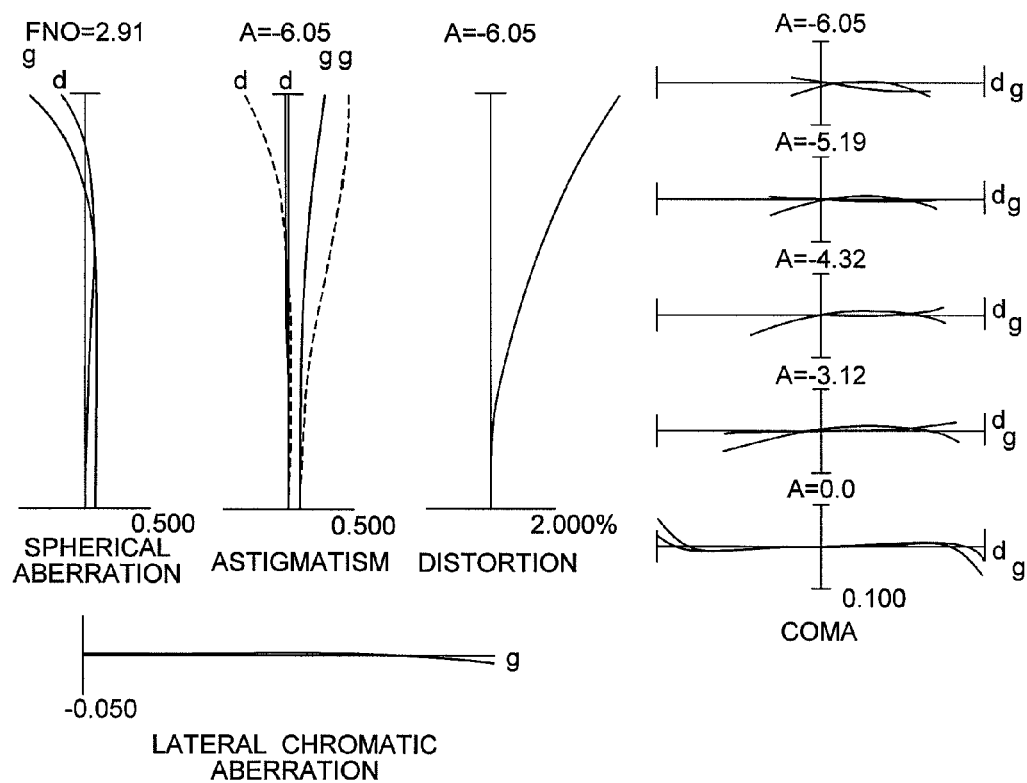
Figure 19B:
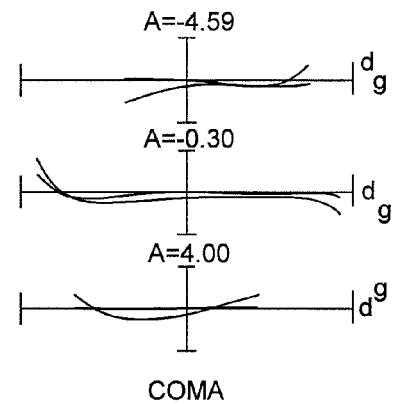
Figure 20A:
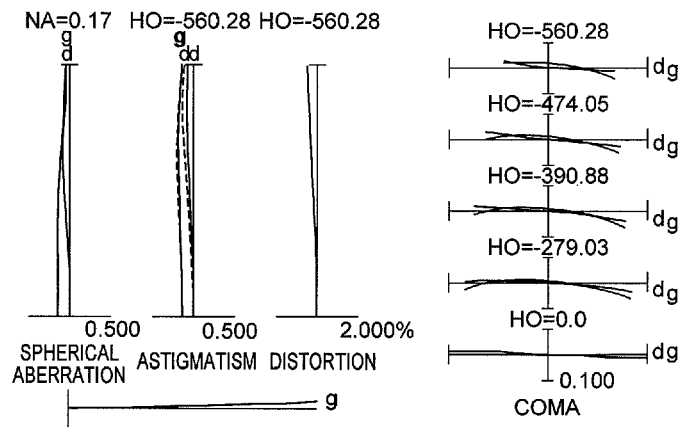
Figure 20B:
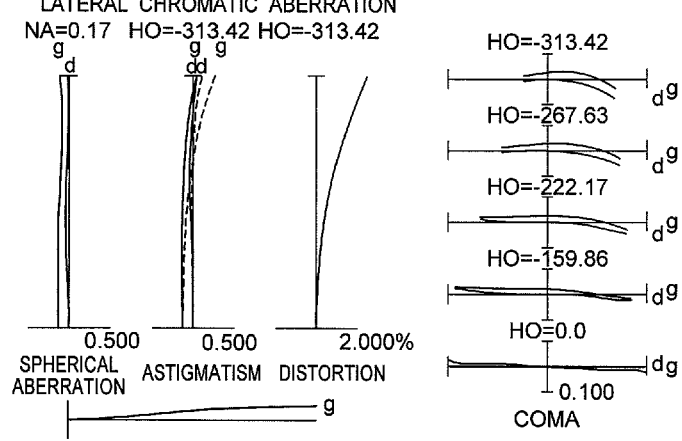
Figure 20C:
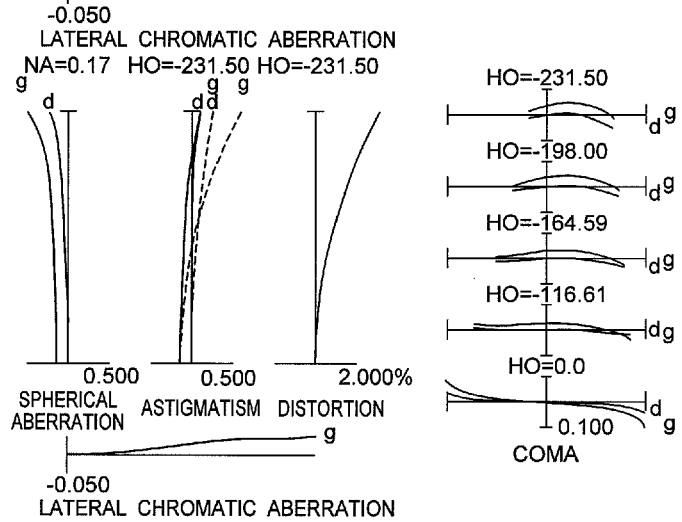

FIGS. 17A, and 17B are graphs showing various aberrations of the zoom lens according to Example 4 in a wide-angle end state focusing on infinity, in which FIG. 17A shows various aberrations without vibration reduction, and FIG. 17B shows coma upon carrying out vibration reduction with respect to a rotational camera shake of 0.4 degrees. FIGS. 18A, and 18B are graphs showing various aberrations of the zoom lens according to Example 4 in an intermediate focal length state focusing on infinity, in which FIG. 18A shows various aberrations without vibration reduction, and FIG. 18B shows coma upon carrying out vibration reduction with respect to a rotational camera shake of 0.3 degrees. FIGS. 19A, and 19B are graphs showing various aberrations of the zoom lens according to Example 4 in a telephoto end state focusing on infinity, in which FIG. 19A shows various aberrations without vibration reduction, and FIG. 19B shows coma upon carrying out vibration reduction with respect to a rotational camera shake of 0.3 degrees. FIGS. 20A, 20B and 20C are graphs showing various aberrations of the zoom lens according to Example 4 upon focusing on a close range object, in which FIG. 20A is in the wide-angle end state, FIG. 20B is in the intermediate focal length state, and FIG. 20C is in the telephoto end state. As is apparent from the respective graphs, the zoom lens according to Example 4 shows superb optical performance as a result of good corrections to various aberrations from the wide-angle end state through the telephoto end state.

EXAMPLE 5

Figure 21:
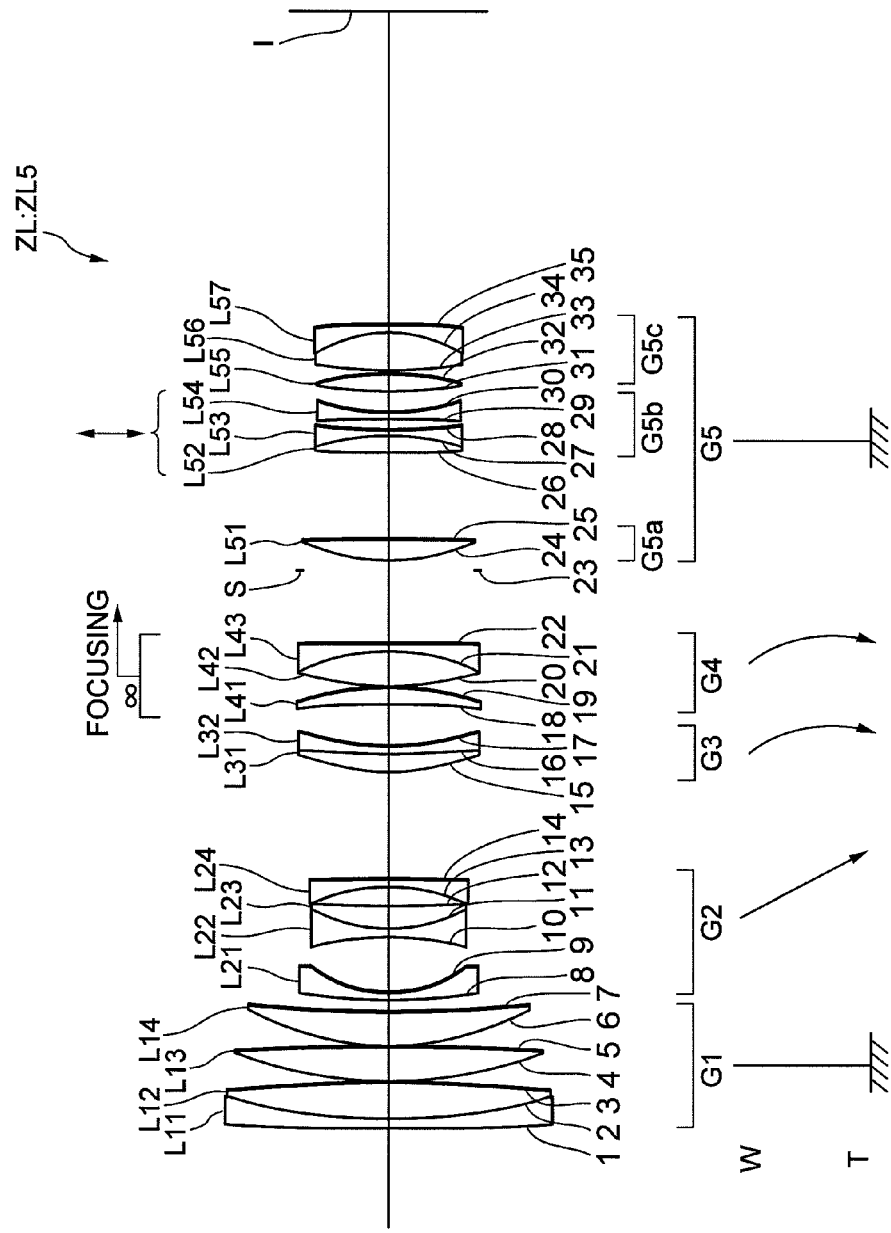
FIG. 21 is a sectional view showing a lens configuration of a zoom lens according to Example 5.

FIG. 21 is a sectional view showing a lens configuration of a zoom lens ZL5 according to Example 5 and shows a five-lens-group configuration where n=5. In the zoom lens ZL5 shown in FIG. 21, the first lens group G1 is composed of, in order from an object side, a cemented lens constructed by a negative meniscus lens L11 having a convex surface facing the object side cemented with a double convex positive lens L12, a double convex positive lens L13, and a positive meniscus lens L14 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a negative meniscus lens L24 having a concave surface facing the object side. The third lens group G3 is composed of, in order from the object side, a cemented lens constructed by a positive meniscus lens L31 having a convex surface facing the object side cemented with a negative meniscus lens L32 having a convex surface facing the object side. The fourth lens group is composed of, in order from the object side, a positive meniscus lens L41 having a concave surface facing the object side, and a cemented lens constructed by a double convex positive lens L42 cemented with a double concave negative lens L43. In the fifth lens group G5, the first subgroup G5a is composed of, in order from the object side, a positive meniscus lens L51 having a convex surface facing the object side, the second subgroup G5b is composed of, in order from the object side, a cemented lens constructed by a double convex positive lens L52 cemented with a double concave negative lens L53, and a double concave negative lens L54, and the third subgroup G5c is composed of, in order from the object side, double convex positive lens L55, and a cemented lens constructed by a double convex positive lens L56 cemented with a negative meniscus lens L57 having a concave surface facing the object side. An aperture stop S is disposed to the most object side of the fifth lens group G5, and included in the first subgroup G5a.

In Example 5, in the wide-angle end stat, the vibration reduction coefficient is 1.00, the focal length is 71.4 mm, so that in order to correct a rotational camera shake of 0.40 degrees, the moving amount of the second subgroup G5b is 0.50 mm. In Example 5, in the intermediate focal length stat, the vibration reduction coefficient is 1.00, the focal length is 135.0 mm, so that in order to correct a rotational camera shake of 0.30 degrees, the moving amount of the second subgroup G5b is 0.71 mm. In Example 5, in the telephoto end stat, the vibration reduction coefficient is 1.00, the focal length is 196.0 mm, so that in order to correct a rotational camera shake of 0.30 degrees, the moving amount of the second subgroup G5b is 1.03 mm Various values associated with Example 5 are listed in Table 5.

TABLE 5

[Specifications]

| | W | M | T |
|---|---|---|---|
| f = | 71.40 | 135.00 | 196.00 |
| FNO = | 2.91 | 2.91 | 2.91 |
| ω = | 16.69° | 8.79° | 6.06° |

[Lens Data]

| i | r | d | nd | vd |
|---|---|---|---|---|
| 1 | 547.8686 | 2.0000 | 32.35 | 1.850260 |
| 2 | 127.0457 | 9.0000 | 82.52 | 1.497820 |
| 3 | −387.4049 | 0.1000 | | |
| 4 | 101.3137 | 8.0000 | 82.52 | 1.497820 |
| 5 | −1800.9098 | 0.1000 | | |
| 6 | 66.1166 | 8.0000 | 82.52 | 1.497820 |
| 7 | 235.5025 | (d1) | | |
| 8 | 106.3241 | 2.0000 | 37.16 | 1.834000 |
| 9 | 30.3987 | 12.4957 | | |
| 10 | −72.3427 | 2.0000 | 70.41 | 1.487490 |
| 11 | 37.6638 | 5.5000 | 23.78 | 1.846660 |
| 12 | 303.0536 | 4.1346 | | |
| 13 | −44.9339 | 2.0000 | 65.46 | 1.603001 |
| 14 | −1269.0712 | (d2) | | |
| 15 | 59.3815 | 4.0000 | 47.93 | 1.717004 |
| 16 | 227.8818 | 2.0000 | 42.72 | 1.834807 |
| 17 | 63.6840 | (d3) | | |
| 18 | −274.5014 | 4.0000 | 42.24 | 1.799520 |
| 19 | −75.2662 | 0.1000 | | |
| 20 | 74.6839 | 8.0000 | 65.46 | 1.603001 |
| 21 | −55.3310 | 2.0000 | 32.35 | 1.850260 |
| 22 | 4084.7965 | (d4) | | |
| 23 | 0.0000 | 2.0000 | Aperture Stop S | |
| 24 | 51.4321 | 5.0000 | 82.52 | 1.497820 |
| 25 | 2335.6701 | 20.0000 | | |
| 26 | 213.2867 | 4.0000 | 23.78 | 1.846660 |
| 27 | −57.2867 | 1.5000 | 31.07 | 1.688931 |
| 28 | 116.1082 | 2.5000 | | |
| 29 | −213.4066 | 1.5000 | 46.47 | 1.582670 |
| 30 | 57.4789 | 5.0000 | | |
| 31 | 146.7888 | 4.0000 | 69.98 | 1.518601 |
| 32 | −72.6641 | 0.6223 | | |
| 33 | 84.7129 | 9.0000 | 52.31 | 1.517420 |
| 34 | −32.2458 | 2.0000 | 32.35 | 1.850260 |
| 35 | −265.8952 | (Bf) | | |

[Lens Group Data]

| Group | focal length |
|---|---|
| G1 | 93.218 |
| G2 | −26.822 |
| G3 | 59448.564 |
| G4 | 86.438 |
| G5 | 119.455 |

[Variable Distances]

| | W | M | T |
|---|---|---|---|
| d1 | 2.683 | 24.724 | 32.437 |
| d2 | 24.804 | 16.117 | 2.000 |
| d3 | 9.527 | 4.934 | 5.838 |
| d4 | 17.138 | 8.376 | 13.875 |
| Bf | 72.476 | 72.476 | 72.476 |
| TL | 259.180 | 259.180 | 259.180 |

[Values for Conditional Expressions]

(1) fGn/fVR = −1.412
(2) |fGf/fGn| = 0.724
(3) |fGn|/ft = 0.609
(4) |fVR|/fw = 1.185
(5) fGn/fw = 1.673

TABLE 5-continued (6) |fVR|/ft = 0.432
(7) |fn/fGn| = 0.225

Figure 22A:
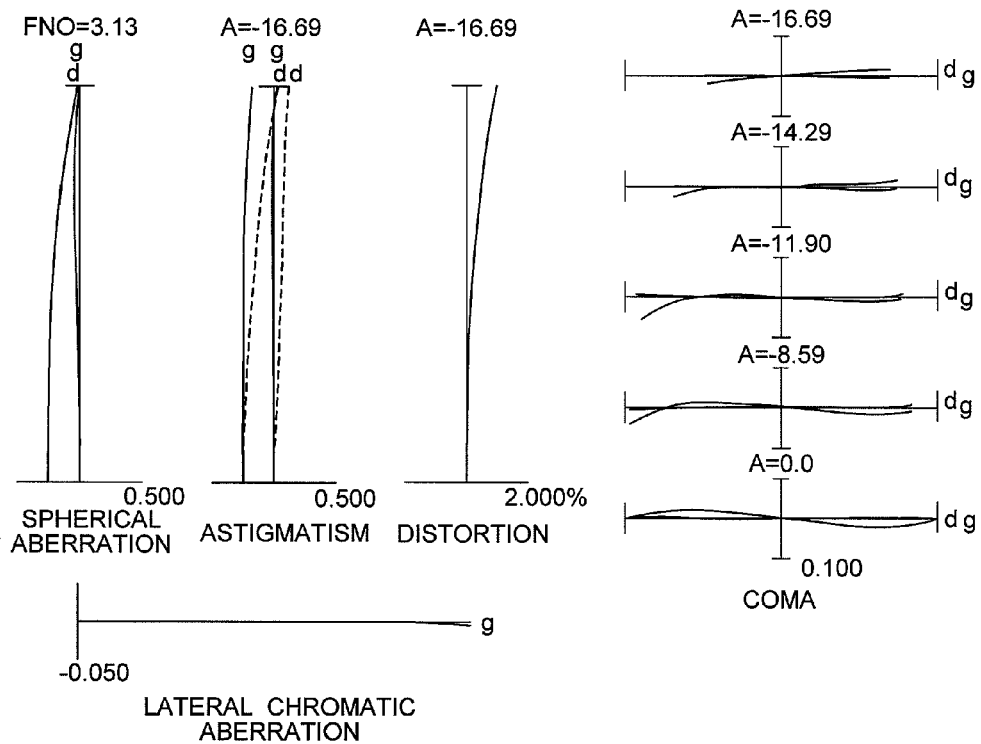
Figure 22B:
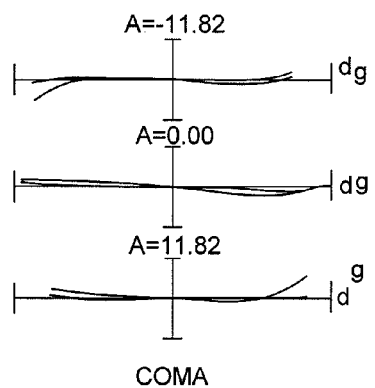
Figure 23A:
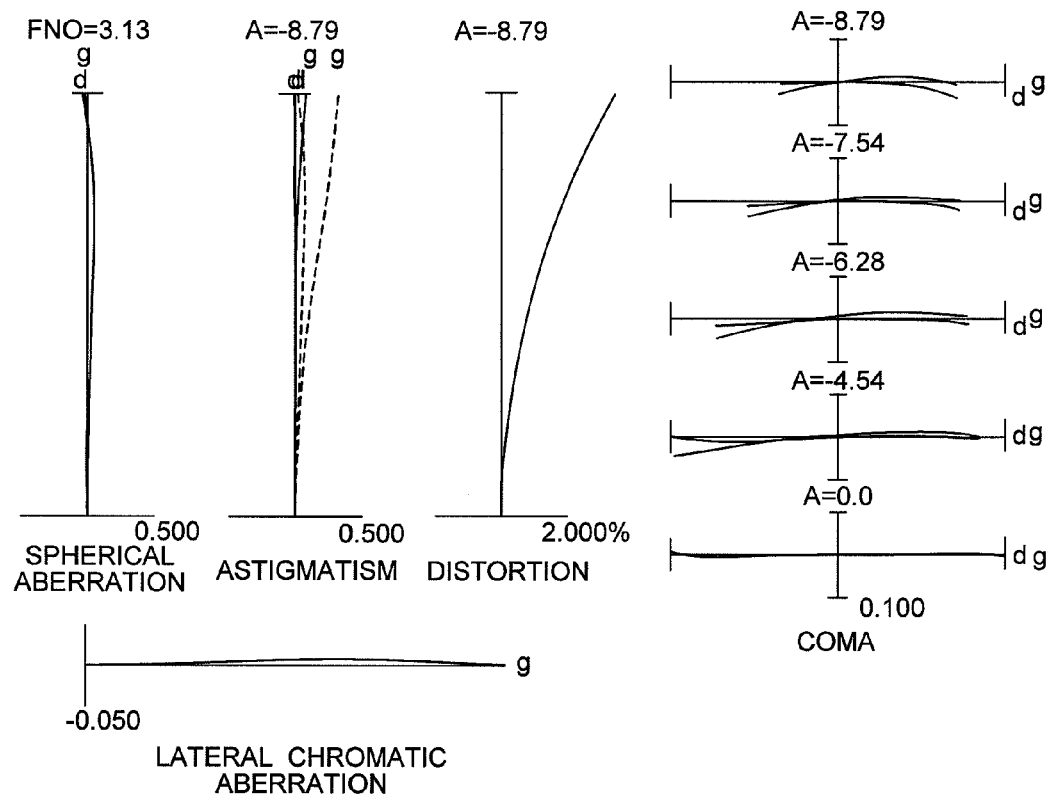
Figure 23B:
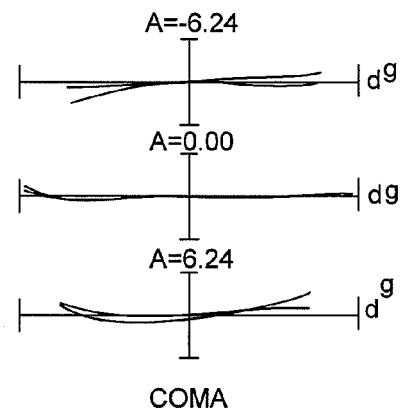
Figure 24A:
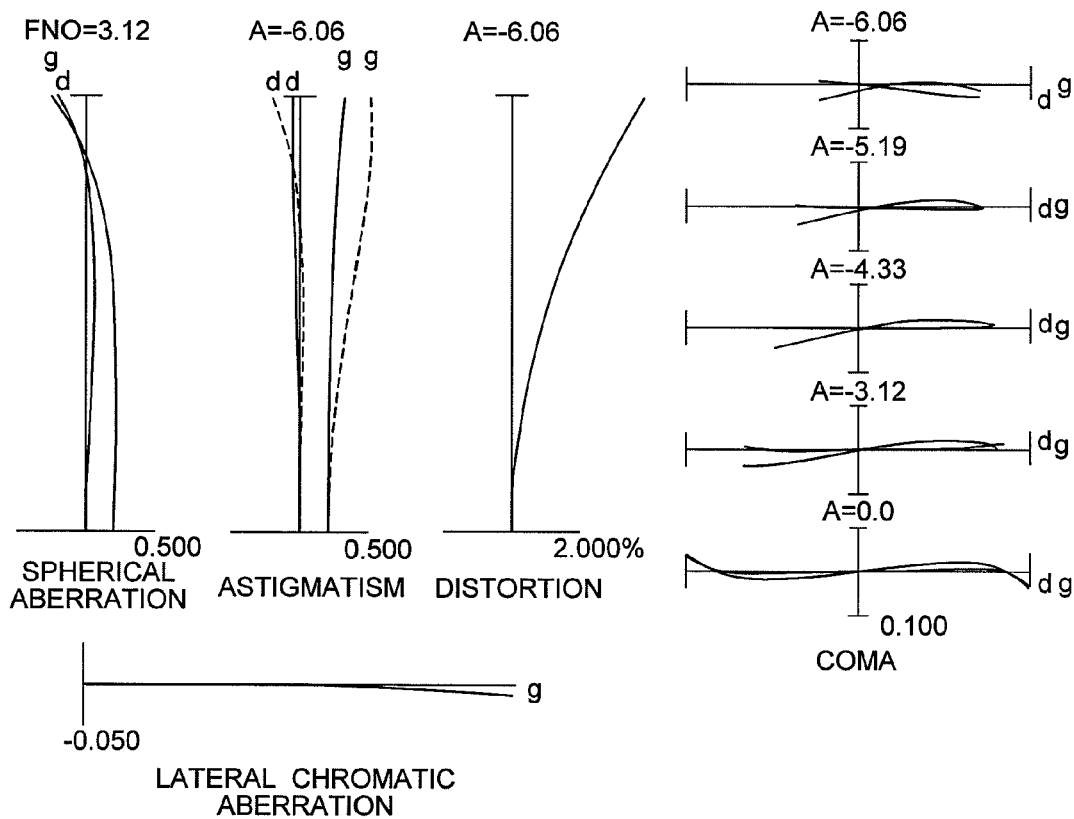
Figure 24B:
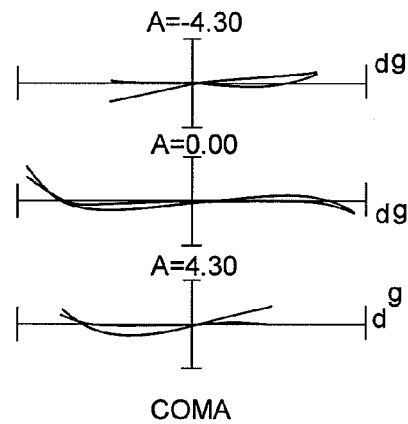
Figure 25A:
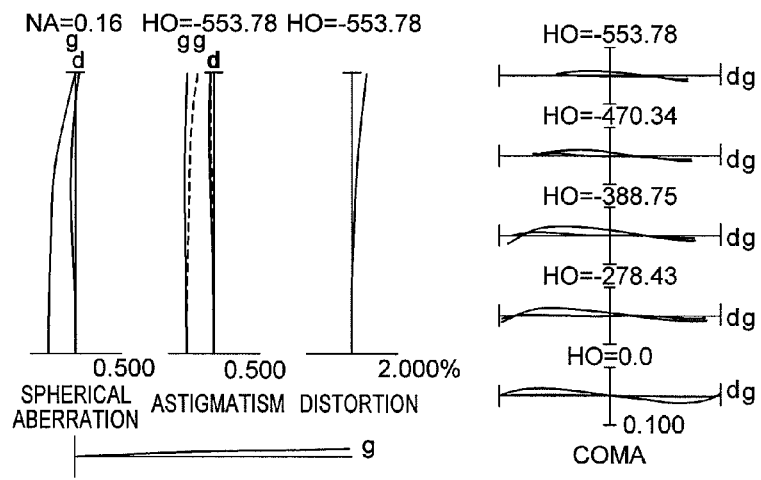
Figure 25B:
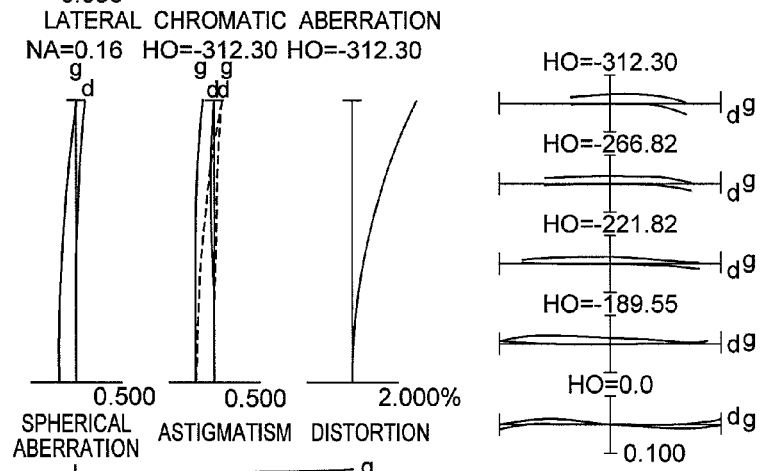
Figure 25C:
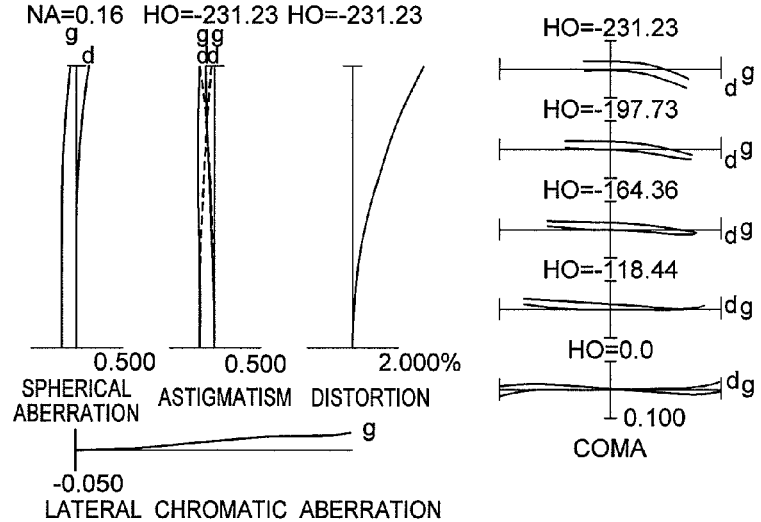

FIGS. 22A, and 22B are graphs showing various aberrations of the zoom lens according to Example 5 in a wide-angle end state focusing on infinity, in which FIG. 22A shows various aberrations without vibration reduction, and FIG. 22B shows coma upon carrying out vibration reduction with respect to a rotational camera shake of 0.4 degrees. FIGS. 23A, and 23B are graphs showing various aberrations of the zoom lens according to Example 5 in an intermediate focal length state focusing on infinity, in which FIG. 23A shows various aberrations without vibration reduction, and FIG. 23B shows coma upon carrying out vibration reduction with respect to a rotational camera shake of 0.3 degrees. FIGS. 24A, and 24B are graphs showing various aberrations of the zoom lens according to Example 5 in a telephoto end state focusing on infinity, in which FIG. 24A shows various aberrations without vibration reduction, and FIG. 24B shows coma upon carrying out vibration reduction with respect to a rotational camera shake of 0.3 degrees. FIGS. 25A, 25B and 25C are graphs showing various aberrations of the zoom lens according to Example 5 upon focusing on a close range object, in which FIG. 25A is in the wide-angle end state, FIG. 25B is in the intermediate focal length state, and FIG. 25C is in the telephoto end state. As is apparent from the respective graphs, the zoom lens according to Example 5 shows superb optical performance as a result of good corrections to various aberrations from the wide-angle end state through the telephoto end state.

EXAMPLE 6

Figure 26:
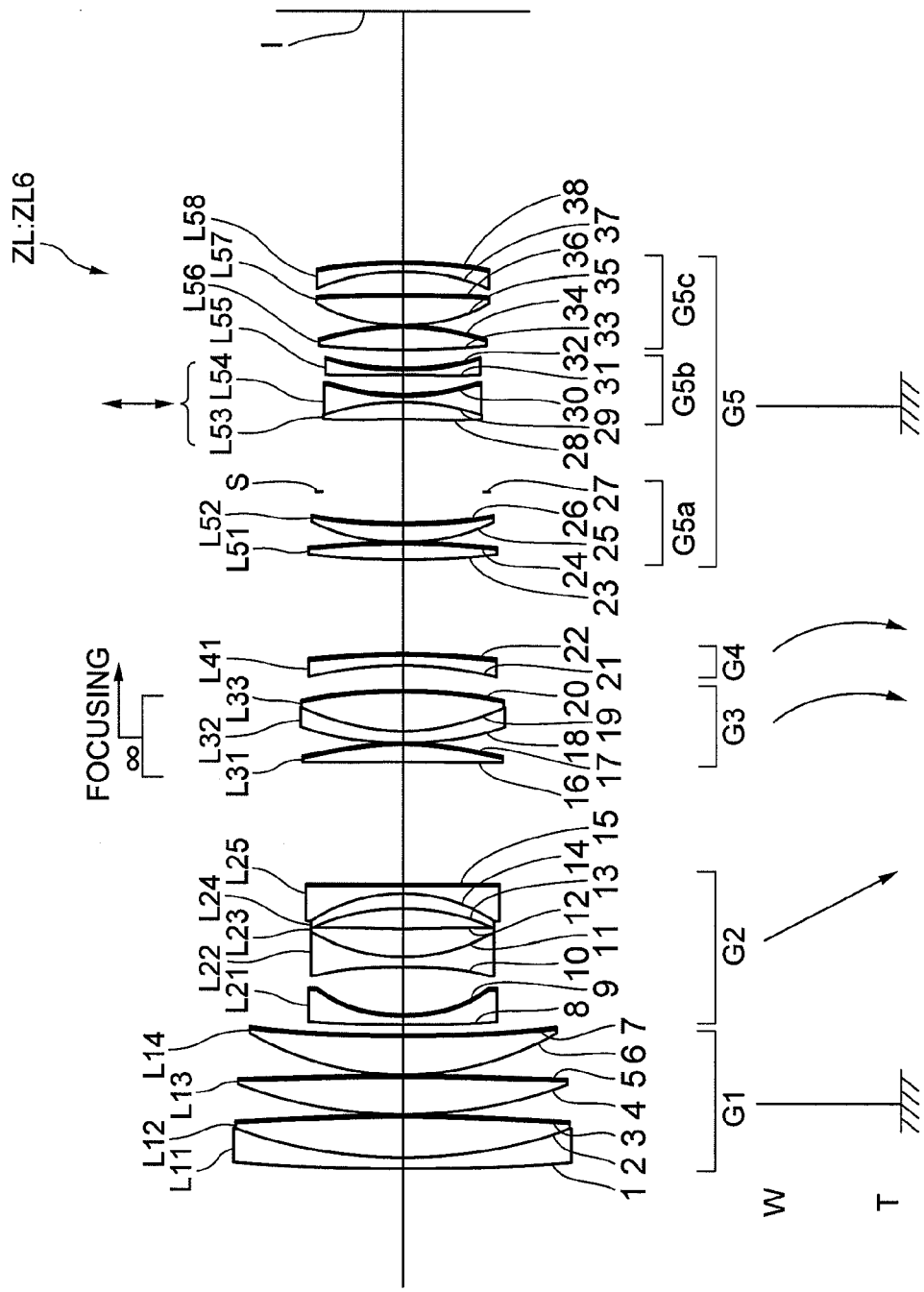
FIG. 26 is a sectional view showing a lens configuration of a zoom lens according to Example 6.

FIG. 26 is a sectional view showing a lens configuration of a zoom lens ZL6 according to Example 6 and shows a five-lens-group configuration where n=5. In the zoom lens ZL6 shown in FIG. 26, the first lens group G1 is composed of, in order from an object side, a cemented lens constructed by a negative meniscus lens L11 having a convex surface facing the object side cemented with a double convex positive lens L12, a double convex positive lens L13, and a positive meniscus lens L14 having a convex surface facing the object side. The second lens group G2 is composed of, in order from the object side, a negative meniscus lens L21 having a convex surface facing the object side, a cemented lens constructed by a double concave negative lens L22 cemented with a positive meniscus lens L23 having a convex surface facing the object side, and a cemented lens constructed by a positive meniscus lens L24 having a concave surface facing the object side cemented with a negative meniscus lens L25 having a concave surface facing the object side. The third lens group G3 is composed of, in order from the object side, a positive meniscus lens L31 having a concave surface facing the object side, and a cemented lens constructed by a negative meniscus lens L32 having a convex surface facing the object side cemented with a double convex positive lens L33. The fourth lens group G4 is composed of a negative meniscus lens L41 having a concave surface facing the object side. In the fifth lens group G5, the first subgroup G5a is composed of, in order from the object side, a double convex positive lens L51 and a positive meniscus lens L52 having a convex surface facing the object side, the second subgroup G5b is composed of, in order from the object side, a cemented lens constructed by a double convex positive lens L53 cemented with a double concave negative lens L54, and a negative meniscus lens L55 having a convex surface facing the object side, and the third subgroup G5c is composed of, in order from the object side, a double convex positive lens L56, a double convex positive lens L57, and a negative meniscus lens L58 having a concave surface facing the object side. An aperture stop S is disposed between the first subgroup G5a and the second subgroup G5b, and disposed to the most image side of the first subgroup G5a.

In Example 6, in the wide-angle end state, the vibration reduction coefficient is 1.30, the focal length is 71.4 mm, so that in order to correct a rotational camera shake of 0.40 degrees, the moving amount of the second subgroup G5b is 0.38 mm. In Example 6, in the intermediate focal length state, the vibration reduction coefficient is 1.30, the focal length is 135.0 mm, so that in order to correct a rotational camera shake of 0.30 degrees, the moving amount of the second subgroup G5b is 0.54 mm. In Example 6, in the telephoto end stat, the vibration reduction coefficient is 1.30, the focal length is 196.0 mm, so that in order to correct a rotational camera shake of 0.30 degrees, the moving amount of the second subgroup G5b is 0.79 mm Various values associated with Example 6 are listed in Table 6.

TABLE 6

[Specifications]

|  | W | M | T |
|---|---|---|---|
| f = | 71.40 | 135.00 | 196.00 |
| FNO = | 2.89 | 2.89 | 2.89 |
| ω = | 16.96° | 8.90° | 6.12° |

[Lens Data]

| i | r | d | nd | νd |
|---|---|---|---|---|
| 1 | 381.3020 | 2.5000 | 28.69 | 1.795041 |
| 2 | 106.4250 | 8.8000 | 82.52 | 1.497820 |
| 3 | −1149.1256 | 0.1000 | | |
| 4 | 98.2127 | 8.5000 | 82.52 | 1.497820 |
| 5 | −1919.4180 | 0.1000 | | |
| 6 | 66.6347 | 8.5000 | 82.52 | 1.497820 |
| 7 | 293.0617 | (d1) | | |
| 8 | 228.7827 | 2.1000 | 46.62 | 1.816000 |
| 9 | 33.2041 | 10.0000 | | |
| 10 | −117.4258 | 2.1000 | 70.41 | 1.487490 |
| 11 | 37.9960 | 6.2000 | 23.78 | 1.846660 |
| 12 | 287.5696 | 4.2000 | | |
| 13 | −53.8038 | 3.3000 | 25.43 | 1.805181 |
| 14 | −38.9730 | 2.1000 | 46.62 | 1.816000 |
| 15 | −2687.3318 | (d2) | | |
| 16 | −1365.0388 | 3.8000 | 44.78 | 1.743997 |
| 17 | −93.5331 | 0.1000 | | |
| 18 | 77.7004 | 2.4000 | 23.78 | 1.846660 |
| 19 | 47.7610 | 8.8000 | 65.46 | 1.603001 |
| 20 | −130.8829 | (d3) | | |
| 21 | −90.0052 | 2.5000 | 23.78 | 1.846660 |
| 22 | −222.5672 | (d4) | | |
| 23 | 156.5810 | 3.8000 | 82.52 | 1.497820 |
| 24 | −223.4996 | 0.1000 | | |
| 25 | 48.3764 | 4.0000 | 82.52 | 1.497820 |
| 26 | 104.4479 | 6.6000 | | |
| 27 | 0.0000 | 15.4000 | Aperture Stop S | |
| 28 | 629.9782 | 3.8000 | 28.46 | 1.728250 |
| 29 | −55.4480 | 1.6000 | 53.71 | 1.579570 |
| 30 | 55.4345 | 4.0000 | | |
| 31 | 482.0258 | 1.6000 | 39.57 | 1.804400 |
| 32 | 58.8315 | 4.0000 | | |
| 33 | 182.5454 | 5.0000 | 82.52 | 1.497820 |
| 34 | −61.2108 | 0.1000 | | |
| 35 | 40.0944 | 6.5000 | 82.52 | 1.497820 |
| 36 | −880.4337 | 4.7500 | | |
| 37 | −53.2131 | 2.0000 | 32.35 | 1.850260 |
| 38 | −148.8412 | (Bf) | | |

TABLE 6-continued

[Lens Group Data]

| Group | focal length |
|---|---|
| G1 | 92.597 |
| G2 | −26.083 |
| G3 | 57.143 |
| G4 | −180.041 |
| G5 | 111.174 |

[Variable Distances]

| | W | M | T |
|---|---|---|---|
| d1 | 2.054 | 23.103 | 30.776 |
| d2 | 25.896 | 13.196 | 2.011 |
| d3 | 5.289 | 12.530 | 16.871 |
| d4 | 19.899 | 4.308 | 3.480 |
| Bf | 53.787 | 53.787 | 53.787 |
| TL | 246.275 | 246.275 | 246.275 |

[Values for Conditional Expressions]

(1) fGn/fVR = −2.095
(2) |fGf/fGn| = 0.511
(3) |fGn|/ft = 0.568
(4) |fVR|/fw = 0.744
(5) fGn/fw = 1.559
(6) |fVR|/ft = 0.271
(7) |fn/fGn| = 0.231

Figure 27A:
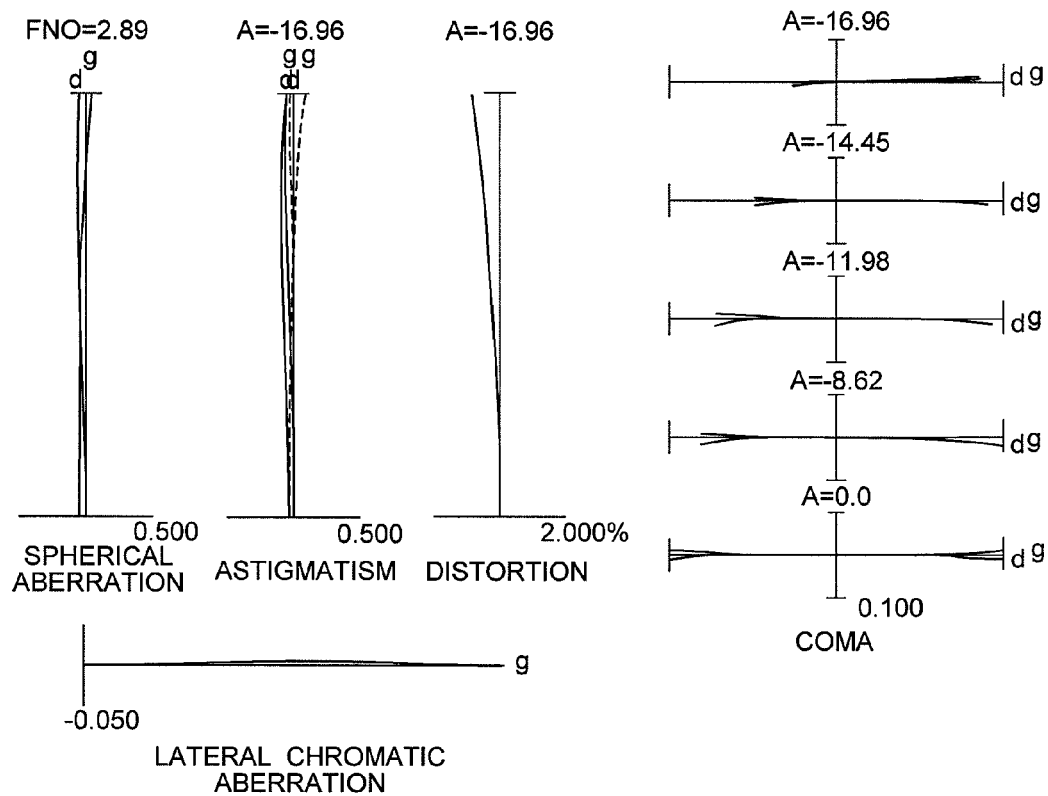
Figure 27B:
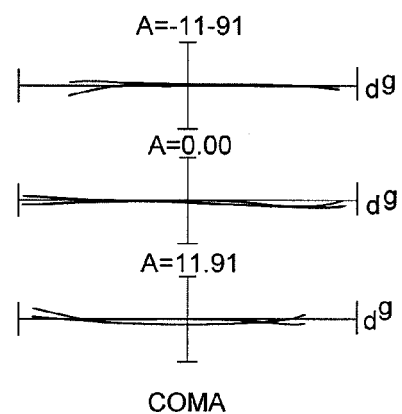
Figure 28A:
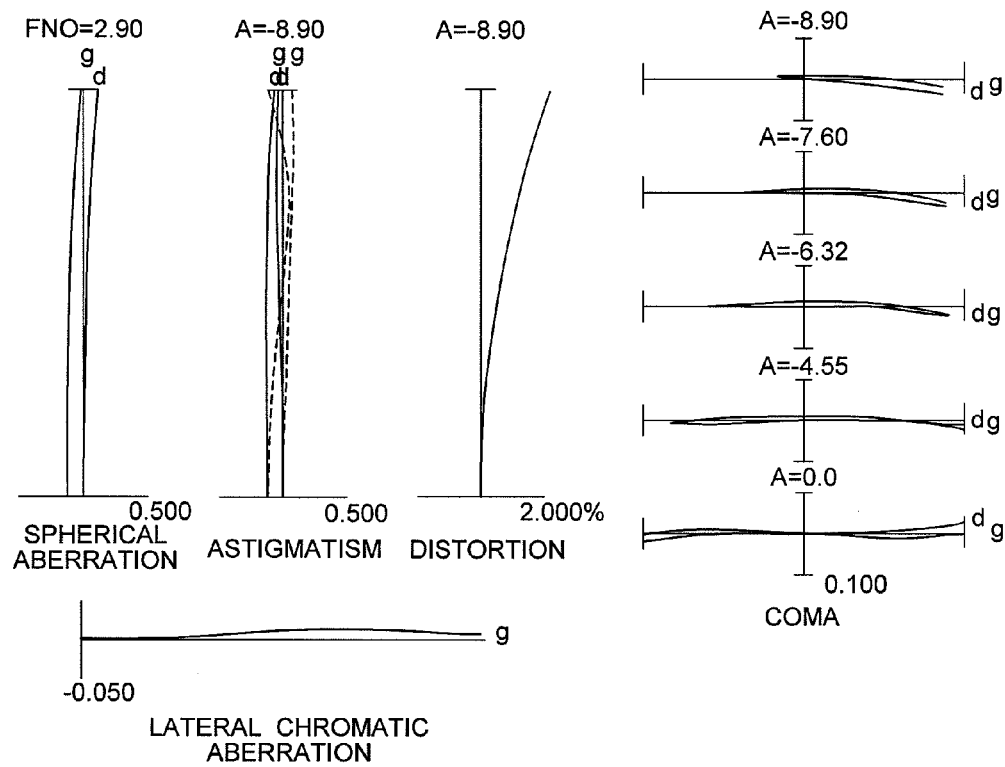
Figure 28B:
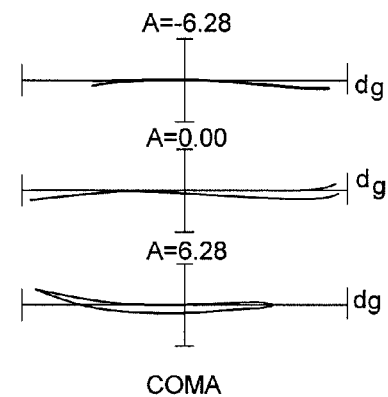
Figure 29A:
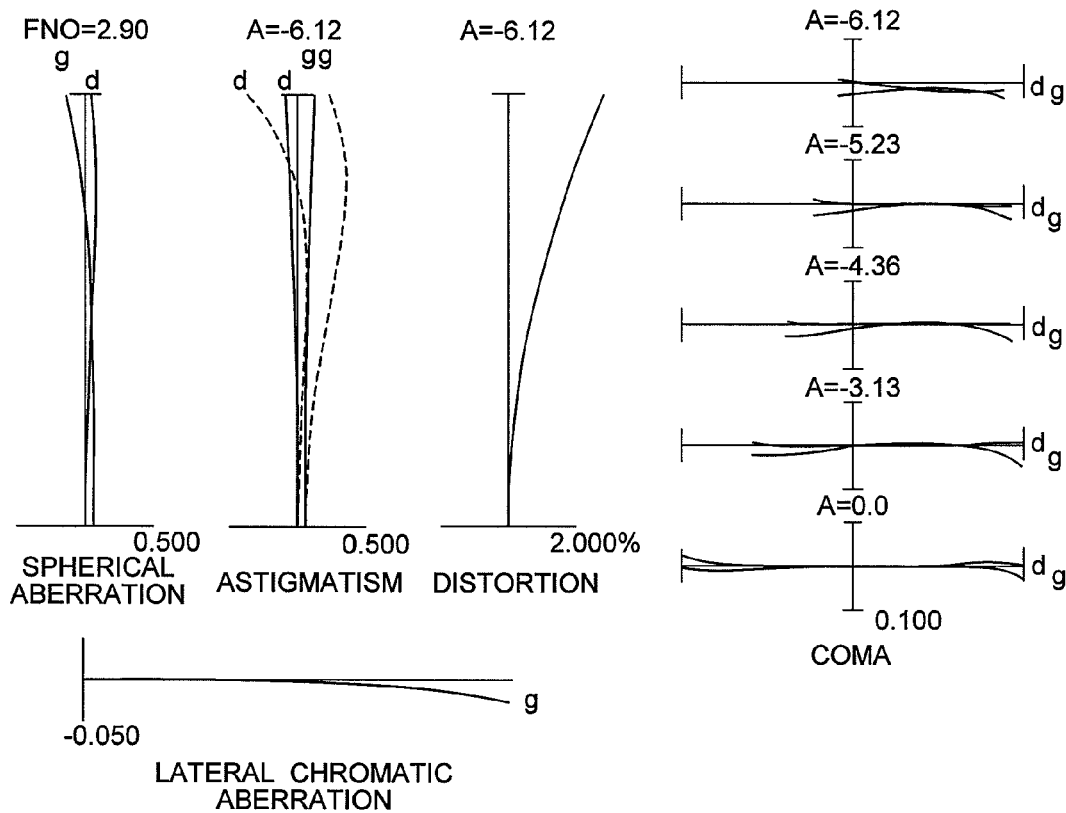
Figure 29B:
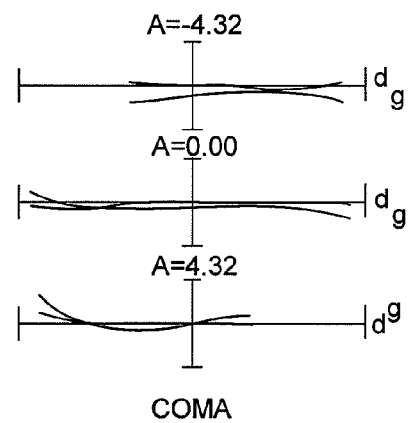

FIGS. 27A, and 27B are graphs showing various aberrations of the zoom lens according to Example 6 in a wide-angle end state focusing on infinity, in which FIG. 27A shows various aberrations without vibration reduction, and FIG. 27B shows coma upon carrying out vibration reduction with respect to a rotational camera shake of 0.4 degrees. FIGS. 28A, and 28B are graphs showing various aberrations of the zoom lens according to Example 6 in an intermediate focal length state focusing on infinity, in which FIG. 28A shows various aberrations without vibration reduction, and FIG. 28B shows coma upon carrying out vibration reduction with respect to a rotational camera shake of 0.3 degrees. FIGS. 29A, and 29B are graphs showing various aberrations of the zoom lens according to Example 6 in a telephoto end state focusing on infinity, in which FIG. 29A shows various aberrations without vibration reduction, and FIG. 29B shows coma upon carrying out vibration reduction with respect to a rotational camera shake of 0.3 degrees. FIGS. 30A, 30B and 30C are graphs showing various aberrations of the zoom lens according to Example 6 upon focusing on a close range object, in which FIG. 30A is in the wide-angle end state, FIG. 30B is in the intermediate focal length state, and FIG. 30C is in the telephoto end state. As is apparent from the respective graphs, the zoom lens according to Example 6 shows superb optical performance as a result of good corrections to various aberrations from the wide-angle end state through the telephoto end state.

Figure 34A:
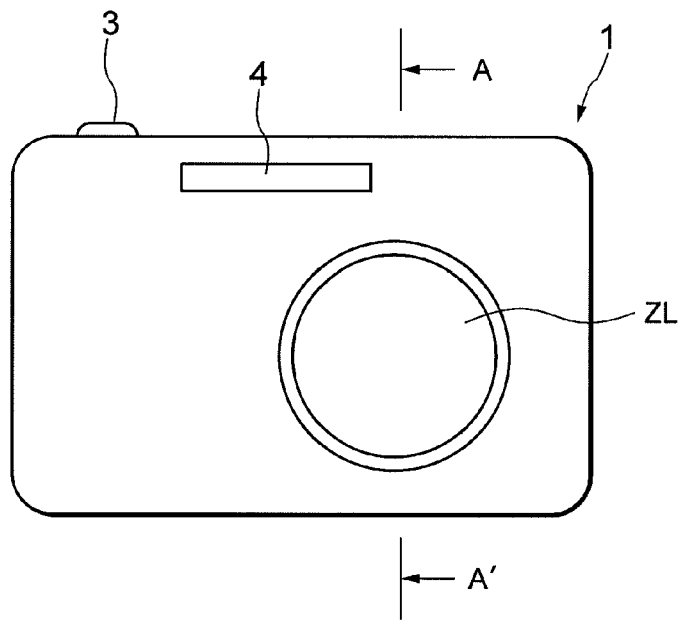
Figure 34B:
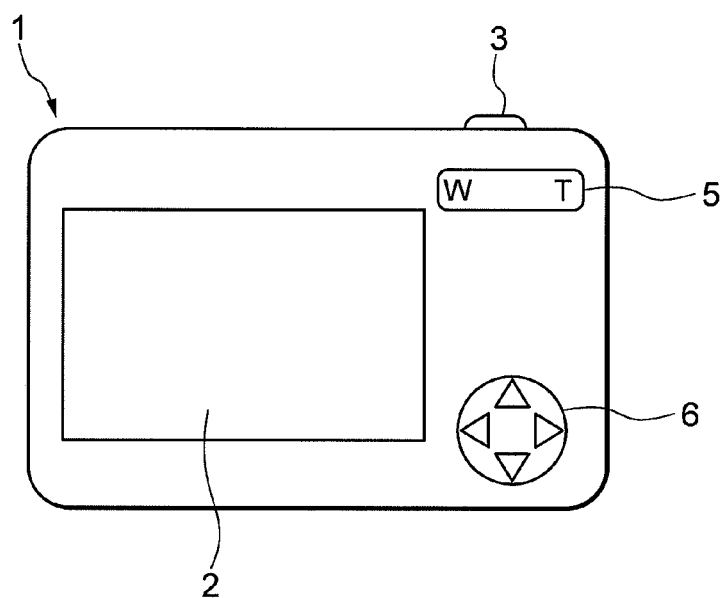

In FIGS. 34A, 34B and 35, construction of an electronic still camera 1 (hereinafter simply called as a camera) as an optical apparatus equipped with the above-described zoom lens ZL. In the camera 1, when a power switch button (not shown) is pressed, a shutter (not shown) of an image-taking lens (the zoom lens ZL) is opened, light from an object (not shown) is converged by the zoom lens ZL, and an image is formed on an imaging device C (such as a CCD, or CMOS) disposed on the image plane I. The object image formed on the imaging device C is displayed on a liquid crystal monitor 2 disposed backside of the camera 1. After fixing the image composition of the object image with observing the liquid crystal monitor 2, a photographer depresses a release button 3 to take a picture of the object image by the imaging device C, and stores in a memory (not shown).

In the camera 1, the following members are disposed such as an auxiliary light emitter 4 that emits auxiliary light when the object is dark, a W-T button 5 that makes the zoom lens system carry out zooming between a wide-angle end state (W) and a telephoto end state (T), and a function button 6 that is used for setting various conditions of the camera 1. The camera 1 may be a single-lens reflex camera that has a semi-transparent mirror, a focusing screen, a pentagonal roof prism, and an eyepiece optical system. Moreover, the zoom lens ZL may be an interchangeable lens capable of attaching to a single-lens reflex camera.

Incidentally, the following description may suitably be applied within limits that do not deteriorate optical performance.

In the above stated explanations and Examples, although a zoom lens ZL with a five-lens-group configuration, in which two lens groups disposed to the most object side are made to be the first lens group G1 and the second lens group G2, is explained, it may be treated as a four-lens-group configuration with combining these two lens groups (for example, Example 4). In this case, the lens group located to the object side is called as a front sub lens group, and the image side lens group is called as a rear sub lens group.

Moreover, the configuration conditions can be applied to other lens configurations such as a six-lens-group configuration and a seven-lens-group configuration. More specifically, a lens configuration that at least one lens having positive refractive power is added to the most object side, or at least one lens having positive refractive power or negative refractive power is added to the most image side, or more than three lens groups is added between the first lens group and the fifth lens group can be mentioned.

In the above explanations, although a case the third lens group G3 is used for focusing is explained, it is not necessarily to be the third lens group G3, and a single lens group or a plurality of lens groups, or a portion of a lens group may be moved along the optical axis as a focusing lens group Gf for carrying out focusing from infinity object to a close range object. In this case, the focusing lens group can be used for auto focus, and suitable for being driven by a motor such as an ultrasonic motor. It is particularly preferable that the third lens group G3 is used as the focusing lens group. However, the fourth lens group G4 may be used as a focusing lens group.

In the zoom lens ZL, any lens surface may be formed as an aspherical surface. In this case, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed in or in the vicinity of the fifth lens group G5, the function may be substituted by a lens frame without disposing a member as an aperture stop. Moreover, with fixing the aperture stop S and lenses disposed to the image side of the aperture stop S upon zooming, an f-number can be fixed.

An antireflection coating having high transmittance over a broad wavelength range may be applied to each lens surface to reduce flare or ghost images, so that high optical performance with a high contrast can be attained.

In a zoom lens ZL according to the present embodiment, a focal length converted into 35 mm film format is about 60 to 80 mm in the wide-angle end state, and about 180 to 400 mm in the telephoto end state, and the zoom ratio is about two to five.

In a zoom lens ZL according to the present embodiment, the first lens group G1 preferably includes at least two positive lens components and one negative lens component. The first lens group G1 preferably disposes lens components, in order from an object side, negative-positive-positive. Moreover, the first lens group G1 preferably includes one cemented lens and two single lenses.

In a zoom lens ZL according to the present embodiment, the second lens group G2 preferably includes at least one positive lens component and two negative lens components. The second lens group G2 preferably disposes lens components, in order from the object side, negative-negative-positive. Moreover, the second and the third lens components may be cemented. A negative lens component may be added to the most image side of the second lens group G2.

In a zoom lens ZL according to the present embodiment, the third lens group G3 preferably includes at least two positive lens components. Moreover, the third lens group G3 may be composed of one cemented lens.

In a zoom lens ZL according to the present embodiment, the fourth lens group G4 preferably composed of one lens component having positive or negative refractive power. However, it may be composed of a plurality of lenses.

In a zoom lens ZL according to the present embodiment, the fifth lens group G5 includes positive-negative-positive subgroups (the first subgroup G5a, the second subgroup G5b, and the third subgroup G5c) as stated above, and a camera shake can be corrected by moving the second subgroup G5b in a direction substantially perpendicular to the optical axis. With this lens configuration, it becomes possible to reduce diameter of the zoom lens ZL. The first subgroup G5a preferably includes at least one positive lens component, the second subgroup G5b preferably includes at least one cemented lens, and the third subgroup G5c preferably includes at least one negative lens component and at least one positive lens component.

The present embodiment only shows a specific example for the purpose of better understanding of the present application. Accordingly, it is needless to say that the present application in its broader aspect is not limited to the specific details and representative devices.

What is claimed is:

1. A zoom lens comprising, in order from an object side:
a first lens group that is disposed to the most object side and has positive refractive power;
a second lens group that is disposed to an image side of the first lens group; and
a Gn lens group that is disposed to the most image side and has positive refractive power;
upon zooming, the first lens group and the Gn lens group being fixed,
upon focusing, at least one lens group disposed between the second lens group and the Gn lens group being moved as a focusing lens group, and
the Gn lens group including, in order from the object side, a first subgroup having positive refractive power, a second subgroup having negative refractive power, and a third subgroup having positive refractive power, and the second subgroup is a vibration reduction lens group.

2. The zoom lens according to claim 1, wherein at least two lens groups are included between the second lens group and the Gn lens group.

3. The zoom lens according to claim 1, wherein the following conditional expression is satisfied:

$$0.20<|fGf/fGn|<1.00$$

where fGf denotes a focal length of the focusing lens group, and fGn denotes a focal length of the Gn lens group.

4. The zoom lens according to claim 1, wherein the following conditional expression is satisfied:

$$0.40<|fGn|/ft<1.00$$

where fGn denotes a focal length of the Gn lens group, and ft denotes a focal length of the zoom lens in the telephoto end state.

5. The zoom lens according to claim 1, wherein the following conditional expression is satisfied:

$$1.38<fGn/fw<1.95$$

where fGn denotes a focal length of the Gn lens group, and fw denotes a focal length of the zoom lens in a wide-angle end state.

6. The zoom lens according to claim 1, wherein the following conditional expression is satisfied:

$$0.10<|fn/fGn|<0.40$$

where fn denotes a focal length of a lens group having negative refractive power disposed to the most object side, and fGn denotes a focal length of the Gn lens group.

7. The zoom lens according to claim 1, wherein the zoom lens includes, in order from the object side, the first lens group, the second lens group, a third lens group, a fourth lens group, and the Gn lens group.

8. The zoom lens according to claim 7, wherein at least a portion of the third lens group is moved upon focusing.

9. The zoom lens according to claim 1, wherein the zoom lens includes, in order from the object side, the first lens group having positive refractive power, the second lens group having negative refractive power, a third lens group having positive refractive power, and the Gn lens group having positive refractive power.

10. The zoom lens according to claim 9, wherein the first lens group includes, in order from the object side, a front sub lens group having positive refractive power and a rear sub lens group having positive refractive power, and upon zooming, the front sub lens group and the Gn lens group are fixed, and the rear sub lens group is movable.

11. The zoom lens according to claim 9, wherein upon focusing, at least one portion of the third lens group is movable.

12. The zoom lens according to claim 1, wherein the vibration reduction lens group is movable in a direction having a component substantially perpendicular to an optical axis.

13. The zoom lens according to claim 12, wherein the vibration reduction lens group has negative refractive power.

14. The zoom lens according to claim 12, wherein the following conditional expression is satisfied:

$$-3.50<fGn/fVR<-0.80$$

where fGn denotes a focal length of the Gn lens group, and fVR denotes a focal length of the vibration reduction lens group.

15. The zoom lens according to claim 12, wherein the following conditional expression is satisfied:

$$0.10<|fVR|/fw<1.90$$

where fVR denotes a focal length of the vibration reduction lens group, and fw denotes a focal length of the zoom lens in the wide-angle end state.

16. The zoom lens according to claim 12, wherein the following conditional expression is satisfied:

$$1.38 < fGn/fw < 1.95$$

where fGn denotes a focal length of the Gn lens group, and fw denotes a focal length of the zoom lens in a wide-angle end state.

17. The zoom lens according to claim 12, wherein the following conditional expression is satisfied:

$$0.10 < |fVR|/ft < 1.00$$

where fVR denotes a focal length of the vibration reduction lens group, and fw denotes a focal length of the zoom lens in a wide-angle end state.

18. The zoom lens according to claim 12, wherein the following conditional expression is satisfied:

$$0.10 < |fn/fGn| < 0.40$$

where fn denotes a focal length of a lens group having negative refractive power disposed to the most object side, and fGn denotes a focal length of the Gn lens group.

19. The zoom lens according to claim 12, wherein at least two lens groups are included between the second lens group and the Gn lens group.

20. The zoom lens according to claim 12, wherein the following conditional expression is satisfied:

$$0.20 < |fGf/fGn| < 1.00$$

where fGf denotes a focal length of the focusing lens group, and fGn denotes a focal length of the Gn lens group.

21. The zoom lens according to claim 12, wherein the following conditional expression is satisfied:

$$0.40 < |fGn|/ft < 1.00$$

where fGn denotes a focal length of the Gn lens group, and ft denotes a focal length of the zoom lens in the telephoto end state.

22. The zoom lens according to claim 12, wherein the zoom lens includes, in order from the object side, the first lens group, the second lens group, a third lens group, a fourth lens group, and the Gn lens group.

23. The zoom lens according to claim 22, wherein at least a portion of the third lens group is moved upon focusing.

24. The zoom lens according to claim 12, wherein the zoom lens includes, in order from the object side, the first lens group having positive refractive power, the second lens group having negative refractive power, a third lens group having positive refractive power, and the Gn lens group having positive refractive power.

25. The zoom lens according to claim 24, wherein the first lens group includes, in order from the object side, a front sub lens group having positive refractive power and a rear sub lens group having positive refractive power, and upon zooming, the front sub lens group and the Gn lens group are fixed, and the rear sub lens group is movable.

26. The zoom lens according to claim 24, wherein upon focusing, at least one portion of the third lens group is movable.

27. An optical apparatus equipped with the zoom lens according to claim 1.

28. A method for manufacturing a zoom lens that includes a first lens group disposed to the most object side with positive refractive power, a second lens group disposed to an image side of the first lens group, and a Gn lens group disposed to the most image side with positive refractive power, the method comprising steps of:
disposing the first lens group and the Gn lens group with fixing upon zooming;
disposing at least one lens group between the second lens group and the Gn lens group movably upon focusing;
disposing a vibration reduction lens group having negative refractive power included in the Gn lens group movably in a direction having a component substantially perpendicular to the optical axis; and
disposing, in order from the object side, a first subgroup having positive refractive power, a second subgroup having negative refractive power, and a third subgroup having positive refractive power into the Gn lens group, with the second subgroup being the vibration reduction lens group.

29. The method according to claim 28, further comprising a step of:
satisfying the following conditional expression:

$$0.20 < |fGf/fGn| < 1.00$$

where fGf denotes a focal length of the focusing lens group, and fGn denotes a focal length of the Gn lens group.

30. The method according to claim 28, further comprising a step of:
satisfying the following conditional expression:

$$0.40 < |fGn|/ft < 1.00$$

where fGn denotes a focal length of the Gn lens group, and ft denotes a focal length of the zoom lens in the telephoto end state.

31. The method according to claim 28, further comprising a step of:
satisfying the following conditional expression:

$$-3.50 < fGn/fVR < -0.80$$

where fGn denotes a focal length of the Gn lens group, and fVR denotes a focal length of the vibration reduction lens group.

32. The method according to claim 28, further comprising a step of:
satisfying the following conditional expression:

$$0.10 < |fVR|/fw < 1.90$$

where fVR denotes a focal length of the vibration reduction lens group, and fw denotes a focal length of the zoom lens in the wide-angle end state.

33. A zoom lens comprising, in order from an object side:
a first lens group that is disposed to the most object side and has positive refractive power;
a second lens group that is disposed to an image side of the first lens group; and
a Gn lens group that is disposed to the most image side and has positive refractive power;
upon zooming, the first lens group and the Gn lens group being fixed,
upon focusing, at least one lens group disposed between the second lens group and the Gn lens group being moved as a focusing lens group, and
the following conditional expression being satisfied:

$$0.40 < |fGn|/ft < 1.00$$

where fGn denotes a focal length of the Gn lens group, and ft denotes a focal length of the zoom lens in the telephoto end state.

34. A zoom lens comprising, in order from an object side:
a first lens group that is disposed to the most object side and has positive refractive power;
a second lens group that is disposed to an image side of the first lens group; and
a Gn lens group that is disposed to the most image side and has positive refractive power;

upon zooming, the first lens group and the Gn lens group being fixed, upon focusing, at least one lens group disposed between the second lens group and the Gn lens group being moved as a focusing lens group, and the following conditional expression being satisfied:

$$1.38 < fGn/fw < 1.95$$

where fGn denotes a focal length of the Gn lens group, and fw denotes a focal length of the zoom lens in a wide-angle end state.

\* \* \* \* \*